(12) United States Patent
Takane

(10) Patent No.: US 7,164,442 B2
(45) Date of Patent: Jan. 16, 2007

(54) IMAGE CONTROL DEVICE WITH INFORMATION-BASED IMAGE CORRECTING CAPABILITY, IMAGE CONTROL METHOD AND DIGITAL CAMERA

(75) Inventor: Yasuo Takane, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 790 days.

(21) Appl. No.: 09/949,864

(22) Filed: Sep. 12, 2001

(65) Prior Publication Data
US 2002/0030751 A1    Mar. 14, 2002

(30) Foreign Application Priority Data
Sep. 11, 2000    (JP)    ............................ 2000-275602
Jul. 30, 2001    (JP)    ............................ 2001-230228

(51) Int. Cl.
*H04N 5/262*    (2006.01)
(52) U.S. Cl. .............................. 348/240.2; 348/333.01; 348/333.12
(58) Field of Classification Search ............ 348/222.1, 348/231.99
See application file for complete search history.

(56) References Cited
U.S. PATENT DOCUMENTS
5,146,592 A * 9/1992 Pfeiffer et al. .............. 715/807
5,568,192 A * 10/1996 Hannah .................... 348/222.1
2002/0015447 A1* 2/2002 Zhou ...................... 375/240.25
2002/0135683 A1* 9/2002 Tamama et al. ............ 348/222
2003/0117513 A1* 6/2003 Anderson .............. 348/333.11
2004/0004664 A1* 1/2004 Safai ..................... 348/231.99

FOREIGN PATENT DOCUMENTS
JP        7-49937       2/1995
JP        10-84532      3/1998

OTHER PUBLICATIONS
Abstract JP7049937, Feb. 21, 1995.
Abstract JP1084532, Mar. 29, 1989.

* cited by examiner

*Primary Examiner*—Vivek Srivastava
*Assistant Examiner*—James Hannett
(74) *Attorney, Agent, or Firm*—Sughrue Mion, PLLC

(57) ABSTRACT

A digital camera includes an image control processing section in which a memory controller controls a video memory, a bus arbitrator, a display sequencer, and a timing adjusting section. Image data are read out of the video memory and fed to a data corrector. The display sequencer adjusts a sampling order in accordance with the combination of luminance data and color data constituting the image data, while varying a packet size. The bus arbitrator arbitrates access requests in accordance with priority to thereby reduce the occupation ratio of a bus. The data corrector restores and processes the image data and then delivers them to a buffer memory included in the timing adjusting section.

44 Claims, 30 Drawing Sheets

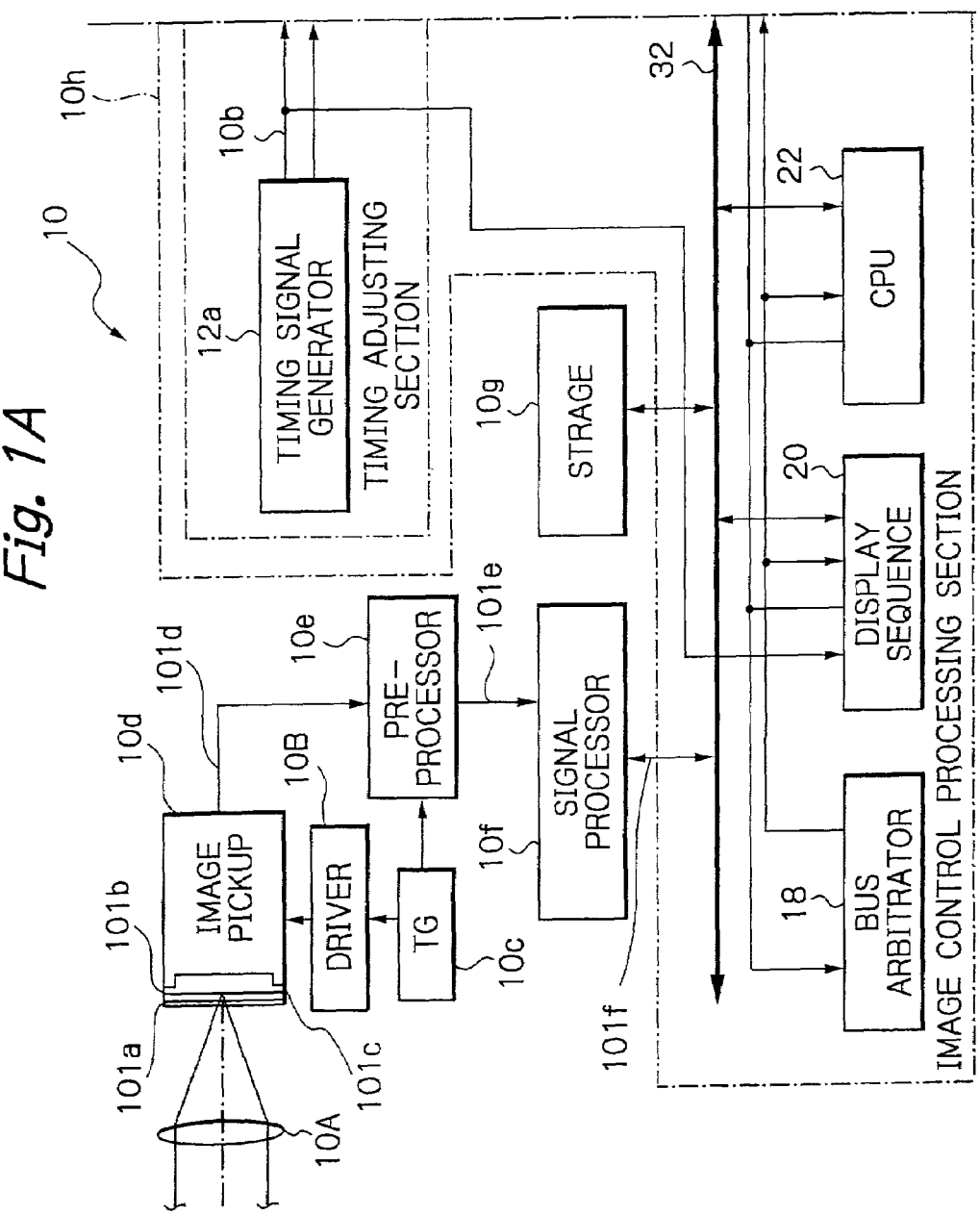

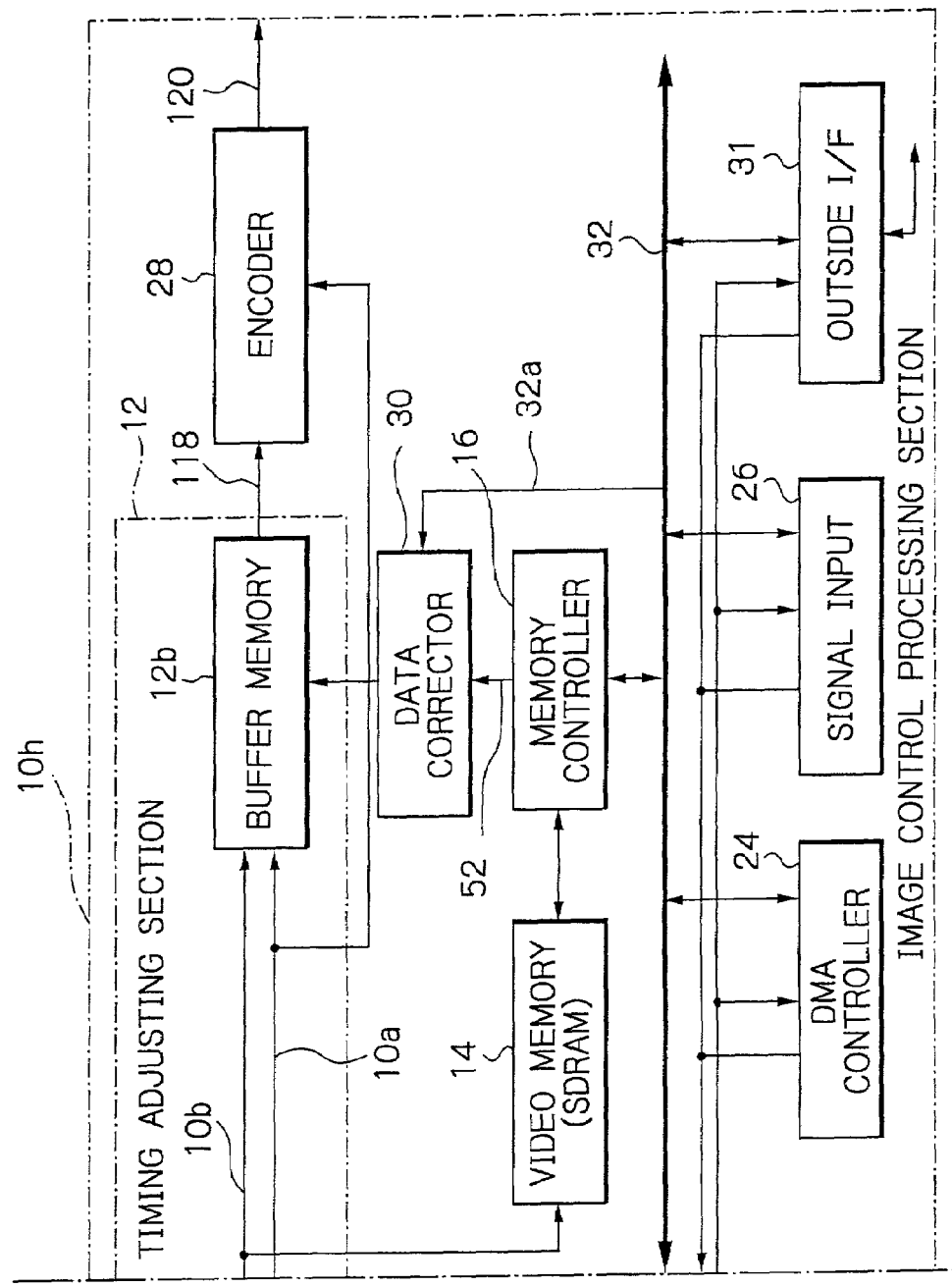

IMAGE CONTROL DEVICE WITH INFORMATION-BASED IMAGE CORRECTING CAPABILITY, IMAGE CONTROL METHOD AND DIGITAL CAMERA

BACKGROUND OF THE INVENTION

1. Field of the Invention

The present invention relates to an image control device feasible for a display, a digital camera, a printer or similar apparatus having at least one of an image data displaying function, an image data reproducing function and an image data printing function as well as to an image control method and a digital camera.

2. Description of the Background Art

It is a common practice in the imaging art to read out image data stored in a frame memory and display them on a TV (television) set or similar display. However, it has been difficult to rewrite the image data of the frame memory during image display period due to disturbance to the image ascribable to noise and limited available time. In light of this, an arrangement is generally made such that a CPU (Central Processing Unit) accesses the frame memory during blanking period particular to broadcast standards in order to rewrite the image data. This arrangement, however, brings about a problem that the mean access rate of the CPU to the frame memory is extremely low when an image is displayed.

In order to solve the above problem, use may be made of a FIFO (First-In First-Out) memory or similar buffer memory, as proposed in the past. Data are transferred to the buffer memory at a rate higher than the clock rate of a TV signal, so that the remaining time is available for rewriting the data stored in the frame memory. Generally, the buffer memory has a capacity exceeding the number of pixels of an image in the horizontal direction. The data temporarily stored in the buffer memory are read out at the clock rate of the TV signal. This guarantees a period of time for the CPU to access the frame memory even during periods other than the blanking period.

However, even the buffer memory scheme prevents the CPU from accessing the frame memory during the transfer of one line of image data from the frame memory to the buffer memory. The waiting time of the CPU is wasteful because the clock rate for the data transfer from the frame memory to the buffer memory is several times as high as the clock rate of the TV signal.

On the other hand, an image display system often includes an electronic zooming function. Y data representative of luminance and $C_R$ and $C_B$ data representative of pairs of colors are written to the frame memory in a 4:2:2 dot-sequential format. In this case, a conventional, electronic zoom circuit lowers image quality because the sampled $C_R$ and $C_B$ pairs are disturbed because of addresses, depending on magnification. To avoid the disturbance to the $C_R$ and $C_B$ pairs, it has been customary to again sample the $C_R$ and $C_B$ data for causing them to coincide, restore the Y, $C_R$ and $C_B$ data to a 4:4:4 format, and then execute zooming.

The applicant has proposed an implementation for enhancing the performance of the entire system. The implementation reduces the waiting time of a CPU output an access request without regard to a position or time in a one-line display period, i.e., implements rapid response to the access request. Besides the enhanced performance of the entire system, there is an increasing demand for more advanced functions. Advanced functions, however, aggravate power consumption and must therefore be accompanied by power saving arrangements.

SUMMARY OF THE INVENTION

It is an object of the present invention to provide an image control device capable of further enhancing the performance of the entire system while reducing power consumption, an image control method, and a digital camera.

In accordance with the present invention, an image control device controls input image data, executes signal processing with the controlled image data, and outputs the processed image data in accordance with a preselected standard. The device includes a memory for storing the input image data. A standard adjusting circuit stores the image data read out of the memory therein and outputs stored image data at a timing matching with the preselected standard. A memory control circuit controls at least the memory and standard adjusting circuit. The memory control circuit controls the input and output of the image data from the memory, sets a unit amount of continuous image data to be handled together at the time of output, sets a unit number of image data for a single line and consisting of the unit amounts of continuous image data, and outputs a request for an access to the memory to thereby control read-out. A communicating circuit selectively sends or receives the image data. An image correcting circuit analyzes, when the image data read out of the memory are smaller in amount than the unit number of image data, particular information particular to the image data and relating to display and executes, based on the result of analysis, at least one of restoration and processing with each unit image data of divided image data. An instruction information feeding circuit encodes the particular information and then feeds it to the image correcting circuit. The image correcting circuit and instruction information feeding circuit precede the standard adjusting circuit.

The image control method described above may be implemented as a digital camera.

Also, in accordance with the present invention, a control method for an image control device processes divided image data to be handled together each consisting of a luminance component and a color component to thereby produce adjusted divided image data in which the luminance component and color component are corrected as to deviation in sampling. The method then outputs the adjusted divided image data in accordance with a preselected standard. The method begins with a fist step of adjusting the separation of the luminance component and the color component, the division of image data and the correction of the deviation in sampling, varying, based on particular information particular to the image data, the data size of the adjusted divided image data to a different data size, and outputting the adjusted divided image data to a bus while executing arbitration. A second step corrects each of the adjusted divided image data in accordance with instruction information showing how at least one of a plurality of kinds of processing and restoration should be executed. A third step selects and latches the adjusted divided image data output by the second step and selects and reads out one of a plurality of latched, adjusted divided image data as part of a picture.

In accordance with the present invention, a digital camera controls input image data, executes signal processing with the controlled image data, and outputs the processed image data in accordance with a preselected standard. The device includes a memory for storing the input image data. A standard adjusting circuit stores the image data read out of the memory therein and outputs stored image data at a timing matching with the preselected standard. A memory control circuit controls at least the memory and standard adjusting circuit. The memory control circuit controls the input and output of the image data from the memory, sets a unit amount of continuous image data to be handled together at the time of output, sets a unit number of image data for a single line and consisting of the unit amounts of continuous image data, and outputs a request for an access to the memory to thereby control read-out. A communicating circuit selectively sends or receives the image data. An image correcting circuit analyzes, when the image data read out of the memory are smaller in amount than the unit number of image data, particular information particular to the image data and relating to display and executes, based on the result of analysis, at least one of restoration and processing with each unit image data of divided image data. An instruction information feeding circuit encodes the particular information and then feeds it to the image correcting circuit. The image correcting circuit and instruction information feeding circuit precede the standard adjusting circuit.

BRIEF DESCRIPTION OF THE DRAWINGS

The objects and features of the present invention will become more apparent from consideration of the following detailed description taken in conjunction with the accompanying drawings in which:

FIG. 1 shows how FIGS. 1A and 1B are combined;

FIGS. 1A and 1B are schematic block diagrams showing a digital camera to which an image control device embodying the present invention is applied;

DESCRIPTION OF THE PREFERRED EMBODIMENTS

Figure 2:
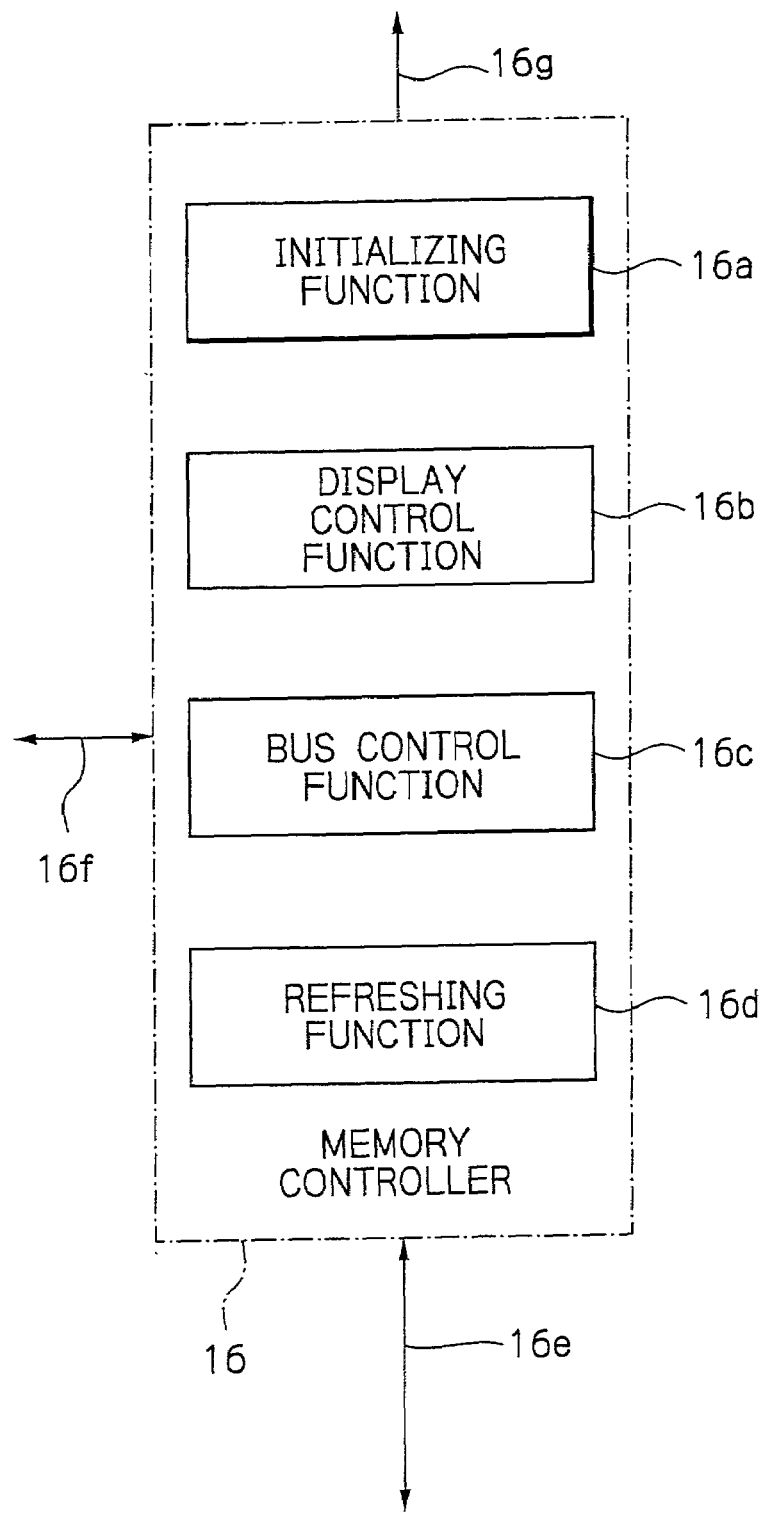
FIG. 2 is a schematic block diagram showing functions available with a memory controller shown in FIG. 1B.

Referring to FIGS. 1A and 1B, an image control device embodying the present invention is shown and applied to a digital camera. As shown, the digital camera, generally 10, includes a lens system 10A, a driver 10B, a TG (Timing signal Generator) 10c, an image pickup 10d, a preprocessor 10e, signal processor 10f, a storage 10g, and an image control processing section 10h. Constituents not relevant to the understanding of the present invention are not shown in FIGS. 1A and 1B and will not be described specifically. Signals are designated by reference numerals attached to connect lines on which they appear.

Figure 28:
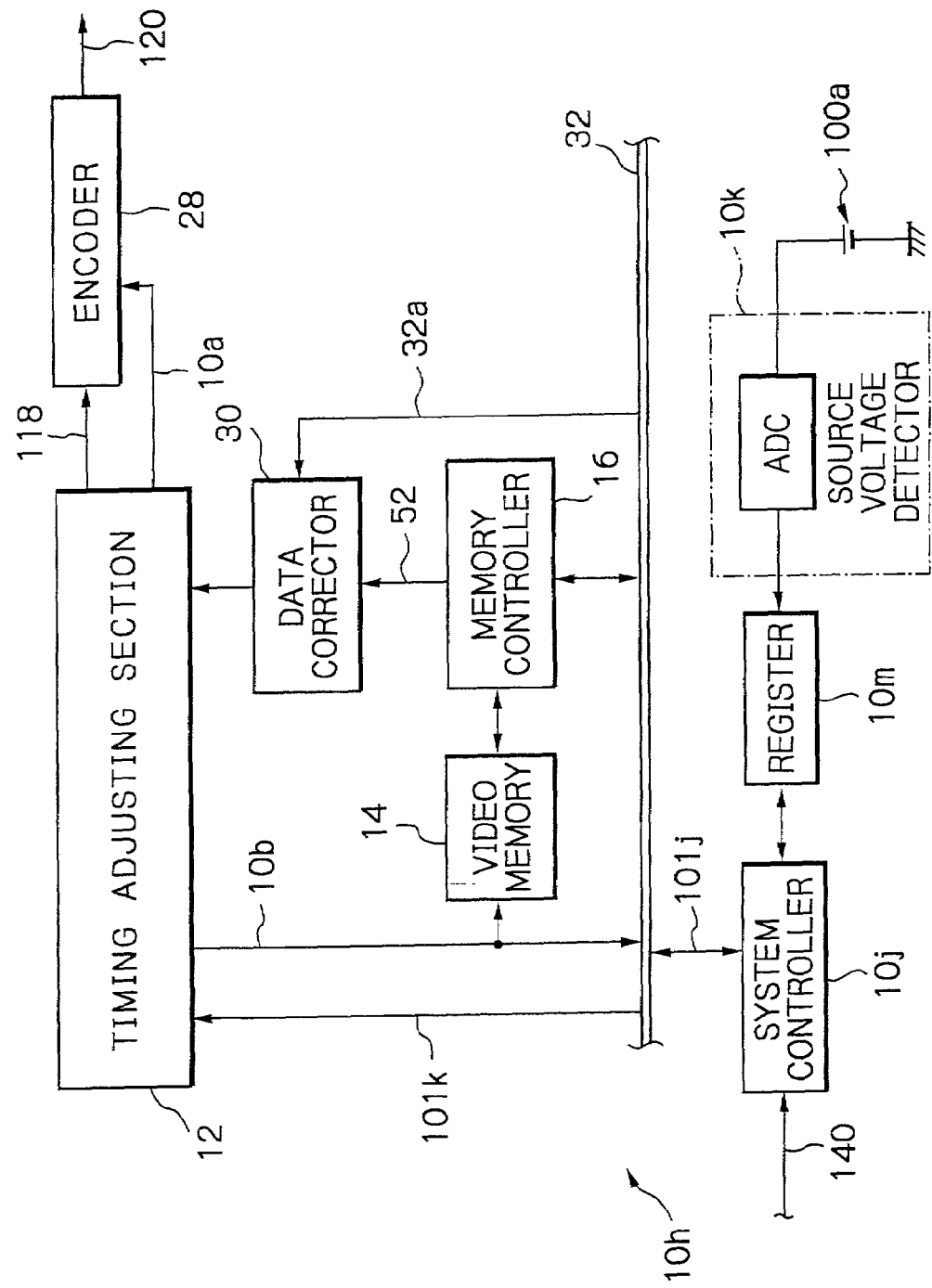
FIG. 28 is a schematic block diagram showing an alternative embodiment of the present invention.

As shown in FIG. 1A, the lens system 10A is made up of, e.g., a plurality of optical lenses not shown. The lens system 10A includes a zoom mechanism and an AF (Automatic Focus) mechanism although not shown specifically. The zoom mechanism controls the positions of the lenses and therefore a view angle in accordance with a signal output from an operation panel not shown. The AF mechanism automatically focuses the camera 10 on a desired subject in accordance with a distance between the camera 10 and the subject. More specifically, as shown in FIG. 28, a signal 140 output from the operation panel is input to a system controller 10j, as will be described specifically later. A driver 10B feeds a plurality of different drive signals to the lens system 10A although not shown specifically.

The driver 10B includes a V (vertical) driver, a discard signal generating circuit and a transfer signal generating circuit although not shown specifically. The TG 10c feeds various timing signals to the driver 10B. In a usual exposure mode, the V driver generates a trilevel signal, i.e., a high (H), a medium (M) or a low (L) level signal for the vertical transfer of signal charges. Also, the V driver feeds a bias voltage to each device that should perform photoelectric transduction. The TG 10c delivers timing signals including field shift gate pulses to the image pickup 10d via the V driver as signals relating to vertical drive. The discard signal generating circuit feeds a discard signal to the image pickup 10d in order to release needless signal charges to a circuit board via reset drains and overflow drains, as needed.

The transfer signal generating circuit generates a vertical transfer signal $\square$V, a horizontal transfer signal $\square$H and a reset pulse □R as transfer signals. The image pickup 10d includes a solid-state image sensor 101C in which transfer registers are formed. The transfer signal generating circuit sequentially executes the field shift of signal charges stored in the devices of the image sensor 101C to the transfer registers, the transfer of the signal charges within the transfer registers based on multiphase drive, and the line shift of the signal charges. Also, the transfer signal generating circuit discards the signal charges stored in the devices of the image sensor 101C at a preselected timing by feeding reset pulses. In this manner, the image pickup 10d operates in accordance with the timing signals and drive signals output from the TG 10c and driver 10B, respectively. The TG 10c delivers particular timing signals to each of the preprocessor 10e and signal processor 10f as well.

The operation panel includes a shutter release button and a function for allowing the operator of the camera 10 to select a desired item on a monitor, although not shown specifically. The shutter release button has two stepwise positions, i.e., a half-stroke position S1 and a full-deep position S2. When the operator pushes the shutter release button to the half-stroke position S1 or the full-stroke position S2, the camera 10 operates in a preparatory mode or a camera mode, respectively. The operation panel informs the system controller 10j of the mode set up by sending the signal 140 (see FIG. 28).

In the preparatory mode, the system controller 10j executes AF drive control with the lens system 10A. Specifically, the system controller 10j determines, based on the input signal 140, a direction in which the lenses of the lens system 10A should be shifted in accordance with focus servo control. The system controller 10j then feeds a control signal to an AF drive controller, not shown, in order to shift the lenses of the lens system 10A in the above direction. The AF drive controller feeds a drive signal based on the control signal to a shifting mechanism associated with the lens system 10A. As a result, the lens system 10A is shifted to an optimal focal position.

Further, in the preparatory mode, the system controller 10j feeds to an AE (Automatic Exposure) controller, not shown, control signals and data representative of a lens opening and a shutter speed (exposure time) based on an estimated AE value. The AE controller outputs drive signals in accordance with the control signals and data that are meant for an iris mechanism and a mechanical shutter, not shown. As for the estimated AE value, a signal charge is read out of each of a plurality of portions or a center portion of the image pickup 10d as a photometry signal. The photometry signal is fed to the signal processor 10f via the preprocessor 10e. The signal processor 10f processes an input digital signal in accordance with the photometry signal.

The image pickup 10d includes an optical low-pass filter 101a and a color filter 101b in addition to the image sensor 10c. The optical low-pass filter 101a limits the spatial frequency of incident light to below the Nyquist frequency. The color filter 101b has color filter segments of three primary colors R (red), G (green) and B (blue) arranged in a preselected pattern. The color filter segments each face a particular photosensitive cell of the image sensor 101c. The arrangement of the color filter 101b is therefore dependent on the arrangement of the photosensitive cells of the image sensor 10c. For example, when the photosensitive cells are arranged in a honeycomb pattern by being shifted by a single pixel from each other, the color filter segments may be arranged in a G square, RB full-checker pattern. If desired, the R, G and B filter segments may be replaced with filter segments of complementary colors, in which case conversion of complementary colors to primary colors will be executed in a signal processing stage to follow.

The image sensor 101c may be implemented as a CCD (Charge Coupled Device) image sensor or a MOS (Metal Oxide Semiconductor) image sensor. In the illustrative embodiment, the image sensor 101c is implemented as a CCD image sensor and converts incident light to signal charges. In the image sensor 101c, the photosensitive cells are bidimensionally arranged in vertical and horizontal arrays while being spaced from each other by a pitch corresponding to a pixel pitch. More specifically, in the honeycomb pattern, nearby photosensitive cells are shifted from each other by half a pitch in the vertical and horizontal directions. As for the honeycomb pattern, vertical transfer registers for vertically transferring signal charges are formed in, e.g., a zigzag configuration so as to skirt round nearby photosensitive cells.

The image sensor 101c additionally includes horizontal transfer registers arranged in an array perpendicular to the arrays of vertical transfer registers. The horizontal transfer registers transfer the signal charges input via the vertical transfer registers toward an output amplifier. The output amplifier converts the signal charges (Q) to voltages (V). The image sensor 101c executes exposure based on actual incident light, transfer of the signal charges, resetting of the photosensitive cells and so forth in accordance with the drive signals output from the driver 10B. The image pickup 10d feeds the resulting image signal 101d to the preprocessor 10e.

The preprocessor 10e includes a CDS (Correlated Double Sampling) circuit, an amplifier, a clamper, a preliminary white balance control circuit, a color separating circuit and an ADC (Analog-to-Digital Converter) although not shown specifically. The preprocessor 10e is controlled by the system controller 10j although not shown specifically, and operates in accordance with various timing signals output from the TG 10c. The CDS circuit removes low-frequency noise components from an input signal. The amplifier executes AGC (Automatic Gain Control) with the noise-free signal to thereby shape the waveform of the signal. The damper fixes the wave-shaped signal at a preselected reference level. The preliminary white balance control circuit executes preliminary white balance control with the clamped signal in accordance with, e.g., the output of a white balance sensor for optical control. This white balance control should preferably be executed by taking account of the primary colors or the complementary colors. The color separating circuit separates R, G and B contained in the signal subjected to white balance adjustment. The ADC converts the color-by-color analog signals to digital signals 101e and feeds the digital signals 101e to the signal processor 10f.

The signal processor 10f is implemented as an RISC (Reduced Instruction Set Computer) chip including a preprocessing buffer, an image processing circuit, a DAC (Digital-to-Analog Converter), a PLL (Phase Locked Loop) circuit and a compander although not shown specifically. The signal processor 10f receives a control signal 101j from the system controller 10j.

The preprocessing buffer includes, e.g., a lookup table for gamma correction. The preprocessing buffer receives and temporarily stores the digital image data 101e and executes gamma correction with the stored image data by using the lookup table. Assume that the image sensor 101c of the image pickup 10d has a honeycomb configuration. Then, the image processing circuit generates, based on the image data subjected to gamma correction, R, G and B pixel data by interpolation at positions where pixels actually exist (real pixels) and positions where they are absent (virtual pixels). The image processing circuit generates high luminance data YH, which contain high-frequency components, in addition to the R, G and B pixel data and then executes matrix processing with the resulting image data to thereby output image data, i.e., a luminance signal Y and color signals $C_r$ and $C_b$.

In the preparatory mode or a movie mode, the image processing circuit reduces, or thins, the image data subjected to gamma correction to thereby output the image data Y, $C_r$ and $C_b$. In the camera mode or a still picture mode, the image processing circuit increases the number of pixels by interpolation to thereby output the image data Y, $C_r$ and $C_b$. The image processing circuit adjusts the above image data by taking account of the mode, the number of pixels available with the monitor and so forth. The image processing circuit delivers the reduced image data to the image control processing section 10h while delivering the processed image data to the DAC. The DAC converts the image data to analog signals and feeds the analog signals to the monitor.

The PLL circuit receives a clock, not shown, from the signal generating circuit, multiplies the clock while controlling its phase, and thereby generates a desired frequency to be used in the signal processor 10f. The PLL circuit feeds a signal whose frequency matches a required operation speed to each section of the signal processor 10f. The compander is made up of an encoding circuit and a decoding circuit. The encoding circuit compresses the image data in accordance with, e.g., JPEG (Joint Photographic Experts Group) standards using orthogonal transform. The decoding circuit expands the compressed image data to thereby restore the original image data. In a record mode, the compander feeds the compressed data, labeled 101f, to the storage 10g through a bus 32 and a signal line 101g under the control of the system controller 10j. In a play mode, the compander reads the compressed data out of the storage 10g through the signal line 101g and bus 32 and expands them. At the time of compression or expansion, the preliminary buffer may temporarily store the image data, if desired. The expanded image data appear on the monitor through the image control processing section 10h and DAC.

As stated above, the signal processor 10f generates image data by image processing and delivers not only compressed data but also data based on the previously stated function to the various sections over the bus 32.

The storage 10g basically has a function of recording image data in a recording medium and a function of reading them out of the recording medium. For the storage 10g, use is made of an interface based on ATA (AT Attachment) standards, which belong to a family of hard disk interfaces. The storage 10g is loaded with a Smart Media (trade name) or similar semiconductor memory, a magnetic disk, an optical disk or similar recording medium. When use is made of a magnetic disk or an optical disk, the storage 10g includes a circuit for modulating image data and a head for writing the image data.

As shown in FIGS. 1A and 1B, the image control processing section 10h includes a timing adjusting section 12, a video memory 14, a memory controller 16, a bus arbitrator 18, a display sequencer 20, a CPU 22, a DMA (Direct Memory Access) controller 24, a signal input 26, an encoder 28, a data corrector 30, and an outside interface (I/F) 31. The image control processing section 10h adequately reads image data out of the video memory 14 in accordance with, e.g., broadcast standards while transferring them to a display unit. Generally, the image control processing section 10h should preferably be installed not only in the digital camera 10 but also in an image processing unit, image display unit, printer or similar imaging apparatus. It is preferable to implement the image control processor 10f as a chip like the signal processor 10f.

The constituents mentioned above are controlled by the system controller 10j, which will be described later. The control function of the system controller 10j may be assigned to the CPU 22, if desired.

In the illustrative embodiment, the CPU 22 outputs instruction data 32a representative of the kind of processing to be applied to the image data, as will be described specifically later. The memory controller 16 controls the timing adjusting section 12, video memory 14, bus arbitrator 18, and display sequencer 20. In addition, the memory controller 16 responds to commands that may be output from the bus arbitrator 18 and display sequencer 20 as well as from an outside control device. In the illustrative embodiment, the outside control device includes the DMA controller 24, signal input 26, and outside I/F 31.

Figure 4:
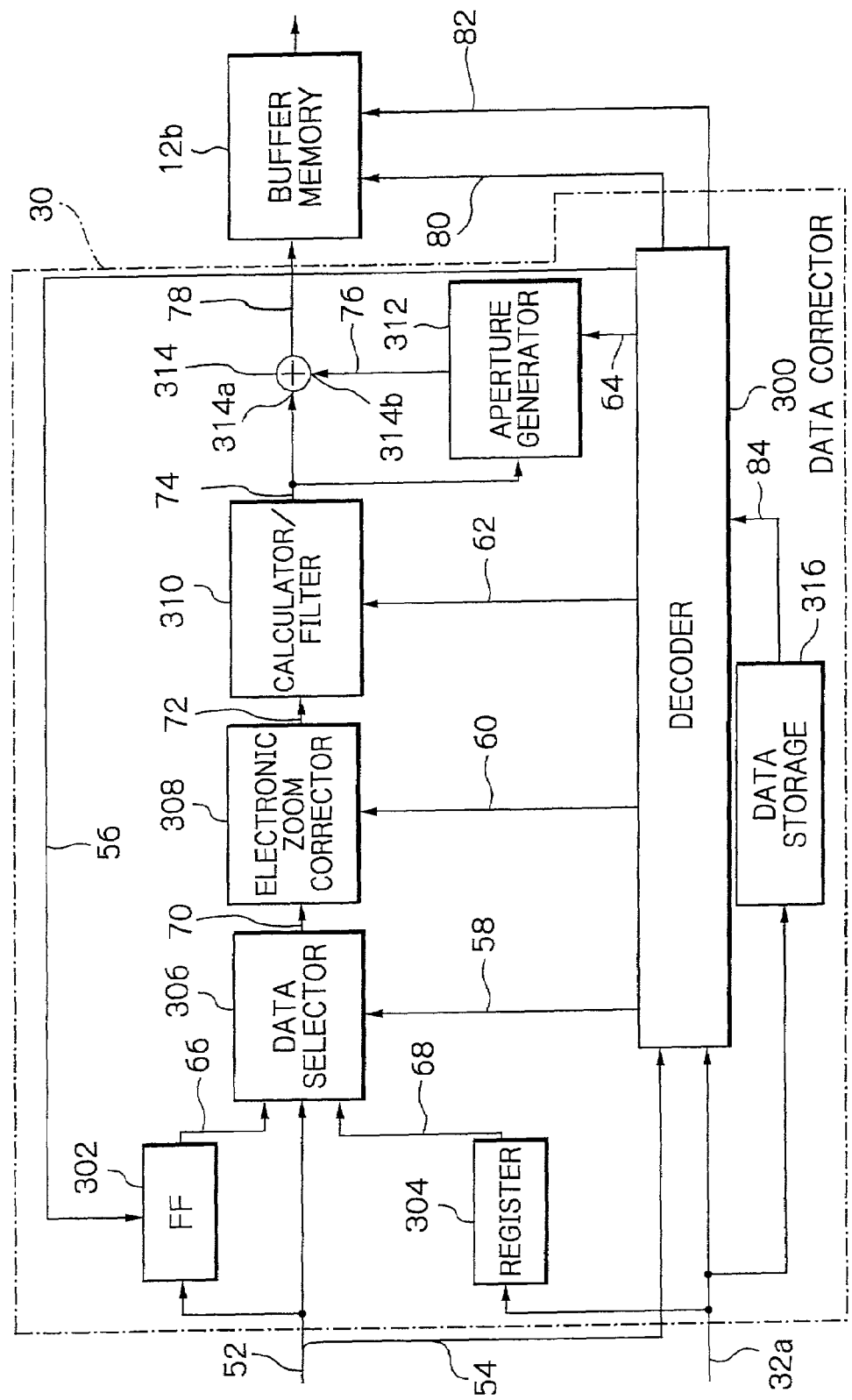
FIG. 4 is a schematic block diagram showing a specific configuration of a data corrector shown in FIG. 1B.

In the image control processing section 10h, the memory controller 16, bus arbitrator 18, display sequencer 20, CPU 22, DMA controller 24, signal input 26 and outside I/F 31 are connected to the bus 32. In the illustrative embodiment, the width of the bus 32 is extended and/or an independent, exclusive line is added. This allows, e.g., the instruction data 32a contained in information particular to the CPU 22 to be delivered in addition to the image data while implementing the control, as will be described in detail later. In FIG. 1B, a signal line 32a branching off the bus 32 is representative of the exclusive line. FIG. 4 shows the extension of the bus width.

More specifically, the timing adjusting section 12 includes a timing signal generator 12a and a buffer memory 12b. The timing signal generator 12a includes two oscillators, not shown, for generating a first and a second clock 10a and 10b, respectively. In the illustrative embodiment, the first and second clocks 10a and 10b are respectively implemented by a clock $4f_{sc}$ often applied to broadcast standards and a clock higher in frequency than $4f_{sc}$. The clock $4f_{sc}$ has a frequency that is, e.g., four times as high as a subcarrier frequency $f_{sc}$ of 3.579545 MHZ used in the NTSC (National Television System Committee) system, i.e., 14.31818 MHZ.

The first clock 10a is fed to the buffer memory 12b as well as to the encoder 28, which encodes the image data output from the buffer memory 12b. The second clock 10b may have any desired high frequency higher than the frequency of the first clock 10a. In the illustrative embodiment, the second clock 10b has a frequency close to 50 MHZ. The second clock 10b is fed to the buffer memory 12b, video memory 14, and display sequencer 20 as well as to the other constituents through the bus 32 although not shown specifically.

When use is made of a frequency that is a multiple of the subcarrier frequency, the timing adjusting section 12 may use a clock produced by dividing the second clock in order to reduce the number of oscillators. It is not necessary that the first and second clocks 10a and 10b be synchronous to each other.

The buffer memory 12b includes a plurality of FIFO (First-In First-Out) memories not shown. While one of the FIFO memories is outputting data, one horizontal line of data of the video memory 14 are written to the other FIFO memory or memories. That is, at least two FIFO memories capable of storing two lines are used although not limitative. The buffer memory 12b will be described more specifically later.

The video memory 14 is implemented by an SDRAM (Synchronous Dynamic Random Access Memory) or a DRAM (Dynamic RAM). To deal with massive image data, the video memory 14 is constituted by a plurality of banks. When the video memory 14 is implemented by an SDRAM, the memory 14 can be controlled bank by bank because of an access system using commands, e.g., request signals. Further, the SDRAM implements a bank-by-bank interleaving function in addition to the function of an ordinary DRAM. The second clock 10b is input to the video memory 14, as stated earlier.

The memory controller 16 controls the input and output of image data from the video memory 14 and outputs a refresh request (REF_REQP=(logical) ONE) meant for the video memory 14. The memory controller 16 includes a refresh timer for a refreshing purpose. As shown in FIG. 2, the memory controller 16 includes, e.g., an initializing function 16a, a display control function, a bus control function 16c and a refreshing function 16d, so that it can initialize itself and control the other sections connected thereto.

The memory controller 16 is connected to the bus 32 by a signal line 16e. The memory controller 16 inputs and outputs image data from the video memory 14 via a signal line 16f while controlling the data input and output. Further, the memory controller 16 is connected to the buffer memory 12b by a signal line 16g. The signal line 16g includes image data and control data fed via the signal line 16e and various control signals for controlling the buffer memory 12b. The functions 16a through 16d shown in FIG. 2 include a procedure representative of hardware and software processing based on preselected conditions.

The initializing function 16a initializes its various sections to preselected conditions, or parameters, when the image control processing section 10h is switched on for the first time or at the time of buildup after resetting.

The display control function 16b causes, in response to a command, image data to be read out by taking account of a reading order. In the illustrative embodiment, the bus control function 16c allows the various functions other than the bus control function 16c, i.e., the initializing function 16a, display control function 16b and refreshing function 16d as well as the writing and reading functions of an outside CPU, not shown, and the DMA function of the DMA controller 24 to selectively occupy the bus 32 in accordance with a preselected priority order. The bus control function 16c outputs information for enabling one of the above functions. The refreshing function 16d refreshes the video memory 14 in response to information output from the refresh timer.

Referring again to FIGS. 1A and 1B, the bus arbitrator 18 outputs, based on the priority order, information indicative of whether or not the function enabled by the bus control function 16c is allowable. The bus arbitrator 18 is connected to the display sequencer 20, CPU 22, DMA controller 24, signal input 26 and outside I/F by input/output lines. More specifically, the bus arbitrator 18 examines information representative of a bus occupation request in accordance with the priority order and then feeds information representative of allowance to the function, which has output the request. The image control processing section 10h gives highest priority to the refreshing function 16d of the memory controller 16. The priority order will be described in detail later.

Figure 3:
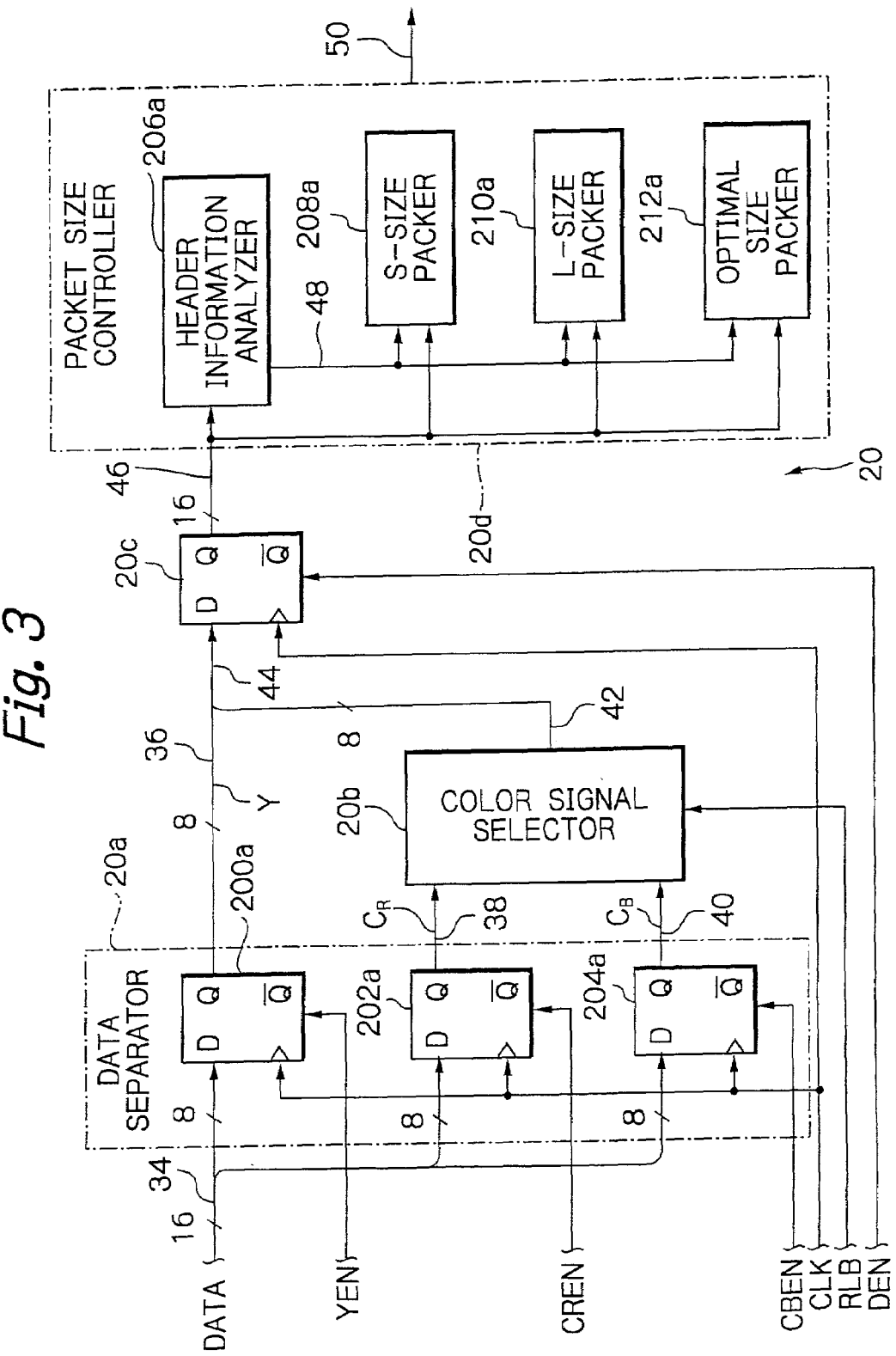
FIG. 3 is a schematic block diagram showing a specific configuration of a display sequencer shown in FIG. 1A.

As shown in FIG. 3 specifically, the display sequencer 20 includes a data separator 20a, a color signal selector 20b, a pair generator 20c, and a packet size controller 20d. The display sequencer 20 starts operating in response to a request signal (DISP_REQ) input thereto. The data separator 20a includes three data latches 200a, 202a and 204a each for latching eight of sixteen bits of image data 34 fed from the video memory 14.

More specifically, data latch 200a latches eight bits of the above data at the positive-going edge of a clock CLK during the enable period of a luminance enable signal YEN, while outputting latched data at the above edge of the clock CLK. These eight bits of data are luminance data Y (36). The other eight bits of data are input to each of the other data latches 202a and 204a. The data latch 202a latches the data at the positive-going edge of the clock CLK during the enable period of a color R enable signal CREN, while outputting latched data at the above edge of the clock CLK. The data latch 204b operates in the same manner as the data latch 202a except that is receives a color B enable signal CBEN. The data latch 200a delivers the luminance data 36 separated and temporarily latched during the consecutive enable periods to the pair generator 20c. The data latches 202a and 204a respectively deliver color data $C_R$ and $C_B$ separated and latched in the same manner to the color signal selector 20b.

In response to an enlarged/reduced display request or a ×1 or equi-scale request, the color signal selector 20b selects either one of the color data $C_R$ and $C_B$ capable of being paired with the luminance data Y and delivers the color data selected to the pair generator 20c. A color select signal RLB is input to the color signal selector 20b for color selection. The operation of the color signal selector 20b, including a color selection timing, will be described in detail later.

The pair generator 20c, which is also implemented as a data latch, receives the eight-bit luminance data Y (36) and either one of the eight-bit color data $C_R$ and $C_B$ (42), i.e., sixteen-bit image data 44. The pair generator 20c latches the sixteen-bit image data 44 at the positive-going edge of the clock CLK during the enable period of a data enable signal DEN. At the same time, the pair generator 20c outputs image data 46 latched at the positive-going edge of the clock CLK to the packet size controller 20d.

The packet size controller 20d includes a header information analyzer 206a, an S-size packer 208a, an L-size packer 210a, and an optimal size packer 212a. The header information analyzer 206a analyzes the size of the entire picture, date and other information attached to, e.g., the head of the image data 46. If the analyzed size is not a usual size, then the analyzer 206a outputs a code 48 that enables one of the S-size packer 208a, L-size packer 210a and optimal size packer 212a. The image data 46 are input to the S-size packer 208a, L-size packer 210a and optimal size packer 212a as well. If the picture has the usual size, then the analyzer 206a directly outputs the input image data 46 without varying the division of the image data 46.

If desired, the packet size controller 20d may additionally include a circuit for dealing with the usual size or M size so as to classify image sizes to S size, M size and L size, as will be described specifically later.

Assume that the header information analyzer 206a determines that a single pattern should be repeatedly displayed. Then, the S-size packer 208a sets the S size smaller than the usual size and then packs the image data 46, i.e., varies the division of the image data 46. In addition, the S-size packer 208a sets the address of the memory that is the destination of the image data 46. While the S-size packer 208a may repeatedly output a picture packed in the S size, it may alternatively feed the S-size image first and then feed only the number of times of copying of the same image.

When the header information analyzer 206a determines that the picture should be displayed in the form of a thumbnail, the L-size packer 210a sets the L size larger than the usual size, packs the image data, and sets the address of the destination. More specifically, because a thumbnail picture is small size, the L-size packer 210a sets the L size so as to effect only one time or a minimum number of times of transfer, thereby reducing the number of times of access during writing.

The optimal size packer 212a optimizes the packing size by taking account of the spatial frequency of the picture. For example, a picture of a sand dune has a low spatial frequency while a picture of a building or similar subject needing clear details has a high spatial frequency. The optimal size packer 212a controls the packing size in proportion to such a difference in spatial frequency. The optimal size packer 212a also sets the address of the destination of the image data.

The display sequencer 20 with the above configuration allows a pair of luminance data and color data to maintain a preselected relation (4:2:2 in the illustrative embodiment) without regard to a display request. Further, the display sequencer 20 packs the image data 46 by taking account of the analyzed header information of each image data. This successfully reduces the period of time over which the display sequencer 20 occupies the bus 32 or the number of times of access to the bus 32.

In the illustrative embodiment, the display sequencer 20 produces, on a single line, eighty image packets each containing eight image data under the control of the memory controller 16. Further, the display sequencer 20 packets control data relating to the outside DMA reading/writing, control data relating to the reading/writing of the CPU 22, and image data to be interchanged with the outside I/F 31. Such packets are written to the video memory 14 either directly or indirectly via the bus 32 and memory controller 16. Thereafter, the packets are read out of the video memory 14 and input to the data corrector 30.

FIG. 4 shows a specific configuration of the data corrector 30. As shown, the data corrector 30 includes a decoder 300, a flip-flop (FF) 302, a register 304, a data selector 306, an electronic zoom corrector 308, a calculator/filter 310, an aperture generator 312, an adder 314, and a data storage 316. The decoder 300 receives image data 52 via the memory controller 16 and at least one of data 54 representative of the number of valid pixels independent of the data size or packet size and instruction data 32a, which is output from the CPU 22. The decoder 300 feeds control signals 56 through 64 to the FF 302, data selector 306, electronic zoom corrector 308, calculator/filter 310 and aperture generator 312, respectively.

When the control signal (enable signal) input to the FF 302 is in an ON state, the FF 302 latches the image data or packet data 52 at the edge of the second clock 10b and then outputs the image data to the data selector 306 at the next edge of the clock 10b. The FF 302 may therefore hold the latched image data 52 when the control signal 56 goes OFF and outputs it at a desired enable timing later. In the illustrative embodiment, the FF 302 simply outputs the image data 52 to the data selector 306 in response to every clock pulse. It is to be noted that the feed of the second clock 10b to the FF 302 and register 304 is not indicated in FIG. 4.

The register 304 stores the instruction data 32a output from the CPU 22. The instruction data 32a relates to, e.g., the background of a picture. Having a capacity corresponding to a packet size, the register 304 operates at the same timing as the FF 302.

The data selector 306 includes a one-line memory used to select and copy data. In the illustrative embodiment, the data selector 306 selects one of the output 66 of the FF 302, the output 68 of the register 304, and the image data 52 directly input thereto. The data selector 306 receives an enable signal 58 from the decoder 300, a select signal for causing the selector 306 to select one of the above three kinds of input data, and information indicative of the address for storing the data selected.

Assume that the data selector 306 with the above function designates a leading address position where the image data 52 is originally expected to be stored, and stores the output 66 of the FF 302 by designating the address of the one-line memory that is one-half of the entire memory capacity. Then, despite that only half a line of data is input to the data selector 306, the data selector 306 doubles the amount of data to thereby fill up one line as if the data were copied.

Figure 27:
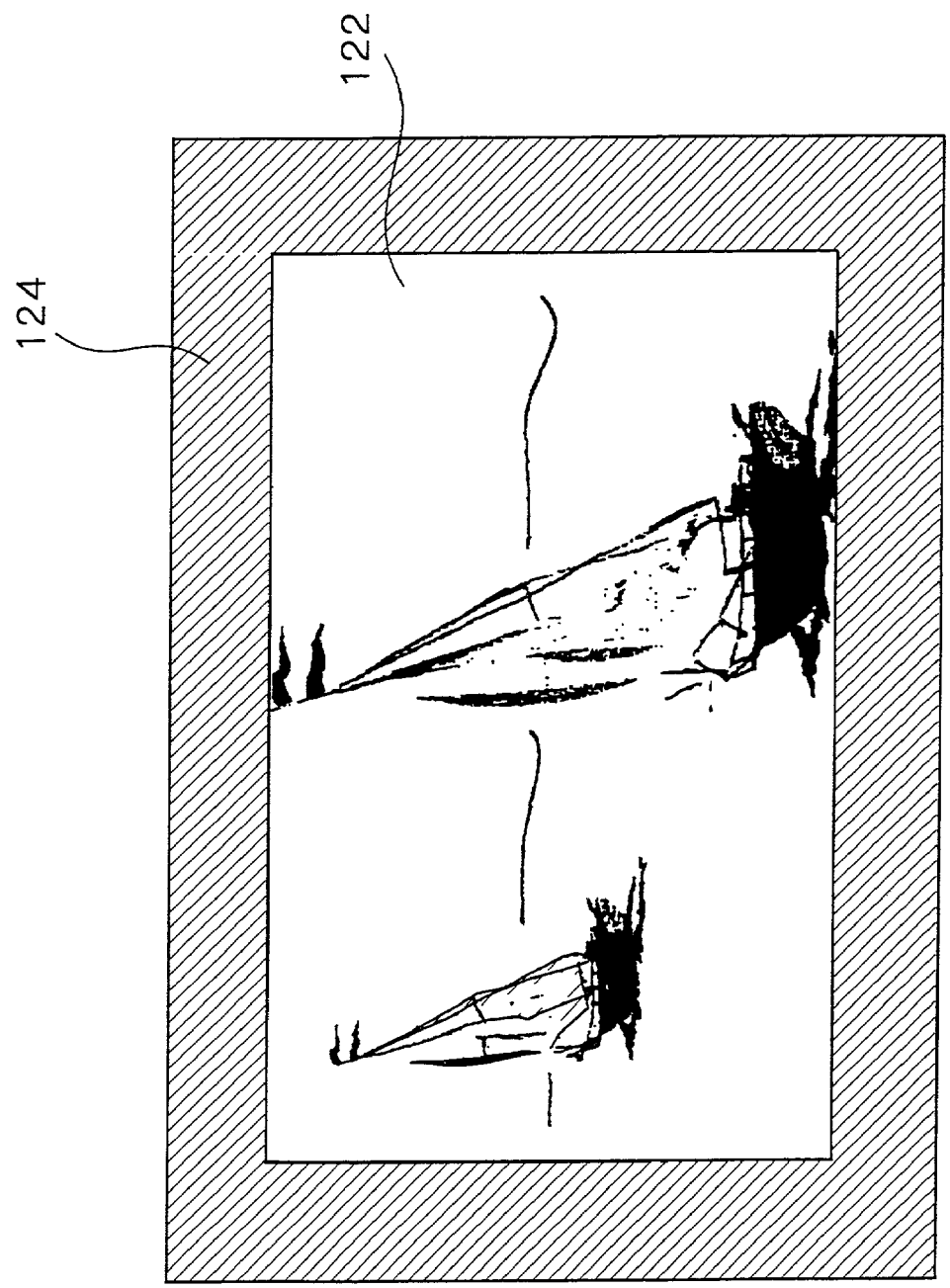
FIG. 27 shows a specific picture displayed by the illustrative embodiment.

On the other hand, assume that the data selector 306 selects and stores, in response to an address indication, the data 68 output from the register 304 in place of the peripheral data of a picture. Then, as shown in FIG. 27 specifically, a picture appears as if it were put in a frame. Further, when the decoder 300 analyzes a picture corresponding to the S-size division, the decoder 300 may feed the control signal 58 to the data selector 306 for causing it to copy the input packet data the designated number of times. This successfully increases the amount of data. In any case, the data selector 306 delivers the resulting packet data 70 to the electronic zoom corrector 308. Assume that the decoder 300 receives image data corresponding in amount to a quotient produced by dividing a data size by a value indicated by valid pixel number information. Then, the control signal 58 output from the decoder 300 causes the data selector 306 to repeatedly copy such an amount of image data a number of times that is the reciprocal multiple of the above quotient.

The electronic zoom corrector 308 corrects the processed electronic zooming packet by packet, as will be described in detail later. The decoder 300 feeds a control signal to the electronic zoom corrector 308 in accordance with the result of analysis. In response, the corrector 308 corrects the individual packet and applies, only when it performs packet-by-packet correction, distortion correction and special effect processing to the packets; otherwise, the corrector 308 simply passes the packet data therethrough. Packet-by-packet correction makes it needless to correct packets not needing correction, thereby obviating wasteful signal processing and promoting efficient correction. The corrector 38 delivers packet data 72 corrected or not corrected to the calculator/filter 310.

The calculator/filter 310 includes a calculating circuit and a filtering circuit although not shown specifically. The calculating circuit varies at least one of the lightness, contrast and noise level of the individual packet data. The filtering circuit executes special effect processing. When the filtering circuit is implemented by a digital filter, the circuit may be regarded as a calculating circuit. The calculator/filter 310, like the electronic zoom corrector 308, may handle the input data packet by packet in accordance with a control signal 62 fed from the decoder 300.

For noise reduction in particular, the calculator/filter 310 may execute coring or low-pass filtering for deleting the low-tonality portions of a picture. The special effect available with the calculator/filter 310 may be tessellation by way of example. Further, to vary lightness particular to the individual packet data, the calculator/filter 310 may render, e.g., only the upper half of a picture as reddish as an evening glow.

The calculator/filter 310 simply passes the packet data therethrough when the control is in an OFF state. Packet-by-packet correction has the advantage stated earlier in relation to electronic zoom correction. The calculator/filter 310 delivers packet data 74 corrected or not corrected to the aperture generator 312 and one input terminal 314a of the adder 314.

The aperture generator 312 generates an aperture for the input image data by either one of hardware or software. Specifically, the aperture generator 312 includes a circuit or a procedure customarily used for contour enhancement. The decoder 300 analyzes, based on the instruction data 32a, information included in the packet-by-packet information and indicating how the sharpness of the individual packet should be dealt with. The decoder 300 feeds a control signal 64 representative of the result of analysis to the aperture generator 312. In response, the aperture generator 312 feeds a signal component 76 generated to the other input terminal 314b of the adder. The aperture generator 312 executes no processing when the control is in an OFF state.

The adder 314 adds the packet data 74 and the signal component 76 input thereto. Therefore, when an aperture is generated, the adder 314 enhances the sharpness of the packet data 78 and then feeds the packet data 78 to the buffer memory 12b. At this instant, the decoder 300 handles the address (information) represented by the instruction data 32a or the image data 54 as an independent parameter and feeds a generated address 80 to the buffer memory 12b. Further, the decoder 300 feeds an enable signal 82 to the buffer memory 12b. The input image data can therefore start being displayed at any region display region.

The data corrector 30 has been shown and described as operating in accordance with the instruction data 32a output from the CPU 22 every time data correction is executed. Alternatively, if processing to be executed is fixed, then the instruction data 32a may be stored in the data storage 316 beforehand. The data storage 316 is implemented by a ROM (Read Only Memory) or a RAM (Random Access Memory). When use is made of a ROM, a procedure for dealing with the instruction data and address information is written in the data corrector 30. When use is made of a RAM, the CPU 22 sets a data correction procedure and writes the instruction data in the RAM when the digital camera 10 (or image control processing section 10h) is switched on. The data storage 316 additionally stores, e.g., background data to be fed to the register 304.

The data storage 316 delivers instruction data 84 to the decoder 300 in accordance with a clock and a read enable signal although not shown specifically. In response, the decoder 300 outputs the previously stated control signals and an address.

Figure 5:
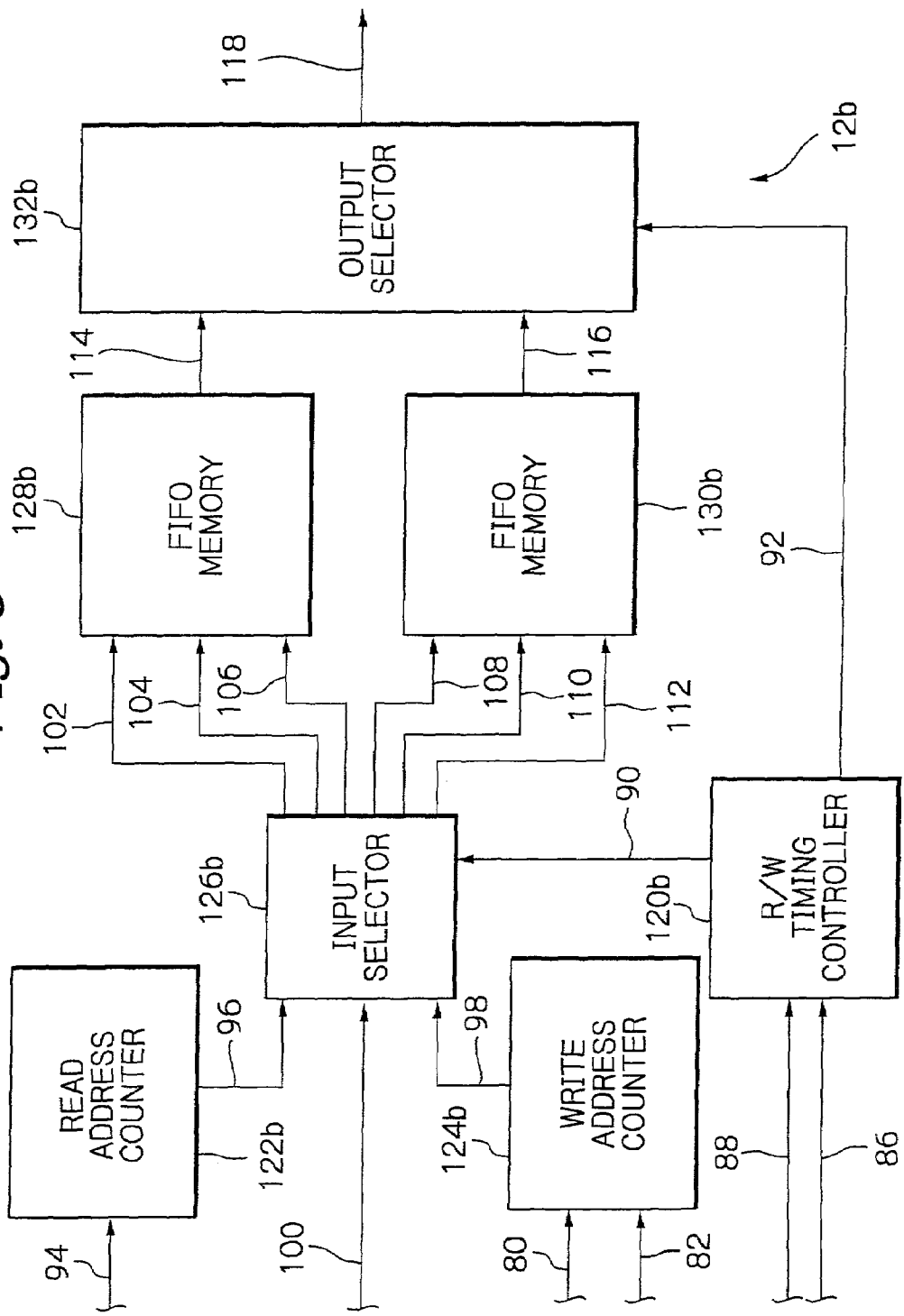
FIG. 5 is a schematic block diagram showing a specific configuration of a buffer memory shown in FIG. 1B.

FIG. 5 shows a specific configuration of the buffer memory 12b. As shown, the buffer memory 12b includes a R/W (Read/Write) timing controller 120b, a read address counter 122b, a write address counter 124b, an input selector 126b, FIFO memories 128b and 130b, and an output selector 132b. The buffer memory 12b additionally includes a R/W clock generator not shown.

The R/W timing controller 120b receives an enable signal 86 and a horizontal synchronizing (sync hereinafter) signal HD (88). The R/W timing controller 120b generates a control signal 90 and a select signal 92 in synchronism with the horizontal sync signal HD while delivering them to the input selector 126b and output selector 132b, respectively. The horizontal sync signal HD simply defines a timing at which data is written to one of the FIFO memories 128b and 130b while data is read out of the other of the same. More specifically, the R/W timing controller 120b generates the control signal 90 and select signal 92 in accordance with the actual read/write condition of the first clock 10a, a reset signal (RSTL) and a blank signal (FIFO_BLANK), although not shown specifically. The R/W timing controller 120b controls the input and output of data from the FIFO memories 128b and 130b in accordance with a bank selection condition. Further, the R/W timing controller 120b generates a signal (FIFO_BLKST) relating to the FIFO memories 128b and 130b and delivers it to the write address counter 124b, although not shown specifically.

The read address counter 122b, which is a ten-bit counter, counts read addresses and outputs the resulting count. The counter 122b receives various timing signals 94 including a horizontal and a vertical sync signal particular to a TV signal. The counter 122b counts consecutive read addresses in synchronism with the timing signal 94 while feeding a count 96 to the input selector 126b. The counter 122b may additionally generate a masking signal, not shown, on the basis of the first clock 10a, reset signal (RSTL) and blank signal (FIFO_BLANK). The masking signal masks data, so that only the image data are read out.

The write address counter 124b, which is also a ten-bit counter, counts write addresses and outputs the resulting count. The counter 124b receives the address data 80 and enable signal 82 from the decoder 300. The enable signal 82 allows the counter 124b to take in the address data 80 when an instruction indicative of the writing and reading of data in an address designated by the instruction data 32a, which is output from the CPU 22.

More specifically, when the enable signal 82 enables the write address counter 124b, the counter 124b takes in the address data 80 as the leading address of the destination and then counts up the successive addresses. At the same time, the counter 124b feeds the count to the input selector 126b as a write address 98 meant for either one of the FIFO memories 128b and 130b. When the enable signal 82 disenables the counter 124b, the counter 124b feeds the write addresses 98 to the input selector 126b in the same manner as the read address counter 122b counts up consecutive addresses in synchronism with the timing signal 94.

As for masking, a masked position stores other control data in the form of a packet and does not directly contribute to display. Masking is therefore significant in that essential image data are densely packed with the above control data being excluded. For more sophisticated control, the write address counter 124b additionally receives the reset signal (RSTL), a FIFO write enable signal (FIFO_WEL), a clock (M2CLK) and the signal (FIFO_BLKST) at the time of counting, although not shown specifically. The counter 124b generates various timing signals on the basis of the combination of such signals.

The input selector 126b receives the control signal 90, read address data 96, write address data 98 and packeted, sixteen-bit image data 100. The input selector 126b is connected to the FIFO memory 128b by an address line 102, a data line 104 and an enable line 106 and connected to the FIFO memory 130b by an address line 108, a data line 110, and an enable line 112. When the input selector 126b feeds a write enable signal to one of the FIFO memories 128b and 130b via associated one of the enable lines 106 and 112, the selector 126b feeds a read enable signal to the other FIFO memory via the other enable line. The write address data 98 and image data 100 fed to the input selector 126b are transferred to the FIFO memory 128b or 130b enabled to write. The read address data 96 also fed to the input selector 126b is transferred to the FIFO memory 128b or 130b enabled to read.

The other signals, not shown, will be briefly described hereinafter. The write enable signal (FIFO_WEL) is fed to the input selector 126b. While the write enable signal is in an ON state, the input selector 126b feeds a write disenable signal (F1_WEI) to the FIFO memory 128b or feeds a write disenable signal (F2_WEI) to the FIFO memory 130b in accordance with the control signal (bank select signal) 90, preventing the image data from being written to the FIFO memory disenabled to write. Further, the input selector 126b outputs signals (F1_V1 and F1_V2 not shown) for writing the image data in the FIFO memories 128b and 130b bit by bit. In addition, the input selector 126b feeds other various disenable signals to the FIFO memories 128b and 130b.

The FIFO memories 128b and 130b constitute a line memory each. A write clock and a read clock, not shown, are fed to the FIFO memories 128b and 130b such that when image data is read out of one memory, image data is written to the other memory. The sixteen-bit image data is input to both of the FIFO memories 128b and 130b. The FIFO memory 128b or 130b received the write disenable signal operates in a read mode. The image data is read out of the FIFO memory 128b or 130b operating in the read mode and is fed to the output selector 132b. The outputs 114 and 116 of the FIFO memories 128b and 130b, respectively, are connected to the output selector 132b such that either one of the memories 128b and 130b can operate in the read mode.

If desired, the two line memories 128b and 130b may be replaced with, e.g., sixteen line memories. In such a case, when a picture is to be displayed in the form of a thumbnail or similar small picture, the buffer memory 12b may replace part of the picture and feed only desired data to designated addresses in order to effect efficient display.

The output selector 132b selects either one of the input image data 114 and 116. In addition, the output selector 132b packets control data fed thereto together with the image data 114 or 116 selected. To implement these functions, the first clock 10a, a signal (DMASK), the control signal 90 and a reset signal are fed to the output selector 132b in addition to the image data 114 and 116, although not shown specifically. The output selector 132b produces a sequence of sixteen-bit data 118 by inserting packets, which contain data other than the image data as well, in a single line. The data 118 are output to the encoder 28, FIG. 1B.

The buffer memory 12b further includes a W/R clock generator not shown. The W/R clock generator generates a write/read clock that is one of clocks to be used in the buffer memory 12b. The W/R clock generator receives clocks (M2CLK) and (M4CLK) as well as the first clock 10a, second clock 10b and reset signal (RSTL). By using these signals, the W/R clock generator feeds a write clock (F_WCK) and a read clock (F_RCK) to the FIFO memories 128b and 130b although not shown specifically.

Referring again to FIGS. 1A and 1B, the CPU 22 not only controls the image control processing section 10h, but also plays the role of an outside CPU. The CPU 22 has a CPU writing function and a CPU reading function although not shown specifically. The CPU 22, which is one of outside control units included in the illustrative embodiment, delivers control information relating to write-in and control information relating to read-out over the bus 32. These control information correspond to the instruction data 32a. While the CPU 22 has been dealt with as an outside unit in the above respect, it may be included in the image control processing section 10h, if desired.

The DMA controller 24 hands over the control right to, e.g., the interface of a peripheral apparatus and directly controls data interchange between the interface and a main memory without the intermediary of the CPU 22. Control information relating to write-in and control information relating to read-out are input to and output from the DMA controller 24, which is another outside unit. These control data are transferred in accordance with the priority order relating to the bus 32.

The signal input 26 corresponds to the interface of the peripheral apparatus and may be implemented as a keyboard connected to the bus 32. Even information other than the image data is fed from the buffer memory 12b to the encoder 28 via the bus 32 under the control of the memory controller 16, as stated previously.

The encoder 28 executes encoding matching with preselected broadcast standards. Specifically, the encoder 28 selects only the image data to be displayed out of the input packets and encodes the image data. Encoded image data 120 are fed from the encoder 28 to a display not shown.

For the outside I/F 31, use may be made any one of a PIO (Programmed Input/Output), a UART (Universal Asynchronous Receiver-Transceiver), a USB (Universal Serial Bus), the IEEE (the Institute of Electrical and Electronics Engineers) 1394 standard and so forth. The PIO is an interface that allows input and output to be varied on a program basis. The UART is a device applicable to a serial interface and capable of converting parallel signals to a serial signal or converting a serial signal input from a serial device to parallel signals, as desired. The interface based on the IEEE 1394 standard supports the transfer of data of up to, e.g., 400 Mbps. This standard implements isochronous transfer and asynchronous transfer on the same bus at the same time. The outside I/F 31 operates under the control of the bus arbitrator 18, as stated earlier.

In the construction described above, the image control processing section 10h realizes the display of image data adaptive to high-speed processing. Particularly, the image control processing section 10h occupies the bus 32 over a period of time far shorter than conventional, promoting the easy access of the other control section or the outside apparatus to the memory. The digital camera 10 can therefore execute rapid-response processing.

Further, the image control processing section 10h can execute various kinds of signal processing with packeted image data. More specifically, the processing section 10h executes signal processing only with packets needing signal processing and thereby enhances efficiency. In addition, the signal processing insures high-quality pictures without increasing loads on system control. Moreover, even electronic zooming, e.g., enlargement or reduction allows image data to be sampled without disturbing the relation of pairs of data, obviating false colors.

How and why the individual constituent of the image control processing section 10h executes the respective processing will be described hereinafter. First, processing to be executed in an electronic zoom mode will be described. Assume that a single line is displayed by 640 pixels in the horizontal direction, and that the Y/C separated, color component data of image data each are sampled by a 4:4:4 sampling format shown in FIG. 6, (a). Then, one color data $C_R$ and one color data $C_B$ are associated with one luminance data Y; that is, four color data $C_R$ and four color data $C_B$ are associated with four luminance data Y.

Figure 6:
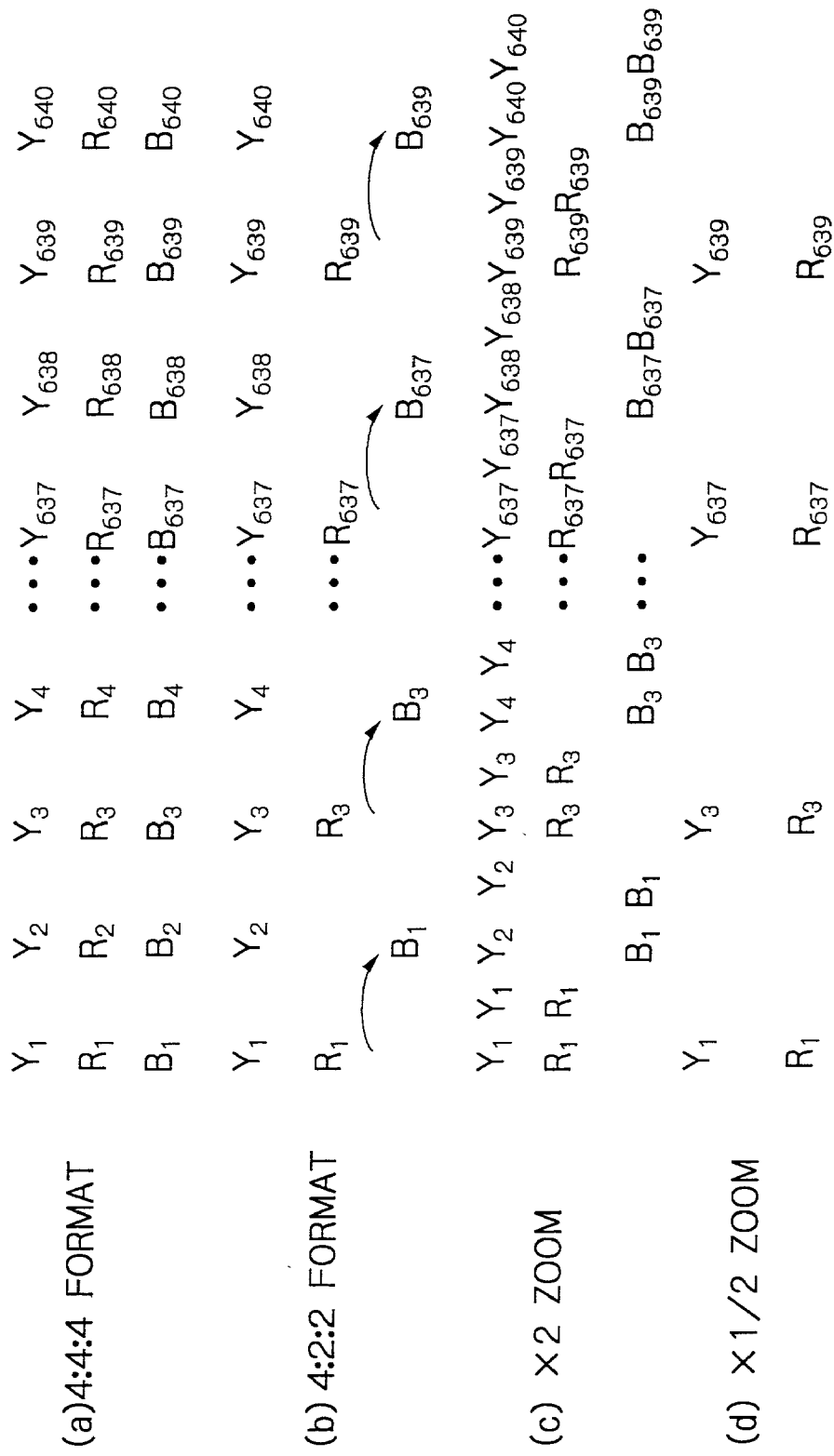
FIG. 6 shows some different sampling systems applicable to luminance data and two different color data that constitute image data in combination.

FIG. 6, (b), shows a 4:2:2 sampling format well known in the art. In this system, two color data $C_R$ and two color data $C_B$ are sampled for four luminance data Y. As shown in FIG. 6, (c), when a picture is enlarged by two magnifications (×2) by electronic zooming in accordance with the 4:2:2 sampling format, two identical image data are positioned in the pixel interval for display.

As shown in FIG. 6, (d), when a picture is reduced to one-half (×½) by electronic zooming in accordance with the 4:2:2 sampling format, only odd luminance data Y, for example, are sampled. In this case, only the color data $C_R$ are sampled, so that the color data $C_B$ are lost. On the other hand, when only even luminance data are sampled, the color data $C_R$ are lost, although not shown specifically. As a result, false colors appear in the picture being displayed.

In light of the above, the display sequencer 20 with the configuration of FIG. 3 samples the luminance data Y and color data C by using three pulses of the second clock 10b as a unit in a particular manner in each of three different cases, as will be described hereinafter. Use will be made of luminance data $Y_n$, $Y_{n+1}$ and $Y_{n+K}$ and color data $CR_n$ and $CB_n$ for the purpose of describing general sampling; suffixes n and K are representative of a natural number and a zoom coefficient, respectively.

Figure 7:
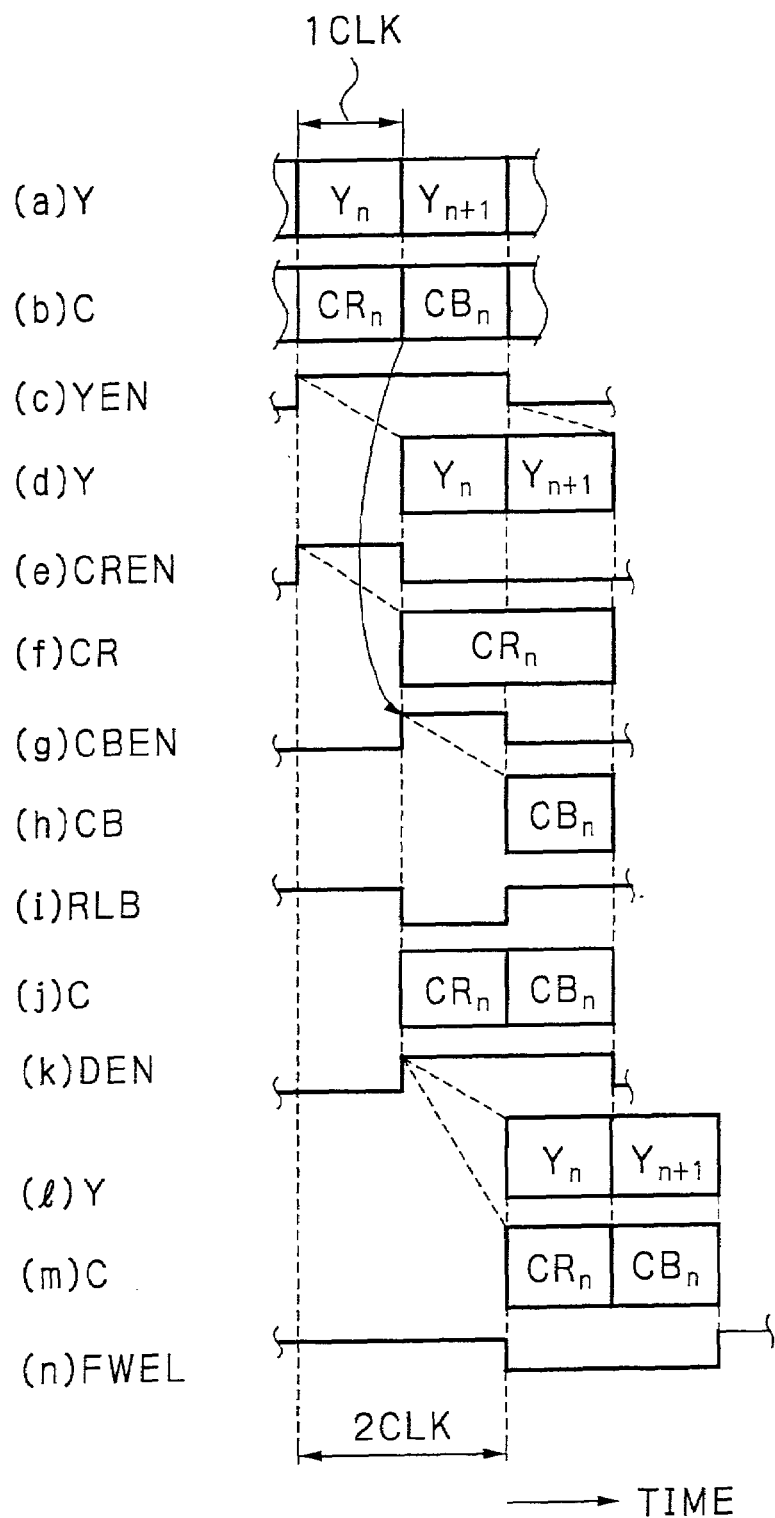
FIG. 7 is a timing chart demonstrating a procedure for maintaining the luminance data and color data sampled by a 4:2:2 ×1 or equi-scale processing in pairs.

First, when image data are continuously read out in the ×1 mode (K=1), color data are selected at the timing shown in FIG. 7. As shown in FIG. 7, (a), because K is "1" eight bits of luminance data $Y_n$ and $Y_{n+1}$ are sampled. As shown in FIG. 7, (b), in the case of the 4:2:2 color data sampling format shown in FIG. 6, (b), color data are fed in the order of $CR_n$ and $CB_n$. When the luminance enable signal YEN is in a high level, as shown in FIG. 7, (c), the luminance data $Y_n$ is taken in at, e.g., the positive-going edge of the clock 10b. As shown in FIG. 7, (d), the luminance data Yn is then output to the pair generator 20c at the next positive-going edge of the next clock 10b.

When the color R enable signal CREN is in a high level, as shown in FIG. 7, (e), the color data $CR_n$ is taken in at the positive-going edge of the clock 10b. As shown in FIG. 7, (f) the color data $CR_n$ is output at the next positive-going edge of the next clock 10b and is continuously output. Likewise, when the color B enable signal CBEN is in a high level, as shown in FIG. 7, (g), the color data $CB_n$ is taken in at the positive-going edge of the clock 10b. As shown in FIG. 7, (h) the color data $CB_n$ is output at the positive-going edge of the third clock 10b and is continuously output.

Assume that the color signal selector 20b outputs the color select signal RLB with signal levels shown in FIG. 7, (i). Then, the color data $C_R$ or the color data $C_B$ is selected when the color select signal RLB is in a low level or in a high level, respectively. Therefore, the color signal selector 20b feeds the color data to the pair generator 20c in the order shown in FIG. 7, (j).

As shown in FIG. 7, (k), when the pair generator 20c receives the luminance data of FIG. 7, (d), and color data of FIG. 7, (j), at the second clock, the data enable signal DEN input to the pair generator 20c goes high. Consequently, the pair generator 20c takes in sixteen bits of luminance data $Y_n$ and color data $CR_n$. It will therefore be seen that two clocks suffice for completing color selection.

Subsequently, as shown in FIGS. 7, (l) and (m), the luminance data and color data are output at the positive-going edge of the third clock. Because the image data are continuously read out, two pixels of data, i.e., pairs of luminance data and color data $(Y_n, CR_n)$ and $(Y_{n+1}, CB_n)$ are continuously output over two clocks. FIG. 7, (n) shows an enable signal FWEL relating to the width of a range and output as an inverted latch output of the data enable signal DEN.

Figure 8:
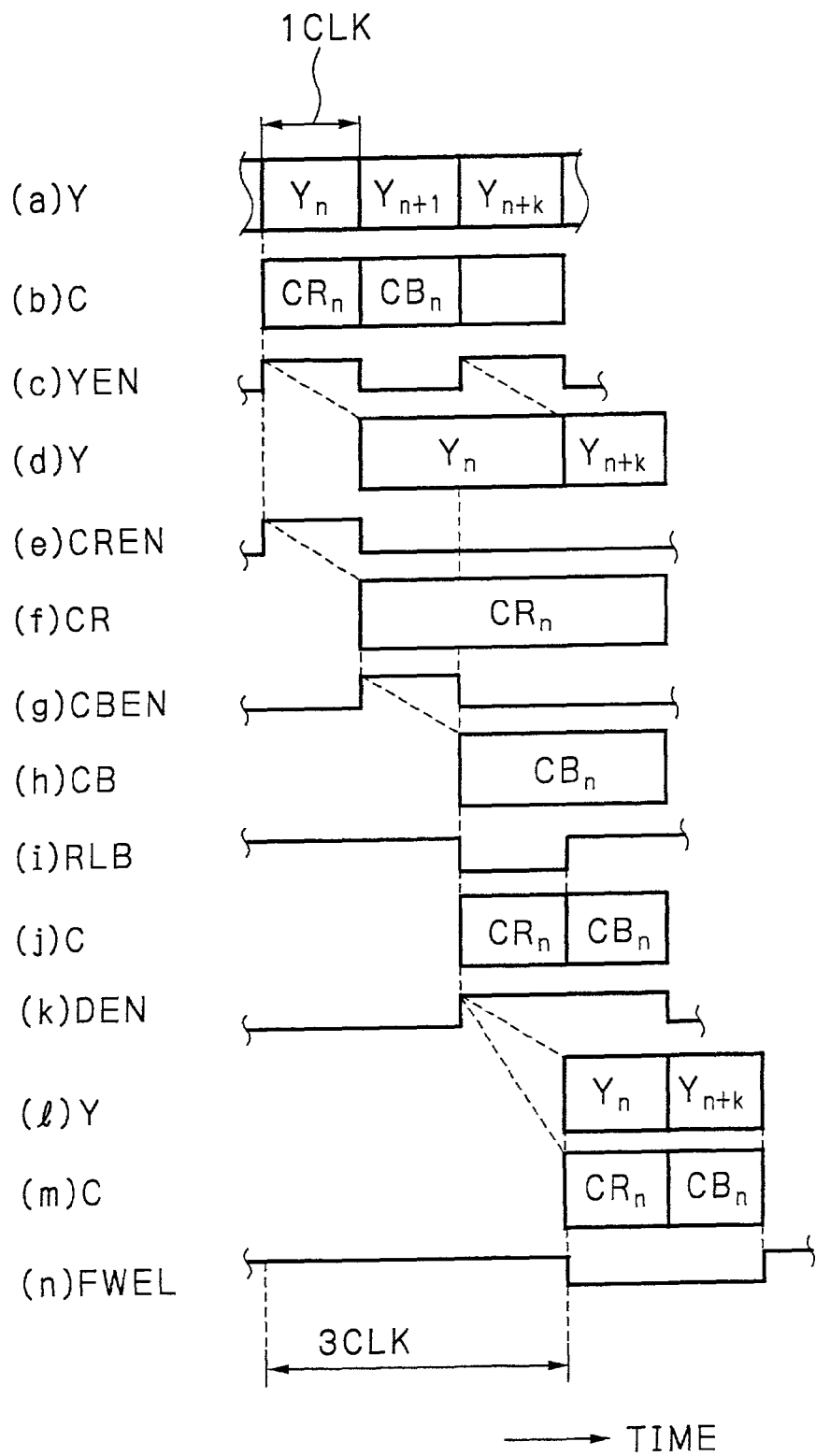
FIG. 8 is a timing chart demonstrating a procedure for maintaining the luminance data and color data sampled by a 4:2:2 zoom processing in pairs, an even address heading the data.

How the display sequencer 20 adjusts sampling in the case of enlargement or reduction will be described hereinafter. Let the suffix n be representative of an even number. As shown in FIG. 8, (a), when the leading luminance data Y is even data $Y_n$ three consecutive luminance data are read out. The three luminance data are the even luminance data $Y_n$, odd luminance data $Y_{n+1}$ next to the data $Y_n$, and luminance data $Y_{n+K}$ that takes account of the enlargement or the reduction coefficient. At the same time, as shown in FIG. 8, (b), the color data $CR_n$ and $CB_n$ corresponding to the consecutive luminance data $Y_n$ and $Y_{n+1}$, respectively, are fed.

When the luminance enable signal YEN input to the data latch 200a is in a high level, as shown in FIG. 8, (c) the luminance data Y are taken in at the positive-going edge of the clock CLK. The data latch 200a outputs the luminance data $Y_n$ and $Y_{n+K}$ in the order shown in FIG. 8, (d), on the basis of the relation between the luminance data Y and the positive-going edge of the clock 10b.

On the other hand, when the color R enable signal CREN is in a high level, as shown in FIG. 8, (e), the color data $CR_n$ is taken in at the positive-going edge of the clock 10b. As shown in FIG. 8, (f), the color data $CR_n$ is output at the positive-going edge of the second clock and is continuously output. Likewise, when the color B enable signal CBEN is in a high level, as shown in FIG. 8, (g), the color data $CB_n$ is taken in at the positive-going edge of the clock 10b. As shown in FIG. 8, (h), the color data $CB_n$ is output at the positive-going edge of the third clock and is continuously output.

When the color select signal RLB input to the color signal selector 20b goes low, as shown in FIG. 8, (i), the color data CR and CB are input to the pair generator 20c in the order shown in FIG. 8, (j).

As shown in FIG. 8, (k), the pair generator 20c receives the luminance data of FIG. 8, (d), and color data of FIG. 8, (j), at the second clock. At this instant, when the data enable signal DEN input to the pair generator 20c goes high at the third clock, sixteen bits of luminance data $Y_n$ and color data $CR_n$ are taken in. It will therefore be seen that three clocks suffice for completing color selection.

At the positive-going edge of the fourth clock, the luminance data $Y_n$ and color data $CR_n$ are output on the basis of a relation shown in FIG. 8(l) and FIG. 8(m). Consequently, two pixels of data, i.e., pairs of luminance data and color data $(Y_n, CR_n)$ and $(Y_{n+1}, CB_n)$ are continuously output over three clocks because of continuous reading. FIG. 8, (n) shows the previously mentioned enable signal FWEL. In this case, the relation between the luminance data and the color data particular to the 4:2:2 sampling format is maintained.

Figure 9:
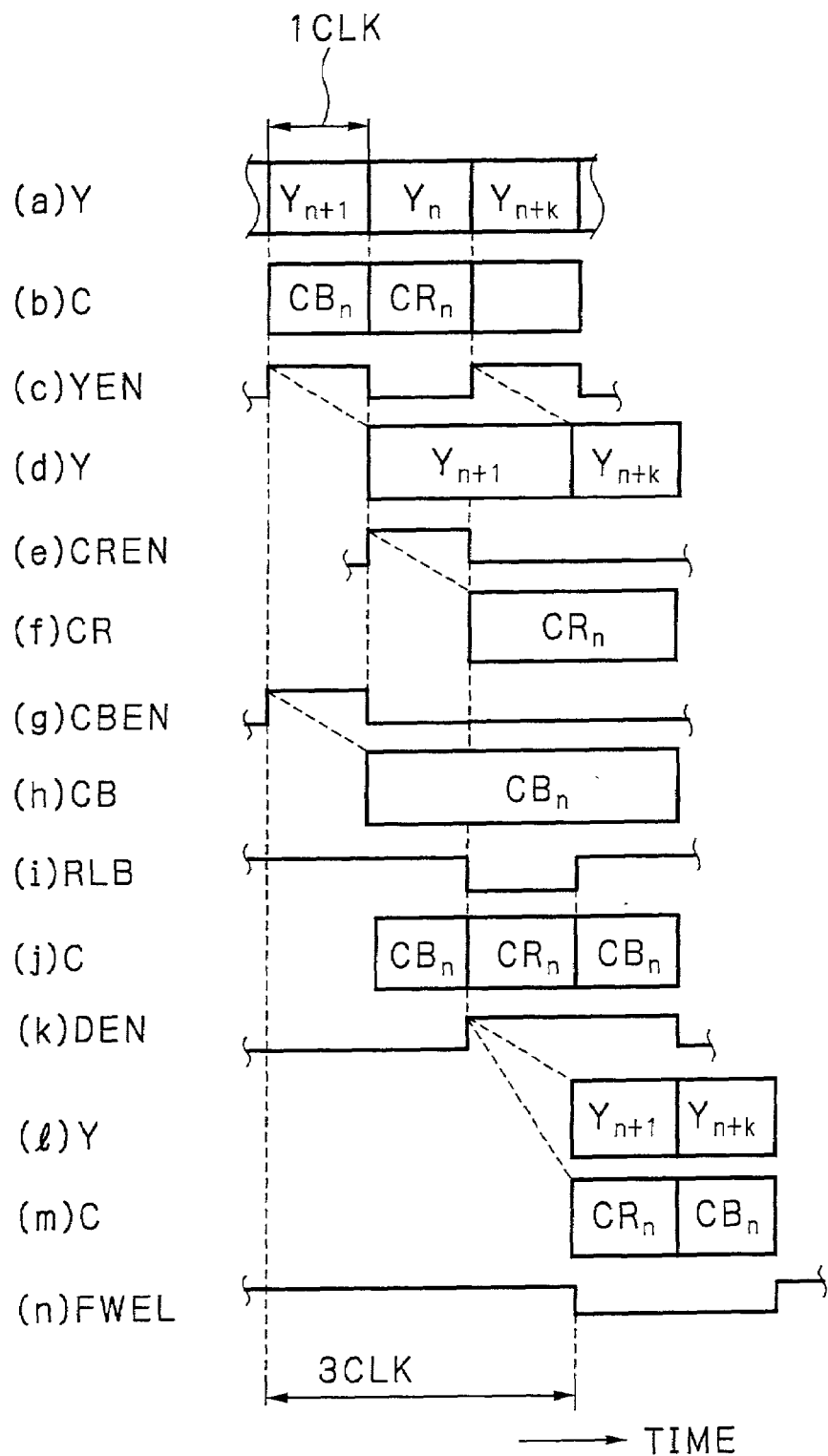
FIG. 9 is a timing chart demonstrating a procedure for maintaining the luminance data and color data sampled by a 4:2:2 zoom processing in pairs, an odd address heading the data.

Finally, when the leading luminance data Y included in the image data is odd luminance data $Y_{n+1}$, three luminance data Y are read out. As shown in FIG. 9, (a), the three luminance data are the odd luminance data $Y_{n+1}$, luminance data $Y_n$ next to the data $Y_{n+1}$, and luminance data $Y_{n+K}$ that takes account of the enlargement or reduction coefficient. More specifically, as the relation between the luminance data and the color data particular to the 4:2:2 sampling format indicates, it is necessary to match the color CR to the leading luminance data. However, the color data corresponding to the odd luminance data is the color CB, as will be described later. Directly sampling such data would therefore disturb the pairs of luminance data and color data and would thereby bring about false colors or similar deterioration in the event of electronic zooming. To solve this problem, when an odd number is positioned at the head, the address of the second image data to be read is put back by one to thereby read out the image data. The sampling timing to follow also takes account of this point.

As shown in FIG. 9, (b), the color data $CB_n$ and $CR_n$ are fed that respectively correspond to the luminance data $Y_{n+1}$ and $Y_n$ continuously fed. This is the difference between this case and the case described with reference to FIG. 8.

In this case, when the luminance enable signal YEN input to the data latch 200a is in a high level, as shown in FIG. 9, (c), the luminance data is taken in at the positive-going edge of the clock CLK. The data latch 200a outputs the luminance data Y at the timing shown in FIG. 9, (d) on the basis of the relation between the data Y and the positive-going edge of the clock 10b.

As for the color data CR, assume that odd color data is positioned at the head. Then, the color data $CR_n$ is taken in at the positive-going edge of the second clock of the clock 10b when the color enable signal CREN is in a high level, as shown in FIG. 9, (e). As shown in FIG. 9, (f), the color data $CR_n$ is then output at the positive-going edge of the third clock and is continuously output. As shown in FIG. 9, (g), when the color B enable signal CBEN is in a high level, the color data $CB_n$ is taken in at the positive-going edge of the first clock of the clock 10b. As shown in FIG. 9, (h), the color data $CB_n$ is then output at the positive-going edge of the second clock and is continuously output.

As shown in FIG. 9, (i), the color select signal RLB input to the color signal selector 20b goes low at the same time as the luminance enable signal YEN for selecting the luminance data $Y_{n+K}$ to be paired goes high. Consequently, the color signal selector 20b selects the color data CB, CR and CB in this order, as shown in FIG. 9, (j).

As shown in FIG. 9, (k), the pair generator 20c receives the luminance data of FIG. 9, (d), and color data of FIG. 9, (j), at the second clock. The data enable signal DEN input to the pair generator 20c goes high at the third clock, so that sixteen bits of luminance data $Y_{n+1}$ and color data $CR_n$ are taken in. Because the data enable signal DEN remains in a high level, two consecutive pixels are selected. It will therefore be seen that three clocks suffice for completing color selection.

At the positive-going edge of the fourth clock, pairs of luminance data and color data $(Y_{n+1}, CR_n)$ and $(Y_{n+K}, CB_n)$, i.e., two pixels of data are continuously output over two clock pulses on the basis of a relation shown in FIG. 9(l) and FIG. 9(m). FIG. 9, (n) shows the previously mentioned enable signal FWEL. In this manner, the relation between the luminance data and the color data particular to the 4:2:2 sampling format is maintained despite electronic zooming.

Figure 10:
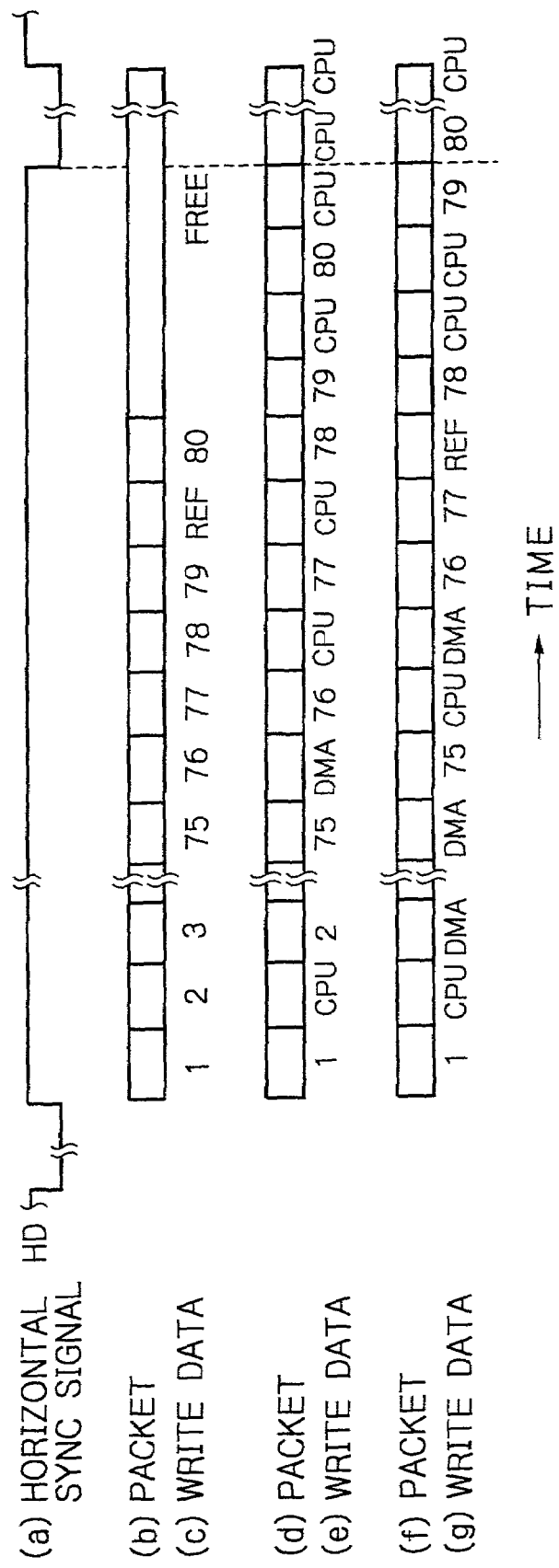
FIG. 10 is a timing chart showing a relation between consecutive packets transferred in a single line in an image control processing section shown in FIGS. 1A and 1B.

Hereinafter will be briefly described how the bus arbitrator 18 feeds packets to the buffer memory 12b. In the illustrative embodiment, a single packet is regarded as a sequence of eight eight-bit data, as stated earlier. FIG. 10, (a), shows the horizontal sync signal HD. As shown in FIG. 10, (b), packets are sequentially fed to the buffer memory 12b during a valid scanning period indicated by the horizontal sync signal HD. The packet data are written to either one of the FIFO memories 128b and 130 of the buffer memory 12. Eighty packets of image data are written on a single line. FIG. 10, (c), shows packets with serial numbers 1 through 80; a label "FREE" next to the packet #80 shows that no information exists. Also, a label "REF" between the packets #79 and #80 is representative of a packet indicative of refreshment.

As shown in FIGS. 10, (d) and (e), labels "CPU" and "DMA" each intervene between particular packets of image data and store information relating to, e.g., the control of the outside CPU 22 or the DMA control of the outside DMA controller 24. As shown in FIGS. 10, (c) and (e), eighty packets of image data complete for a single line within the valid scanning period. However, as shown in FIGS. 10, (f) and (g), when eight packets of image data do not complete for a single line within the valid scanning period, the edge of a picture is lost. The prerequisite is therefore that eighty consecutive packets appear on a single line without regard to arbitration. Packets are fed in such a manner as to satisfy this condition.

Figure 11:
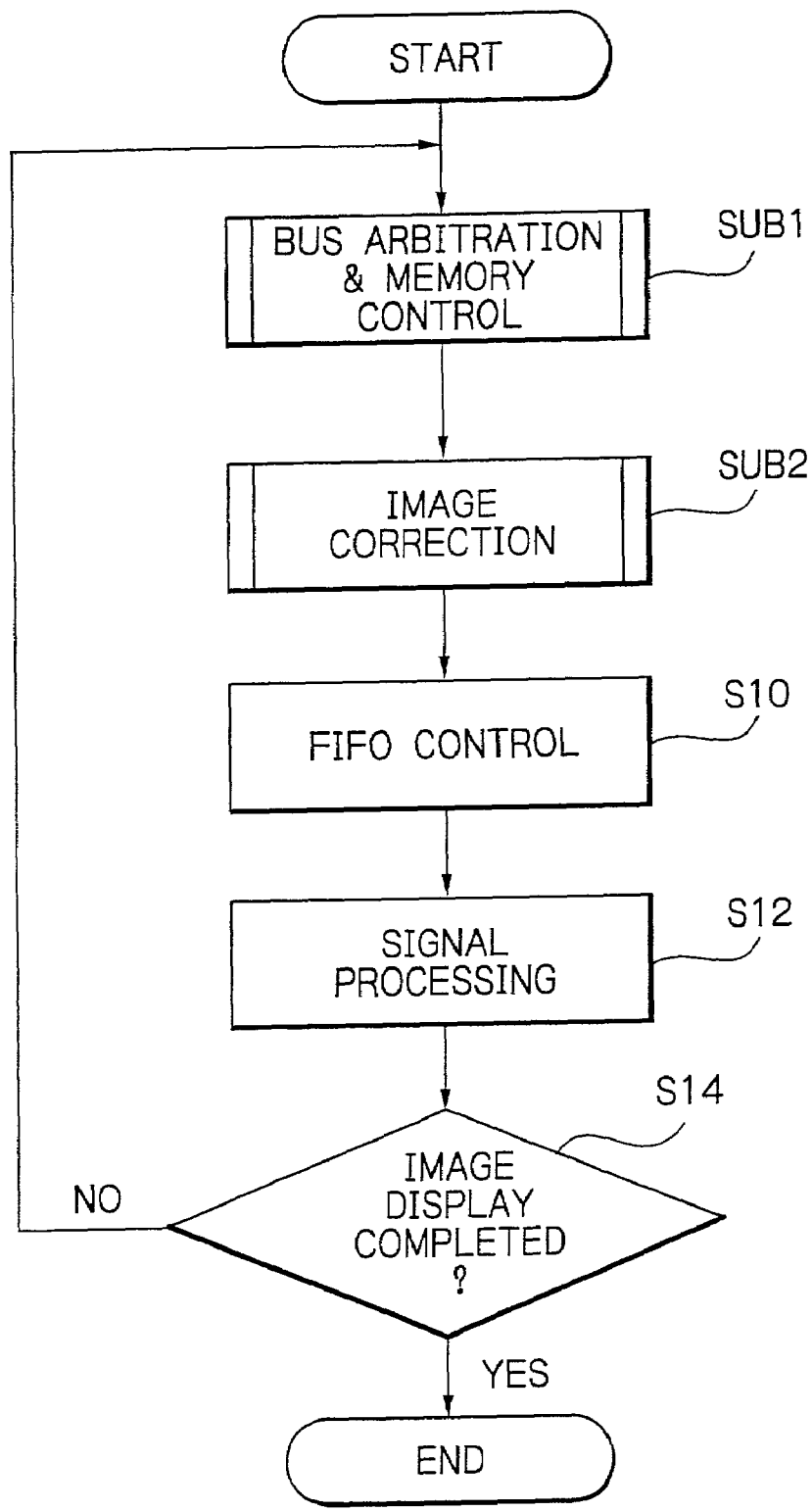
FIG. 11 is a flowchart representative of a main routine that the illustrative embodiment executes.

Reference will be made to FIG. 11 for describing the general operation of the image control processing section 10h. As shown, the operation begins when the digital camera 10 is switched on. The timing signal generator 12a generates various timing signals including the first and second clocks 10a and 10b immediately after the start of operation. In a subroutine SUB1 for memory control, the processing section 10h executes various kinds of setting including initialization. In addition, the processing section 10h executes display processing with image data read out of the video memory 14 while performing arbitration in accordance with the priority order relating to the bus 32. In accordance with the instruction data 32a, data 54 representative of the valid number of pixels and so forth, the memory controller 16 varies the usual packet size of the image data read out of the image memory 14. The memory controller 16 then delivers the image data varied in packet size to the data corrector 30 line by line. This successfully reduces the occupation ratio of the bus 32.

In a subroutine SUB2 following the subroutine SUB1, the data corrector 30 corrects the picture packet by packet in accordance with the instruction data 32a as well as other data. The correction of picture includes at least one of the restoration of packet data based on the varied packet size, various kinds of packet-by-packet signal processing, and designation of the address of the buffer memory 12b. Subsequently, the data corrector 30 delivers the packeted image data 118 to the buffer memory 12b. Consequently, the image data varied in packet size are restored while the quality of the picture is enhanced packet by packet. The digital camera 10 or similar system including the image control processing section 10h achieves high performance.

The buffer memory 12b executes packet writing at a high rate and packet reading at a usual rate by FIFO control (step S10). The encoder 28 separates the image data out of the packets read out of the buffer memory 12b and then encodes the image data. The encoded image data are sent to the display not shown (step S12). After the step S12, the processing section 10h determines whether or not the picture has been fully displayed (step S14). If the answer of the step S14 is negative (NO), the processing section 10h returns to the subroutine SUB1 for repeating the image data control. If the answer of the step S14 is positive (YES), the processing section 10h ends the control relating to picture display.

Figure 12A:
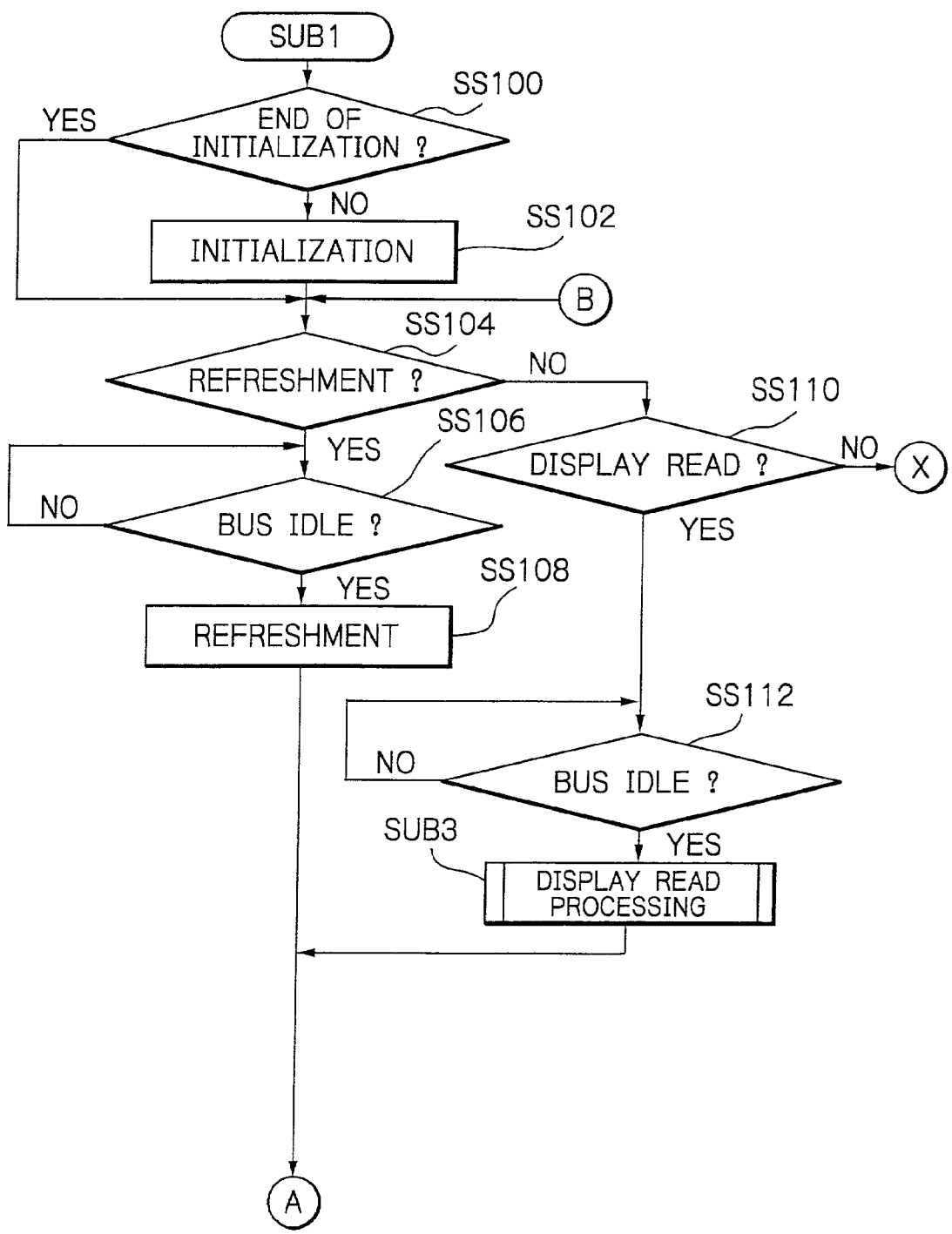
FIGS. 12A and 12B are flowcharts showing a subroutine SUB1 included in the main routine specifically.

The subroutine SUB1, which is one of characteristic features of the illustrative embodiment, will be described more specifically with reference to FIGS. 12A, 12B and 13. As shown in FIG. 12A, the subroutine SUB1 begins with a substep SS100 for determining whether or not the processing section 10h has completed initialization. If the answer of the substep SS100 is NO, the processing section 10h executes initialization (substep SS102). If the answer of the substep SS100 is YES, the processing section 10h executes bus arbitration (substep SS104).

In the substep SS104, the processing section takes account of the priority order in the event of bus arbitration. First, the processing section 10h refreshes the video memory 14. Specifically, the video memory 14 implemented by a DRAM or an SDRAM must be refreshed at a preselected cycle. To determine whether or not to refresh the video memory 14, the processing section 10h references the status of a refresh flag included in the bus arbitrator 18 (substep SS104). The refresh flag may be set in accordance with the count of a refresh counter not shown.

Assume that the refresh flag is set or that the count of the refresh counter is a preselected count (YES, substep SS104). Then, the processing section 10*h* determines whether or not the bus 32 is idle (substep SS106). If the answer of the substep SS106 is NO, the processing section 10*h* causes processing currently occupying the bus 32 to retreat immediately and waits until the bus 32 becomes idle, although not shown in FIG. 12A specifically. If the answer of the substep SS106 is YES, the processing section 10*h* refreshes the video memory 14 (substep SS108). Specifically, the processing section 10*h* delivers control information for refreshing to the data corrector 30 in the form of a packet.

On the other hand, if the answer of the substep SS104 is NO, the processing section 10*h* executes read-out for display. Specifically, in a substep SS110, the processing section 10*h* determines whether or not a display read-out flag is set or whether or not a display read-out request (REQ) is output. If the answer of the substep SS110 is YES, the processing section 10*h* determines whether or not the bus 32 is idle while taking account of the priority order (substep SS112). If the bus 32 is busy and if processing currently occupying the bus 32 is lower in priority than the read-out for display (NO, substep SS112), then the processing section 10*h* causes the current processing to retreat. If the answer of the substep SS112 is YES, the processing section 10*h* executes read-out for display (subroutine SUB3).

In the subroutine SUB3, the processing section 10*h* executes processing for packeting the image data, processing for pairing based on the 4:2:2: sampling format and so forth and inputs the resulting image data to the data corrector 30. The subroutine SUB3 will be described in detail later.

Figure 12B:
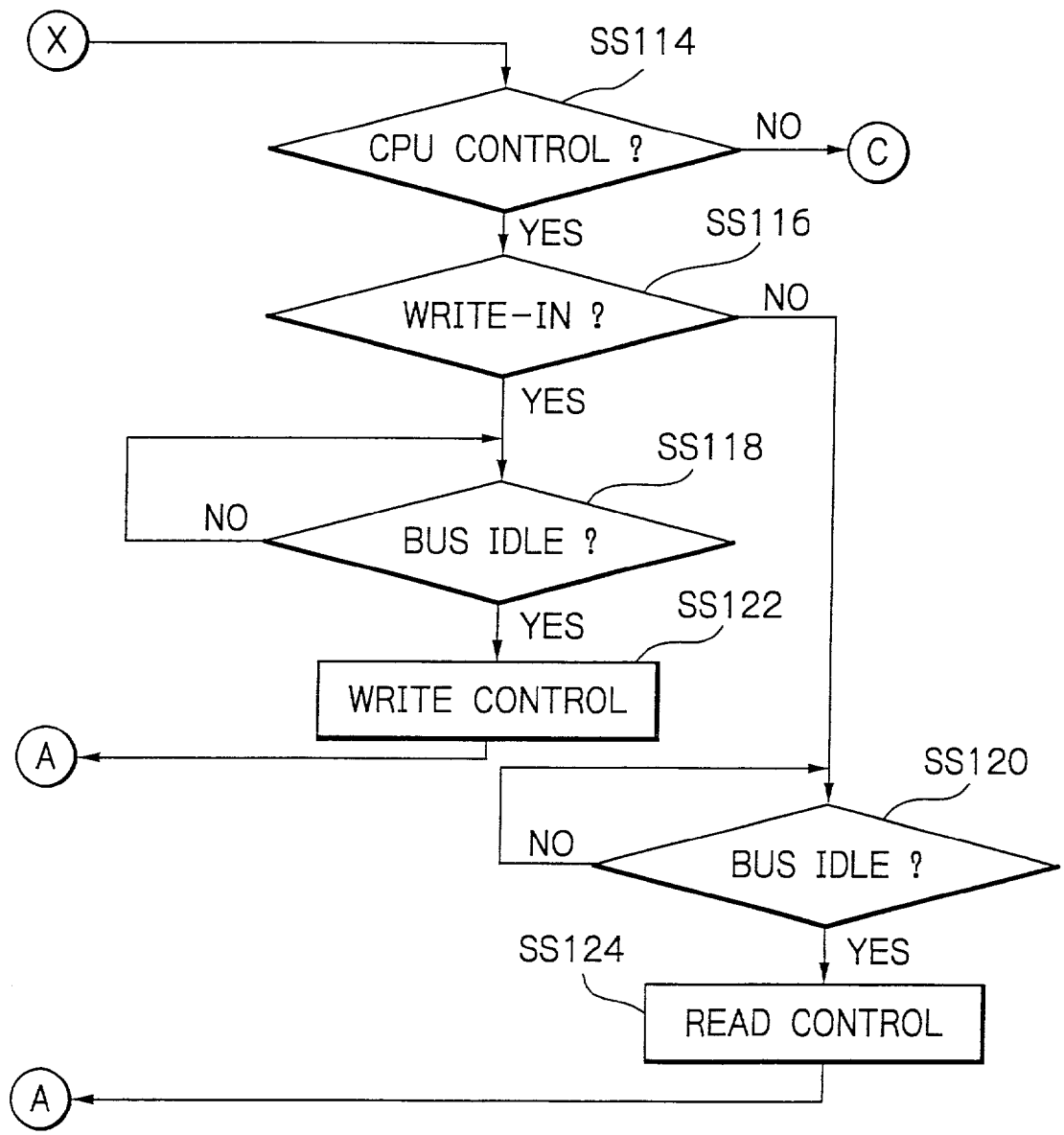
Figure 13:
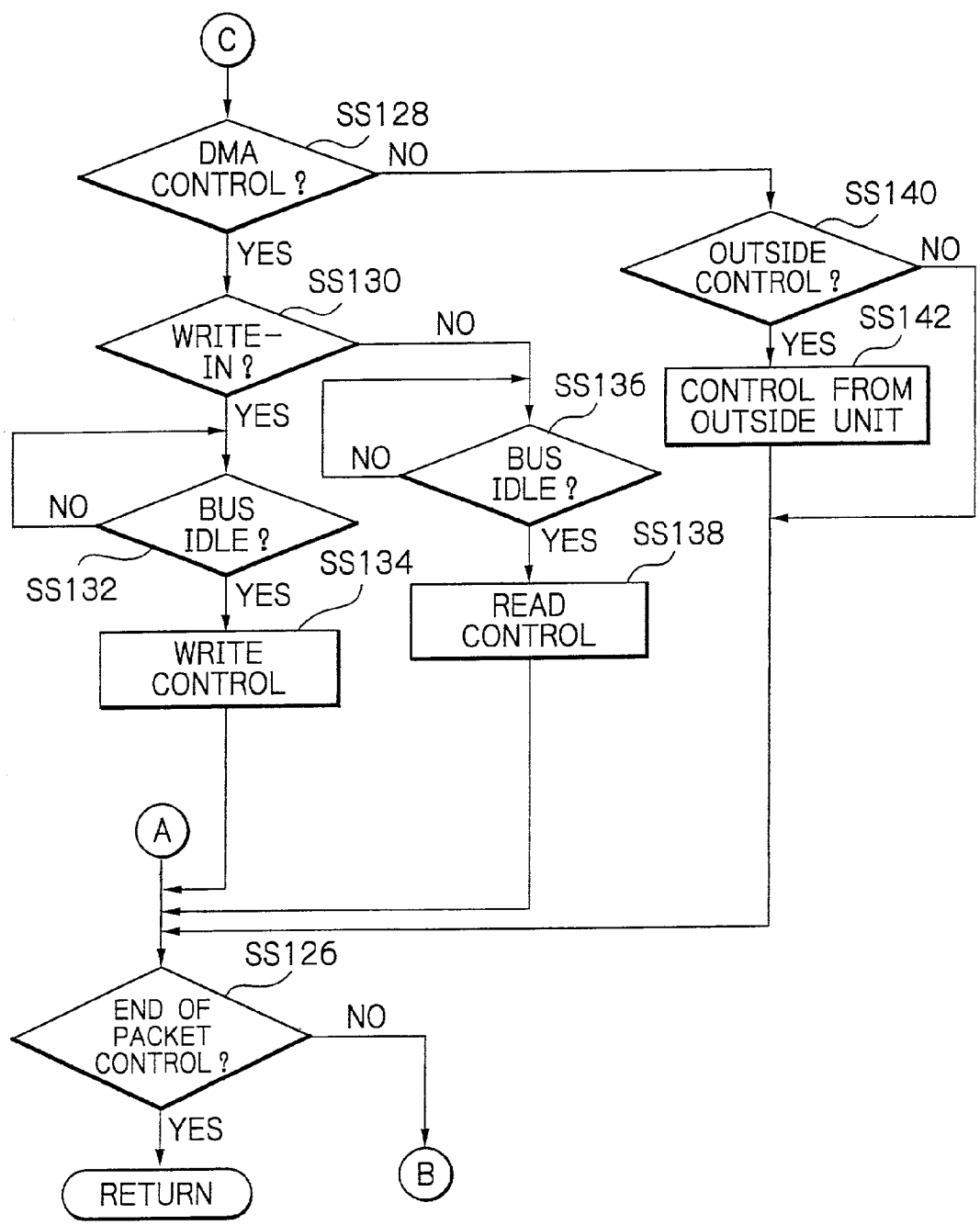
FIG. 13 is a flowchart showing the rest of the subroutine SUB1.

If the answer of the substep SS110 is NO, the operation is transferred to a substep SS114, FIG. 12B, via a connector X. In the substep SS114, the bus arbitrator 18 determines whether or not a CPU control flag is set or whether or not a control request (REQ) is output. If the answer of the substep SS114 is YES, the bus arbitrator 18 determines whether or not CPU control is write-in processing (substep SS116). If the answer of the step SS116 is YES, the bus arbitrator 18 determines whether or not the bus 32 is idle (substep SS118). If the answer of the substep SS116 is NO, the bus arbitrator 18 determines whether or not the bus 32 is idle (substep SS120)

In the substeps SS118 and SS120, the bus arbitrator 18 compares processing under way and processing to be executed as to priority and executes one of them having higher priority. If the answer of the substep SS118 or SS120 is NO, meaning that CPU control has higher in priority than the processing under way, the bus arbitrator 18 causes the processing under way to retreat for a moment. If the answer of the substep SS118 or SS120 is YES, the bus arbitrator 18 causes write control (substep SS122) or read control (substep SS124), respectively, to be executed. The substeps SS118 and SS120 as well as the substep SS108 and subroutine SUB3, FIG. 12A, are transferred to a substep SS126 shown in FIG. 13 via a connector A.

In the substep SS126, the processing section 10*h* determines whether or not control over the packeted data, which contain other control data as well, has ended. If the answer of the substep SS126 is YES, the operation returns to the main routine shown in FIG. 11. If the answer of the substep SS126 is NO, the operation returns to the substep SS104, FIG. 12A, via a connector B.

Assume that the request input to the bus arbitrator 18 is not a CPU control request (NO, substep SS114). Then, the substep SS114 is followed by a substep SS128 shown in FIG. 13 via a connector C. In the substep SS114, the bus arbitrator 18 determines whether or not the DMA controller 24 is outputting a DMA control request. If the answer of the substep SS114 is YES, the bus arbitrator 18 determines whether or not DMA control is write-in (substep SS130). If the answer of the substep SS130 is YES, the bus arbitrator 18 again determines whether or not the bus 32 is idle (substep SS132). If the answer of the substep SS132 is NO, the bus arbitrator 18 waits until processing under way and lower in priority than DMA control retracts. If the answer of the step SS132 is YES, then the bus arbitrator 18 causes DMA write control to be executed (substep SS134).

If the answer of the substep SS130 is NO, then the bus arbitrator 18 determines whether or not the bus 32 is idle (substep SS136). The substep SS136 is identical with the substep SS132. If the answer of the substep SS136 is YES, the bus arbitrator 18 allows DMA read control to be executed (substep SS138). During each of DMA write control and DMA read control, control information is packed in a single packet. The substeps SS134 and SS138 each are followed by the previously stated substep SS126.

On the other hand, if the answer of the substep SS128 is NO, the bus arbitrator 18 determines whether or not a data input request or a control request is input from an outside apparatus (substep SS140). If the answer of the substep SS140 is YES and the bus 32 is idle, then the bus arbitrator 18 allows the outside apparatus to execute control (substep SS142). The outside apparatus may be a keyboard by way of example. If the answer of the substep SS140 is NO, the procedure advances to the substep SS126 without any processing. If the answer of the substep SS126 is YES, then the procedure returns to the main routine, FIG. 11.

As stated above, the bus arbitrator 18 determines whether or not the bus 32 is idle in response to every request and allows processing to be executed in accordance with the priority order. The processing section 10*h* can therefore efficiently perform not only data packeting but also other control. The packeted image data and control information are fed within the valid picture display period of one line, so that time is efficiently allotted to processing.

Figure 14:
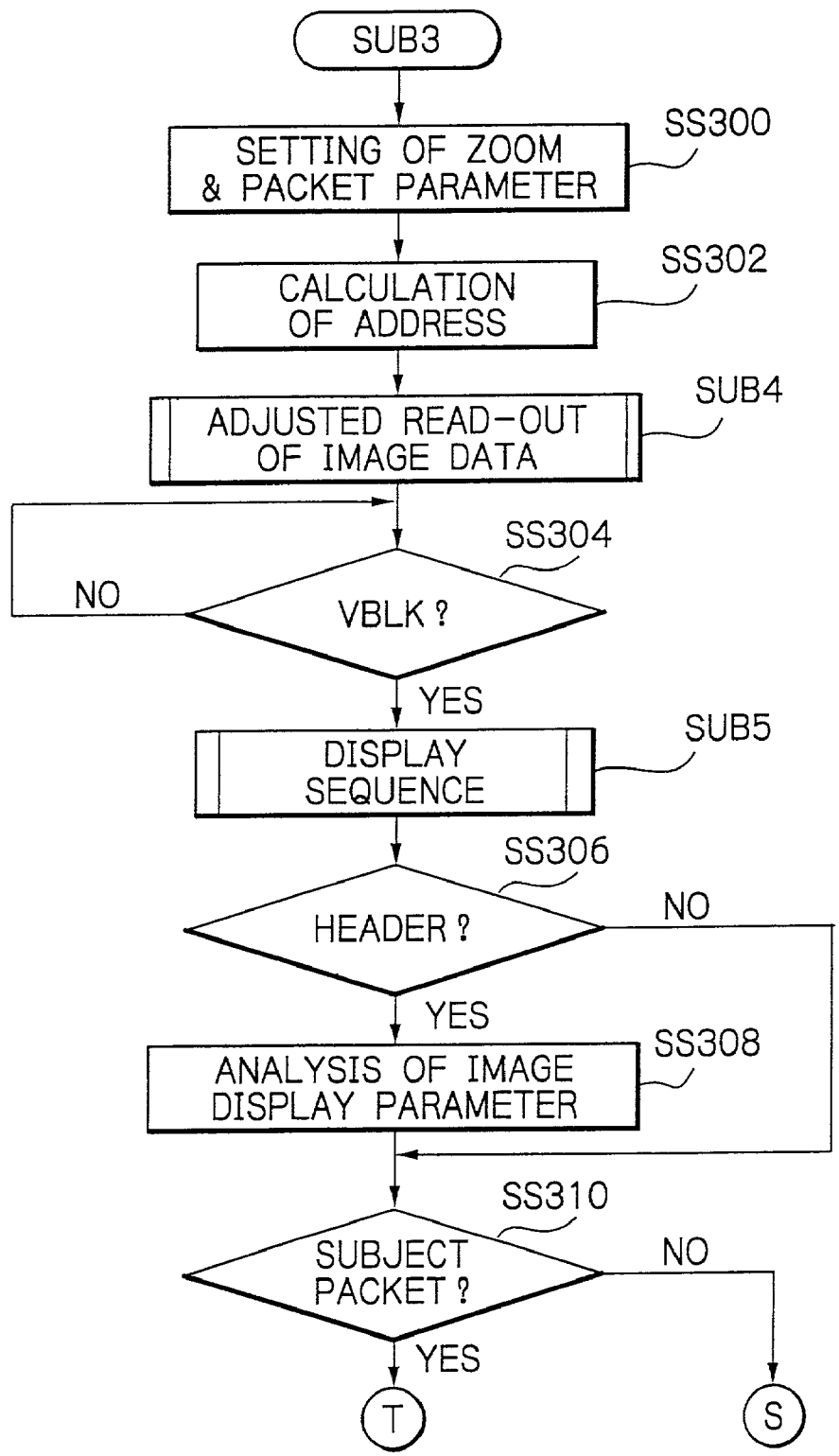
FIG. 14 is a flowchart representative of a subroutine SUB3 shown in FIG. 12A.
Figure 15:
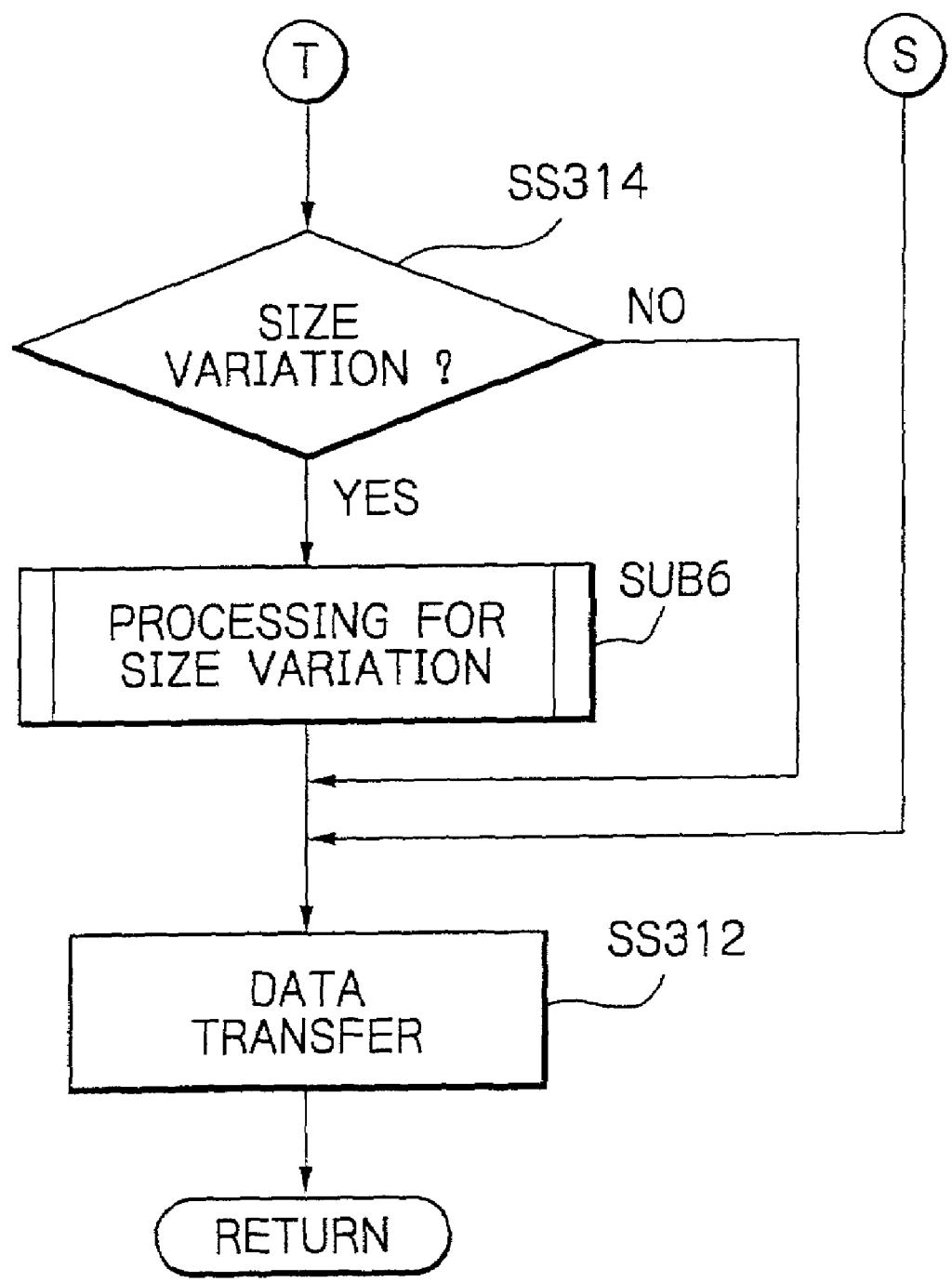
FIG. 15 is a flowchart showing the rest of the subroutine SUB3.

Reference will be made to FIGS. 14 and 15 for describing the subroutine SUB3 in detail. Briefly, in the subroutine SUB3, the processing section 10*h* packets the image data, reads them out in accordance with a display sequence, and varies the packet size. As shown, an electronic zoom size meant for a picture to be processed is fed from, e.g., a mouse or a keyboard, not shown, to the signal input 26 (substep SS300). The electronic zoom size is the zoom coefficient for display. Assuming that the zoom coefficient is 256 for ×1 magnification or equi-scale, then it is 512 for ×2 magnification or 128 for ×½ magnification. In addition, the amount of image data for a packet and the number of packets of image data for a line are set in the substep SS300.

When the amount of data of a packet and the number of packets are limited by hardware, they are sometimes fixed. In the illustrative embodiment, eight consecutive image data are fixedly dealt with as a packet while eighty packets are included in a line, as stated earlier. The electronic zoom size may be set by interrupt processing, if desired.

After the substep SS300, the processing section 10*h* calculates the addresses of the video memory 14 from which the image data should be read out (substep SS302). Specifically, the processing section 10*h* may randomly set the leading address of a packet. The processing section 10*h* then calculates the addresses of seven consecutive image data following the leading address while taking account of the zoom coefficient. The address data calculated are fed to the memory controller 16. More specifically, to prevent the leading position from being shifted, the addresses are calculated by adding a zoom distance or zoom size and then counting fractions of 0.5 and over as a unit while cutting away the rest.

While reading the image data out of the video memory 14, the memory controller 16 adjusts the order of the luminance data and color data pairs derived from 4:2:2 sampling (subroutine SUB4). In practice, the display sequencer 20 executes the above adjustment. This reduces, e.g., false colors that would lower image quality, despite the electronic zooming based on the 4:2:2 sampling format. Control for accurately maintaining the luminance data and color data in pairs will be described in more detail later.

After the subroutine SUB4, the display sequencer 20 determines whether or not a vertical blanking signal VBLK has arrived (substep SS304). The vertical blanking signal VBLK is used as a synchronizing signal when display begins. If the answer of the substep SS304 is NO, the display sequencer 20 waits for the arrival of the signal VBLK. If the answer of the step SS304 is YES, the display sequencer 20 executes display sequence processing (subroutine SUB5).

In the subroutine SUB5, the display sequencer 20 arranges the packets of image data read out in an adequate order to be fed to the data corrector 30. At this instant, the display sequencer 20 controls not only horizontal read-out but also vertical read-out for effecting electronic zooming, as will be described specifically later.

After the subroutine SUBS, the data corrector 30 determines whether or not the input packet contains header information relating to the packet (substep SS306). If the answer of the substep SS306 is YES, then the data corrector 30 analyzes the parameters of the header information in order to see if the information includes a display command (substep SS308). If the answer of the substep SS306 is NO, the data corrector 30 determines whether or not the packet is the subject to be processed (substep SS310), bypassing the substep SS308. If the answer of the substep SS310 is NO, the substep SS310 is followed by a substep SS312 shown in FIG. 15 via a connector S. If the answer of the substep SS310 is YES, the substep SS310 is followed by a substep SS314 also shown in FIG. 15 via a connector T.

In the substep SS314, the data corrector 30 determines whether or not the header information includes a size variation command. If the answer of the substep SS314 is NO, the data corrector 30 simply transfers the packet data (substep SS312). If the answer of the substep SS314 is YES, the data corrector 30 varies the size of the subject packet (subroutine SUB6). This is also followed by the substep SS312. Thereafter, the procedure returns to the subroutine SUB1, FIG.

For high-speed processing, the processing section 10h may determine, in the subroutine SUB3, whether or not all the image data representative of a single picture have been fed after the display sequence. If the answer of this decision is negative, the procedure returns to the calculation of addresses. In the illustrative embodiment, the subroutine SUB3 bypasses the substep SS304 until the number of lines to be displayed reaches a preselected value on the basis of the positive-going edges of the signal VBLK, so that the above procedure is repeated. If all the image data have been fed, then the subroutine SUB3 ends.

Figure 16:
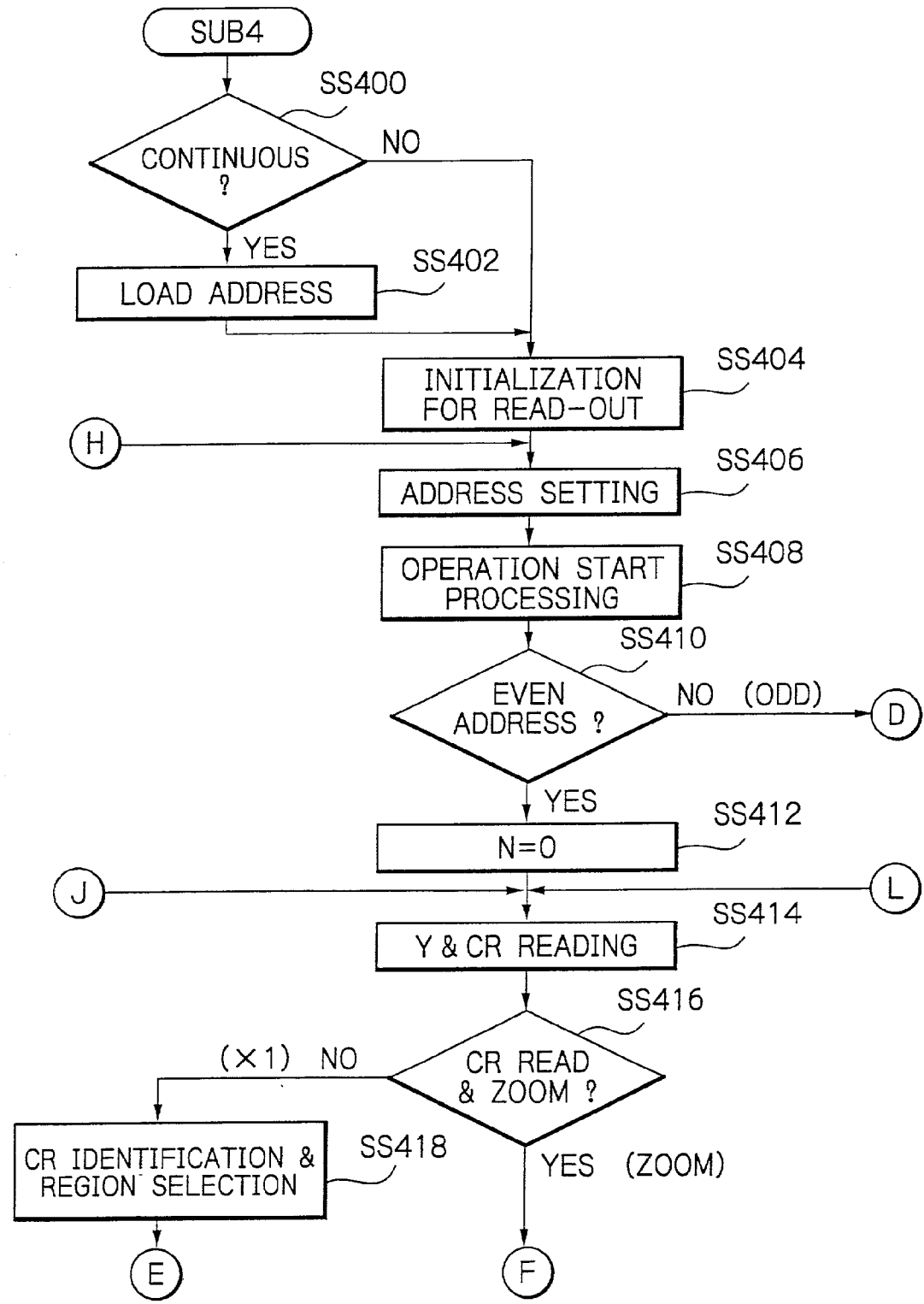
FIG. 16 is a flowchart representative of a subroutine SUB4 shown in FIG. 14.

Referring to FIGS. 16 through 20, a procedure relating to data read-out and the order for maintaining the pair relation will be described hereinafter. First, as shown in FIG. 16, the processing section 10h determines whether or not the read-out of image data is the continuation of the processing having been executed (substep SS400). For this decision, the processing section 10h references a preselected flag or a combination of flags. If the answer of the step SS400 is YES, the processing section 10h loads an address, i.e., the last address of a packet read immediately before (substep SS402) The substep SS404 is followed by a substep SS404. This is also true when the answer of the substep SS400 is NO, because image data is read out for the first time.

In the substep SS404, the processing section 10h initializes various parameters for memory control. Subsequently, the processing section 10h sets addresses (substep SS406) and then starts operation, i.e., control over the video memory 14 (substep SS408). The control over the video memory 14 includes chip selection and row address selection.

After the substep SS408, the processing section 10h determines whether or not the first one of the addresses set is an even address (substep SS410), thereby starting selecting a color. This decision can also be effectively done by using a flag. For example, if an odd number flag is not set, meaning that the leading address is an even number (YES, substep SS410) the processing section 10h sets a count N of "0" (substep SS412). If the odd number flag is set (NO, substep SS410), the processing section 10h determines that the leading address is an odd number. In this case, the substep SS410 is followed by a sequence of steps shown in FIG. 19 via a connector D.

After the substep SS412, the processing section 10h increments the count N to "1" and then accesses the leading address to thereby read image data out of the video memory 14 (substep SS414; READ_YCR). The image data read out at a time have sixteen bits in total. The processing section 10h then separates luminance data Y and color data CR included in the image data and temporarily latches them. This stage of procedure corresponds to the selection and latching of the luminance data Y and color data CR of FIG. 7, (a) and (b), in response to the enable signals of FIG. 7, (c) and (e). At the same time, the processing section 10h determines whether or not to execute zooming with the image data (substep SS416).

If the answer of the substep SS416 is NO, meaning that ×1 processing should be executed, the processing section 10h makes the color select signal RLB (logical) ZERO in order to cause the color selector 20b to select the color CR (substep SS418). Meanwhile, the image data selected and output are input to the pair generator 20c as a pair (see FIG. 7, (k)). The substep SS418 is followed by a substep SS420 shown in FIG. 17 via a connector E. If the answer of the substep SS416 is YES, the substep SS416 is followed by a substep SS444 shown in FIG. 18 via a connector F.

Figure 17:
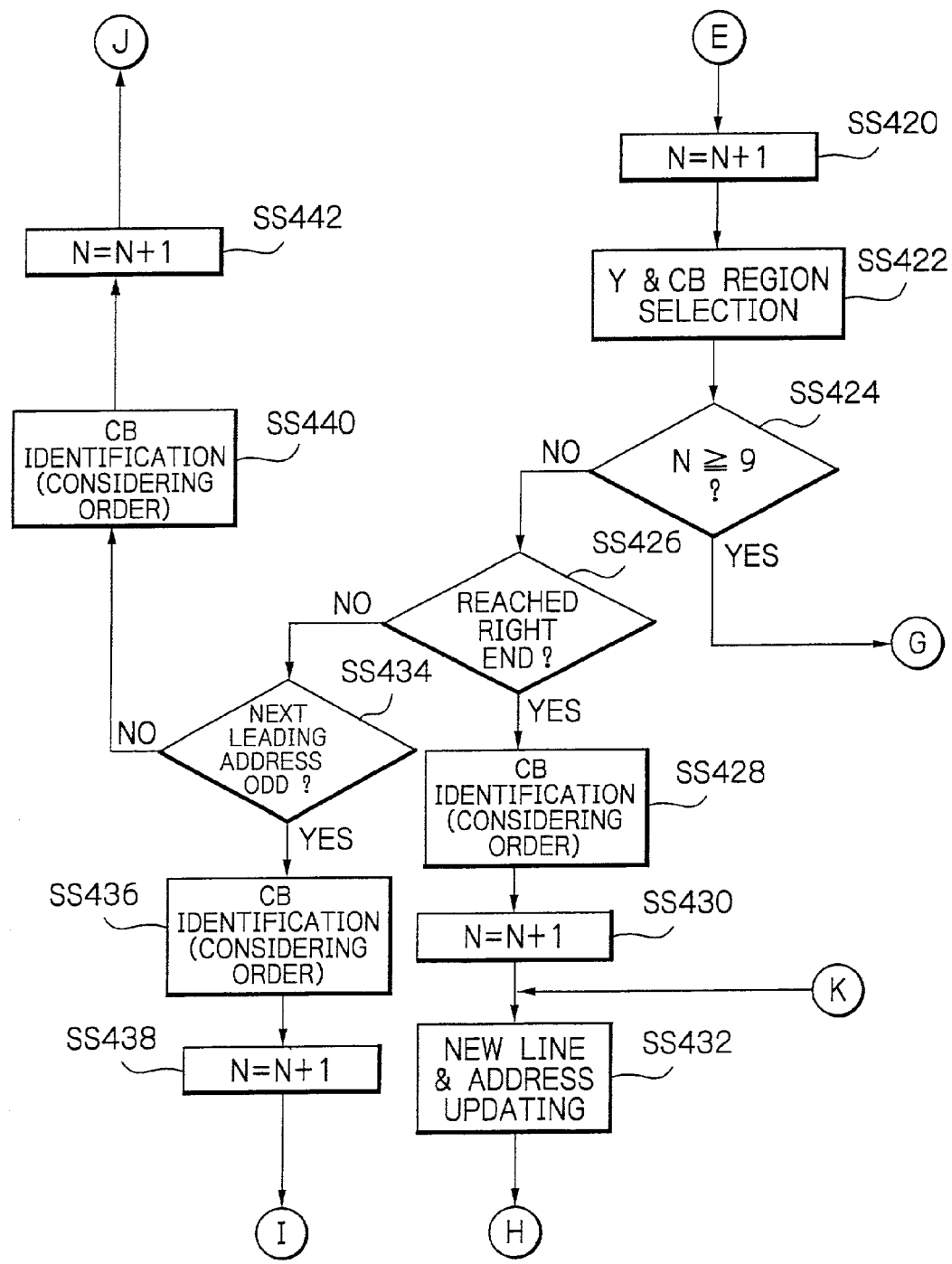
FIGS. 17 through 20 are flowcharts showing the rest of the subroutine SUB4.

In the substep SS420, FIG. 17, the processing section 10h increments the count N by 1 (one) due to the selection of the color CR. Subsequently, the processing section 10h temporarily holds the luminance data Y and color data CB and then outputs them (substep SS422). In this manner, the processing section 10h selects a region that derives the second image data in accordance with the 4:2:2 sampling format (READ_YCB).

After the substep SS422, the processing section 10h determines whether or not the count N has exceeded "8" (substep SS424; highest priority). This is because the number of data set is eight. If the answer of the substep SS424 is YES, meaning that one packet of image data has been packed, the operation is transferred to a procedure shown in FIG. 18 via a connector G.

If the answer of the substep SS424 is NO, the processing section 10h determines whether or not the access has reached the right end of the bidimensional address space of the video memory 14 (substep SS426; medium priority). For this decision, use is made of a flag. If the answer of the substep SS426 is YES, the processing section 10h selects the color CB while taking account of the order (substep SS428). For the color selection taking account of the order, the processing section 10h makes the color select signal RLB (logical) ONE. After the substep SS428, the processing section 10h increments the count N by 1 (substep SS430). The processing section 10h then executes new line processing in the next address space to be read while updating the address (substep SS432; READNOP2). To update the address, the processing section 10h may reset the address to zero beforehand. Thereafter, the processing section 10h returns to the substep SS406, FIG. 16 via a connector H.

If the answer of the step SS426 is NO, the processing section 10h determines whether or not the next leading address is odd (substep SS434; lowest priority). If the answer of the substep SS434 is YES, the processing section 10h identifies the color CB while taking account of the order (substep SS436). At this instant, the processing section 10h makes the color select signal RLB ONE. The processing section 10h then increments the count N by 1 (substep SS438). The substep SS438 is followed by a procedure, which will be described later with reference to FIG. 19 (READ_YCB1), via a connector I.

If the answer of the substep SS434 is NO, the processing section 10h identifies the color CB while taking account of the order (substep SS440), thereby producing a pair of luminance data Y and color data CB after the color CR. At this instant, the processing section 10h increments the count N by 1 (substep SS442). The operation then returns to the substep SS414, FIG. 16, via a connector J. These steps form a ×1 processing loop. In the event of ×1 processing, i.e., when the address incremented by 1 from the first address coincides with the address expected to be read next, the processing section 10h selects the color data CB corresponding to the expected address to thereby produce a pair and then selects the luminance data of the expected address.

Assume that the leading address is even and that zooming should be executed (YES, substep SS416, FIG. 16). Then, the processing section executes the substep SS444 (READ_CB), FIG. 18, as mentioned earlier. At this instant, the region of color data CR is temporarily selected (substep SS418, FIG. 18; see FIG. 8, (e) and (f)). As for the region of color data CB, nothing is selected because the enable signal CBEN is in a low level. In the substep SS444, the processing section 10h identifies color data CB for thereby selecting a region. At this stage, however, uncertain data is sampled because no data exists in the above region, as shown in FIG. 8, (h). In this case, the processing section 10h makes the color select signal RLB ONE (see FIG. 8, (g) through (j)). The processing section 10h then increments the count N by 1 (substep SS446).

After the substep SS446, the processing section 10h latches the region of color CB for a moment (substep SS448; see color enable signal CBEN=ONE). The processing section 10h then determines whether or not the access has reached the right end of the address space by referencing a flag (substep SS450), as stated previously. If the answer of the substep SS450 is YES, the processing section 10h executes new line processing with the address space to access, i.e., updates the sequence of addresses (substep SS452). Subsequently, the processing section 10h selects the next new luminance data Y (substep SS454).

If the answer of the substep SS450 is NO, the processing section 10h identifies and selects color data CR as well as a region (substep SS454; RLB=ONE and DEN=1), as shown in FIG. 8, (i) and (j). The count N has already been incremented in the substep SS446 and is not shown specifically.

The processing section 10h selects the second luminance data Y to be read next (substep SS456; READ_Y2). The substep SS456 corresponds to validating, when the leading address is odd and zooming is effected after the substep SS414, the pair of luminance data Y and color data CR obtained first and then reading the second luminance data Y remote from the above luminance data Y by the zoom distance. The processing section 10h then determines whether or not the count N has exceeded "8" (substep SS458; highest priority). If the answer of the substep SS458 is YES, the processing section 10h selects color data CB corresponding to the luminance data Y selected (substep SS460; RLB=ONE). If the answer of the substep SS458 is NO, the processing section 10h determines whether or not the access has reached the right end of the address space and whether or not new line processing should be executed (substep SS462; medium priority).

If the answer of the substep SS462 is YES, the processing section 10h selects color CB (substep SS464). More specifically, the processing section 10h selects color data CB to be paired with the color data CR selected previously. This is because an address different from the address incremented by 1 during ×1 processing, i.e., an address incremented by the zoom distance or zoom size is accessed. The processing section 10h then increments the count N by 1 (substep SS466). The substep SS466 is followed by a substep SS432 shown in FIG. 17 (READNOP) via a connector K.

Figure 18:
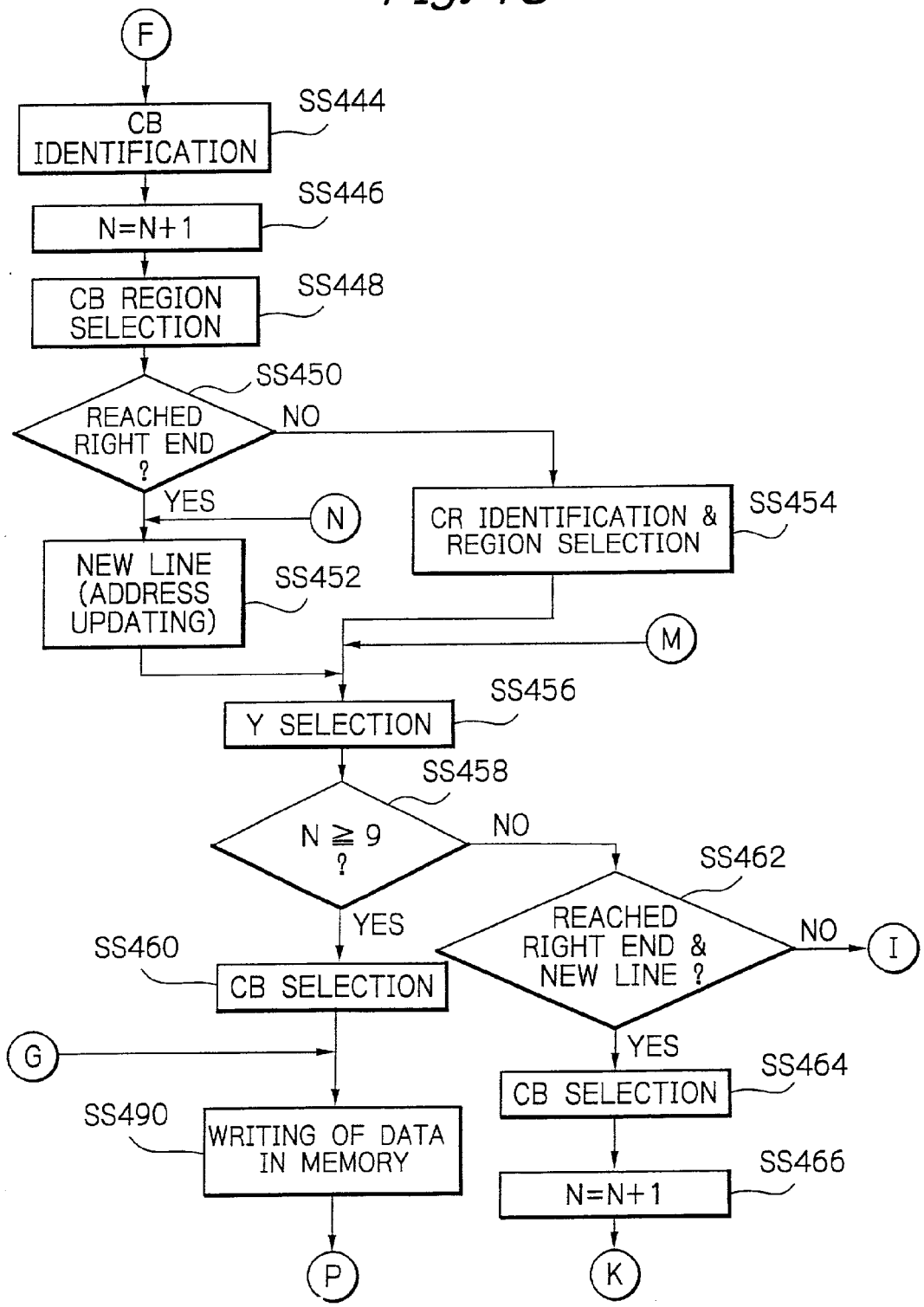
Figure 19:
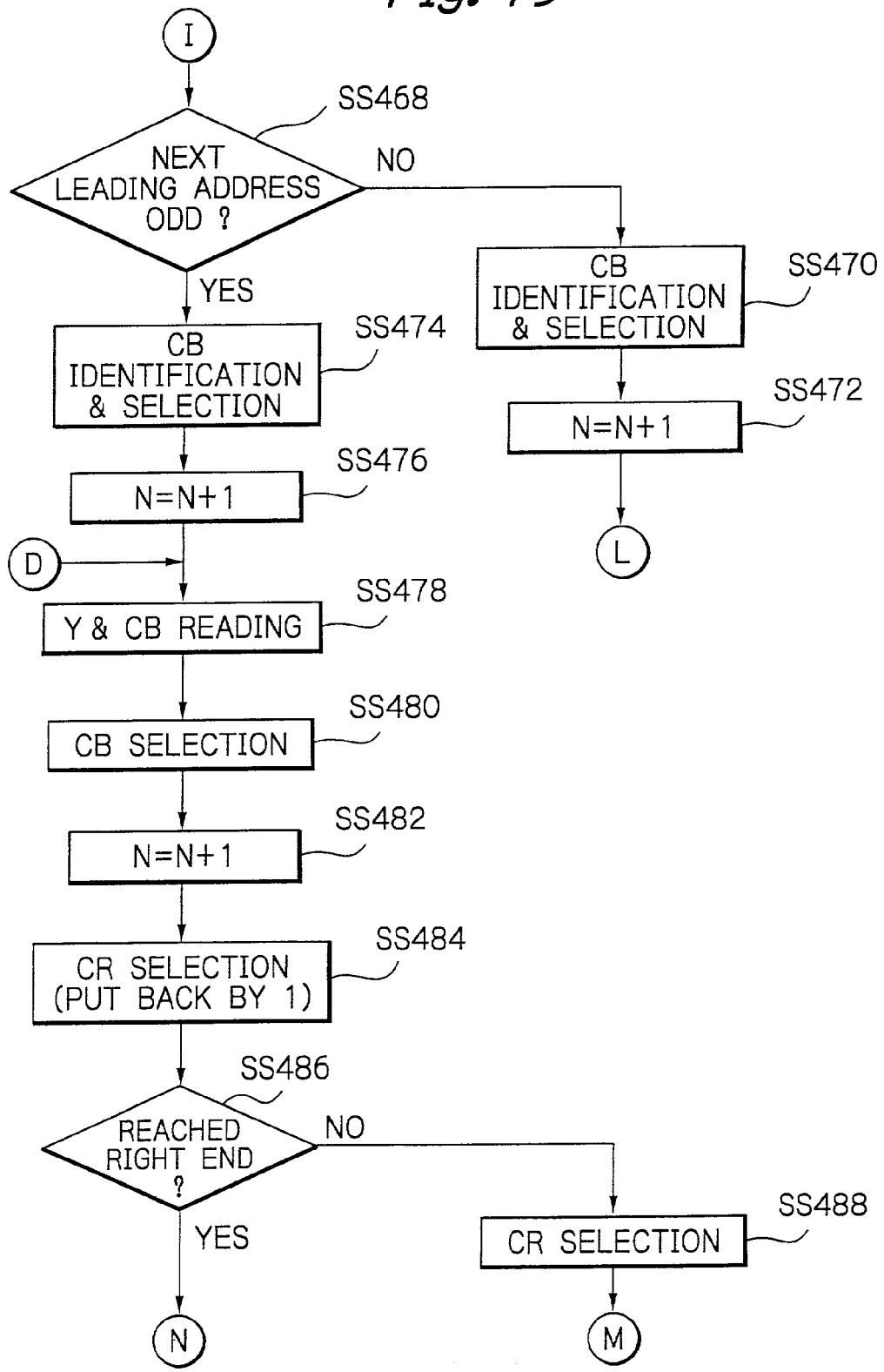
Figure 20:
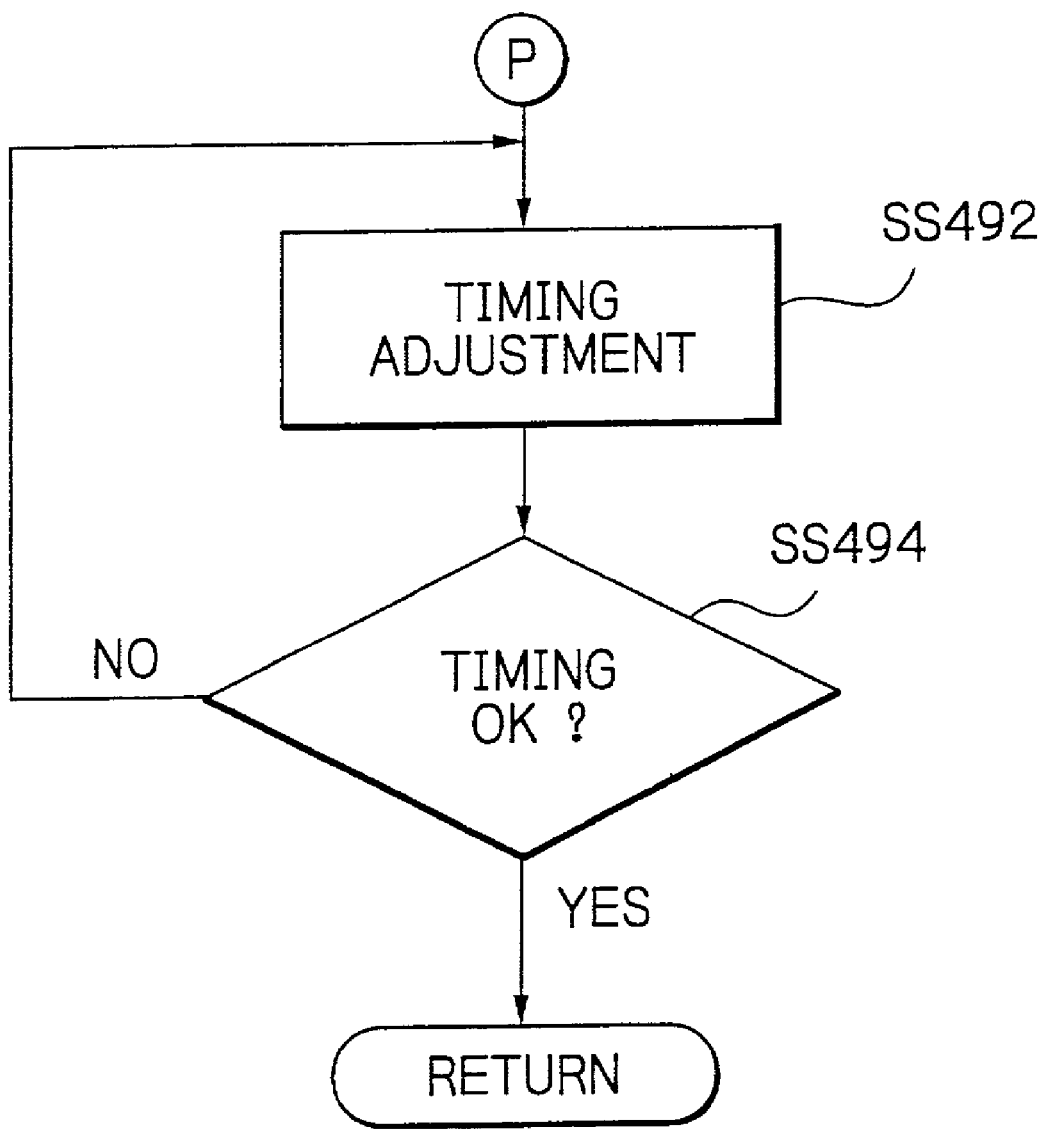

If the answer of the substep SS462, FIG. 18, is NO, the operation is transferred to a substep SS468 (lowest priority) shown in FIG. 19 via a connector I. In the substep SS468, the processing section 10h determines whether or not the leading address is odd. If the answer of the substep SS468 is NO, meaning that the leading address is even, the processing section 10h selects color CB for the same reason as described in relation to the substep SS464 (substep SS470). The processing section 10h then increments the count N by 1 (substep SS472). Subsequently, the operation returns to the substep SS414 (READ_YCR), FIG. 16.

If the answer of the substep SS468 is YES, the processing section selects 10h color CB (substep SS474) and then increments the count N by 1 (substep SS476). Thereafter, the processing section 10h deals with the leading, odd address (substep SS478; READ_YCB1).

As stated above, when the leading address is even, the processing section 10h does not select data remote from luminance data Y by the zoom address, but selects color data CB existing at the address incremented by 1 from the address read first. The processing section 10h then reads the next luminance data Y and thereby maintains the pair relation between the luminance data and the color data.

In the substep SS478, the processing section 10h reads luminance data Y with the enable signal and reads color data CB as well (substep SS478; CBEN=ONE). More specifically, the processing section 10h selects the color data CB when the color select signal RLB is in a high level (substep SS480). Subsequently, the processing section 10h increments the count N by 1 (substep SS482) and then selects color data existing at an address put back by one (substep SS484; READ_CR).

After the substep SS484, the processing section 10h determines whether or not the access has reached the right end of the address space (substep SS486). If the answer of the substep SS486 is NO, the processing section 10h reads color data CR corresponding to the address of the luminance data Y put back by one and then selects it (substep SS488; RLB=ZERO). Subsequently, the processing section 10*h* outputs the luminance data Y and color data CR in a pair. The substep SS488 is followed by a substep SS456 (READ_Y2) shown in FIG. 18 via a connector M. Such a sequence of steps successively reads image data without disturbing the pair relation between the luminance data and the color data despite electronic zooming executed with the 4:2:2 sampling type of image data.

If the answer of the substep SS486 is YES, the operation is transferred to a substep SS452 (READNOP3) shown in FIG. 18 via a connector N. For the decision in the substep SS486, the processing section 10*h* may reference the status of a preselected flag.

When one packet of image data (luminance data Y and color data CR/CB) is read out (highest priority), the processing section 10*h* executes a substep SS490 shown in FIG. 18 as in the case with an even leading address. In the substep SS490, the processing section 10*h* writes the image data in the video memory 14. Subsequently, the processing section executes timing adjustment shown in FIG. 20 (substep SS492). Specifically, in the substep SS492, the processing section 10*h* adjusts the sampling timing using the clock 10*b* not synchronous to the horizontal or the vertical sync signal particular to the TV system, so that the image data can be adequately handed over. The processing section 10*h* then determines whether or not the adjustment is complete (substep SS494). If the answer of the substep SS494 is NO, the processing section 10*h* returns to the substep SS492. If the answer of the substep SS494 is YES, then the subroutine SUB4 ends.

The display sequencer 20, which executes the adjustment described above, obviates false colors and other defects ascribable to the 4:2:2 sampling format executed with the image data in the ×1 mode or the zoom mode.

Figure 21:
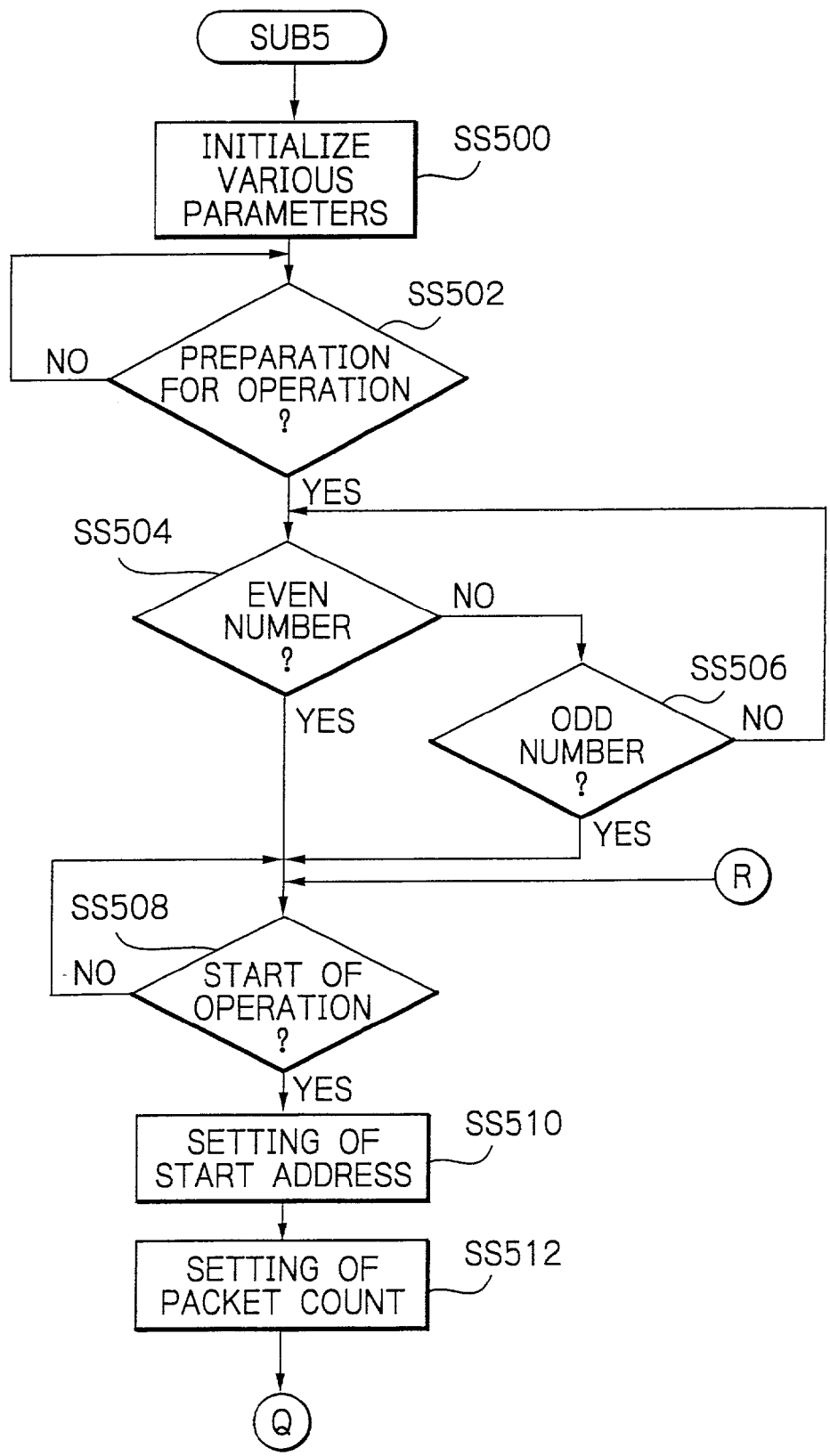
FIG. 21 is a flowchart representative of a subroutine SUB5 shown in FIG. 14.

The display sequencer 20 outputs the image data in accordance with the subroutine SUB5. The subroutine SUB5 will be described in detail with reference to FIGS. 21 and 22. As shown, the display sequencer 20 initializes various parameters for adjusting the display order (substep SS500). The display sequencer 20 then determines whether or not preprocessing for display should be executed (substep SS502). If a display stop flag, for example, is set (NO, substep SS502; STOP_DISPL=ONE), the display sequencer 20 simply waits, determining that the current stage to be a preparation stage.

If the answer of the substep SS502 is YES, the display sequencer 20 executes a substep SS504 in accordance with the parameters, e.g., DVD and DFLD. In the substep SS504, the display sequencer 20 determines whether or not the display output is an even number. For example, if the parameters DVD and DFLD both are ZERO (YES, substep SS504), the display sequencer 20 determines that the display output is an even number and that the second field is to be displayed. If the answer of the substep SS504 is NO, the display sequencer, i.e., if the parameters DVD and DFLD are ZERO and ONE, respectively, the display sequencer 20 determines that the display output is an odd number and that the first field should be displayed.

Subsequently, the display sequencer determines whether or not conditions for starting operation (STFLG=ONE, DVD=ONE, DHD=ONE and DISP_REQ=ONE) are satisfied (substep SS508). If the answer of the substeps SS508 is YES, the display sequencer 20 sets a start address (substep SS510). At the same time, the display sequencer 20 sets the initial packet count (substep SS512). The substep SS512 is followed by a substep SS516 shown in FIG. 22 via a connector Q. If the answer of the substep SS508 is NO, the substep SS508 is repeated.

Figure 22:
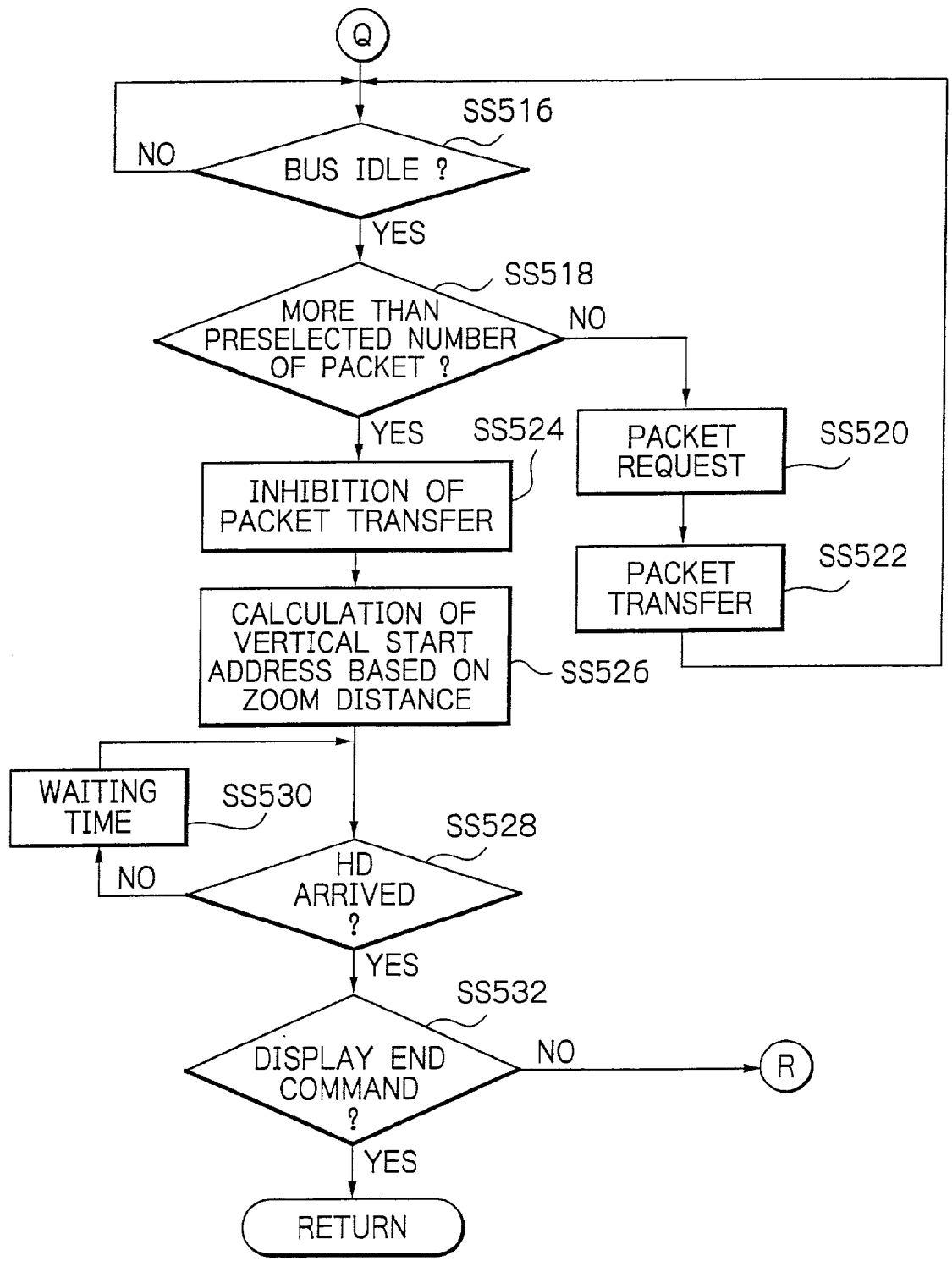
FIG. 22 is a flowchart showing the rest of the subroutine SUB 5.

In the substep SS516, FIG. 22, the display sequencer 20 determines whether or not the bus 32 is idle and available for the transfer of the image data to the buffer memory 12. Specifically, the display sequencer 20 sends a bus occupation request to the bus arbitrator 18. In response, the bus arbitrator 18 allows the display sequencer 20 to use the bus 32 in accordance with the priority order. If the answer of the substep SS516 is NO, the display sequencer 20 simply waits.

If the answer of the step SS516 is YES, the display sequencer 20 determines whether or not a preselected number of packets corresponding to one line are available (substep SS518). If the answer of the substep SS518 is NO, the display sequencer 20 outputs a packet request (DISP_REQ=ONE) (substep SS520). As a result, the packets are actually output (substep SS522). Thereafter, the operation returns to the substep SS516. If the actual number of packets is greater than the preselected number, the output of the packets is inhibited (substep SS524). Consequently, one line of image data is fed in the form of packets. In the illustrative embodiment, eighty packets correspond to one line, as stated earlier.

In the zoom mode, zoom control should preferably be effected not only in the horizontal direction shown and described, but also in the vertical direction, so that an attractive zoom image with consideration given to the aspect ratio can be displayed. For this purpose, the display sequencer 20 calculates a start address to be read out next in the vertical direction and corresponding to the zoom distance or address distance (substep SS526).

Subsequently, the display sequencer 20 determines whether or not the horizontal sync signal HD has arrived, i.e., the end of one line has been reached (substep SS528). If the answer of the step SS528 is NO, the display sequencer waits for the arrival of the signal HD (substep SS530). This waiting state corresponds to the interval labeled FREE in FIG. 10, (b) If the answer of the substep SS528 is YES, the display sequencer determines whether or not a display end command is input thereto (substep SS532). If the answer of the substep SS532 is NO, the operation returns to the substep SS508, FIG. 21, via a connector R. If the answer of the substep SS532 is YES, the display sequencer 20 ends the subroutine SUB5.

The procedure described above allows the image data to be written to the buffer memory 12*b* within a preselected period of time. At the same time, the procedure allows CPU data, DMA data or the like to be fed for executing effective memory control within the preselected period of time. In addition, the address in the direction of row is varied such that the variation of address in the direction of column is detected only when valid luminance data is to be read out, thereby promoting efficient electronic zooming.

Figure 23:
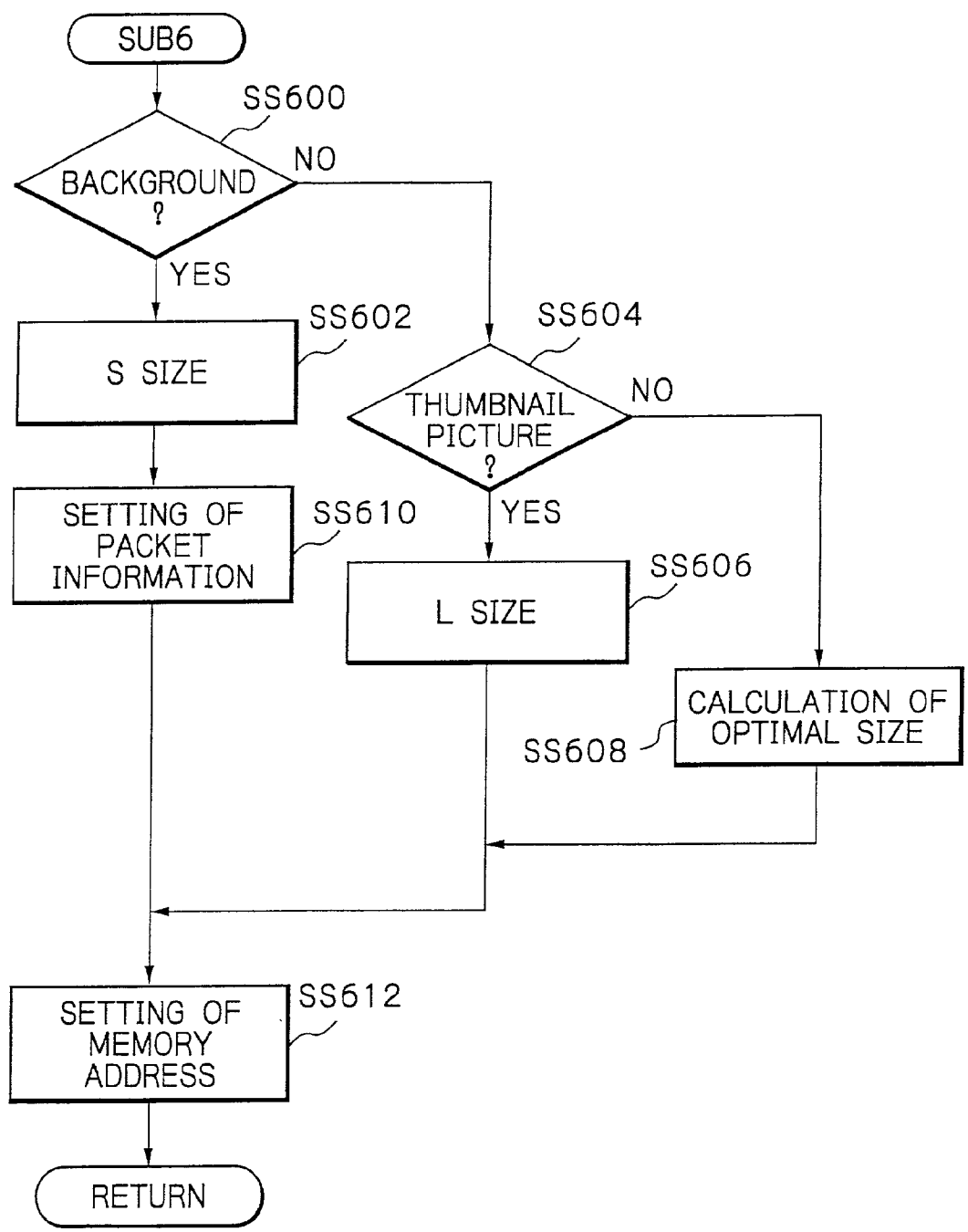
FIG. 23 is a flowchart representative of a subroutine SUB6 shown in FIG. 15.

Reference will be made to FIG. 23 for describing the subroutine SUB6 in which the display sequencer 20 varies the packet size. As shown, the display sequencer 20 determines whether or not the analyzed parameter of a packet indicates, e.g., a background (substep SS600). If the answer of the substep SS600 is YES, the display sequencer 20 selects the S size because the amount of the original data for displaying part of a picture is small (substep SS602). The display sequencer 20 again divides the packets by the S size. If the answer of the substep SS600 is NO, the display sequencer 20 determines whether or not the parameter indicates a thumbnail picture (substep SS604).

Assume that the parameter indicates a thumbnail picture far smaller in the amount of image data than the entire picture (YES, substep SS604). Then, the display sequencer 20 selects the L size larger than the M size or usual size and again divides the packets by the L size (substep SS606). If the result of analysis does not indicate a background or a thumbnail picture and if the packet size is the M size (NO, substep SS604), the display sequencer 20 calculates an optimal packet size for enhancing the data transfer efficiency (substep SS608). The display sequencer 20 then sets the calculated packet size and again divides the packets by the set packet size.

After the substep SS602, the display sequencer 20 sets packet information (substep SS610). The packet information shows how many times the packet data representative of the background should be copied to restore one line of data after being transferred at least once. If the packet size is eight bits and if the number of valid pixel data is sixteen bits, then it will be easily seen that the above packet data should be copied twice. The number of times of copying may be indicated by the instruction data 32a, if desired. It will also been seen that only one-half of the packets, i.e., forty packets should be transferred.

After the substep SS606, SS608 or SS610, the display sequencer 20 sets the memory address of the data corrector 30, which is the destination of the packets (substep SS612). The address should preferably be indicated by the instruction data 32a output from the CPU22 through the bus 32. After the substep SS612, the display sequencer 20 ends the subroutine SUB6.

Figure 24:
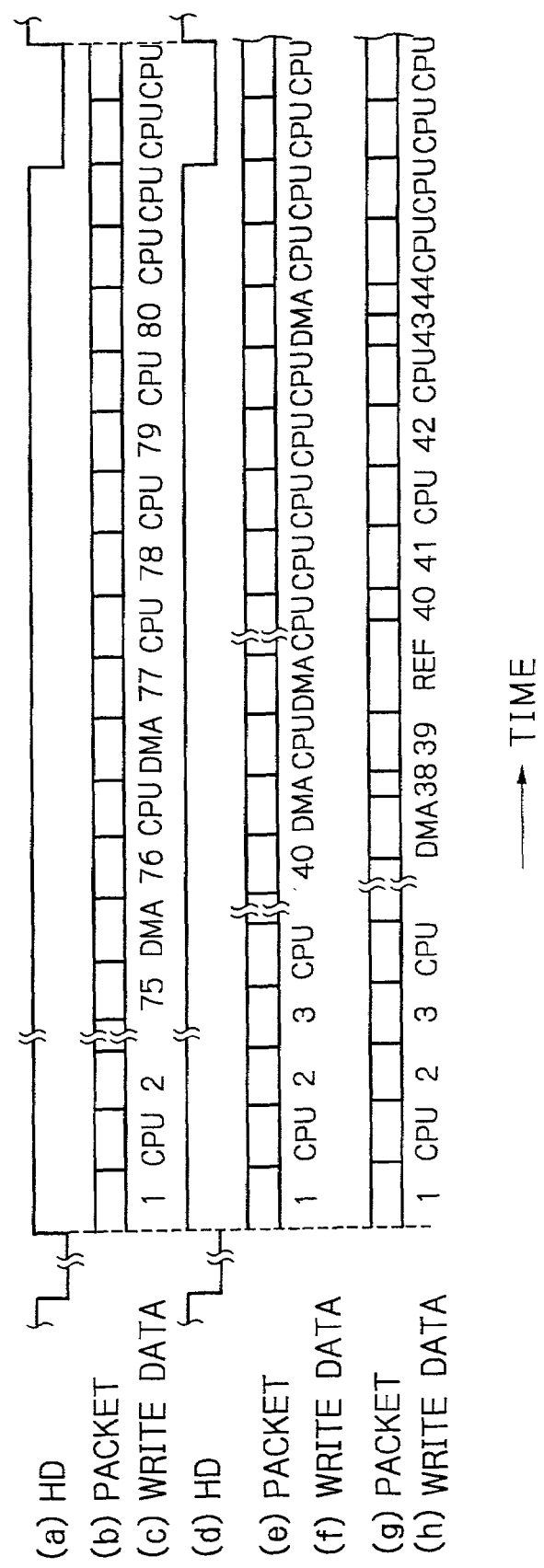
FIG. 24 is a timing chart showing a relation between packets transferred on one line, a packet size and the number of packets transferred.

How the display sequencer 20 varies the packet size in accordance with input information and then delivers packet data to the data corrector 30 through the bus 32 an adequate number of times will be briefly described with reference to FIG. 24. FIGS. 24, (a), (b) and (c), respectively shows the horizontal synchronizing signal HD, packets of the medium or usual size, and the contents of data stored in the packets. As shown, eighty packets are usually transferred to the data corrector 30 within a valid period between the positive-going edge and the negative-going edge of the horizontal sync signal HD (see FIG. 24, (c))

FIGS. 24, (e) and (f), shows the case wherein the number of packets usually transferred is halved, i.e., the packet data are copied two times although the packet size is the same as in FIGS. 24, (a) and (b). In this case, the data corrector 30 doubles the received packet data in accordance with the indicated number of times of copying. That is, only forty packets should be transferred to the data corrector 30. If desired, the data corrector 30 may store background data beforehand, in which case the data corrector 30 should only be informed of the number of times of copying and the address.

FIGS. 24, (g) and (h), shows the case wherein the packet size is dynamically varied. As shown, although forty-four packets are transferred to the data corrector 30, a pixel copying function is applied to part of the packets so as to implement data transfer.

By transferring the data through the bus 32 in the above-described manner, the display sequencer 20 reduces the amount of image data to be transferred. This reduces the occupation ratio of the bus 32 by the transfer of image data. The resulting empty packets may store information output from, e.g., the CPU 22, so that the CPU 22, for example, can rapidly respond to accesses. The rapid response further promotes rapid rewriting or similar processing relating to the frame memory.

Figure 25:
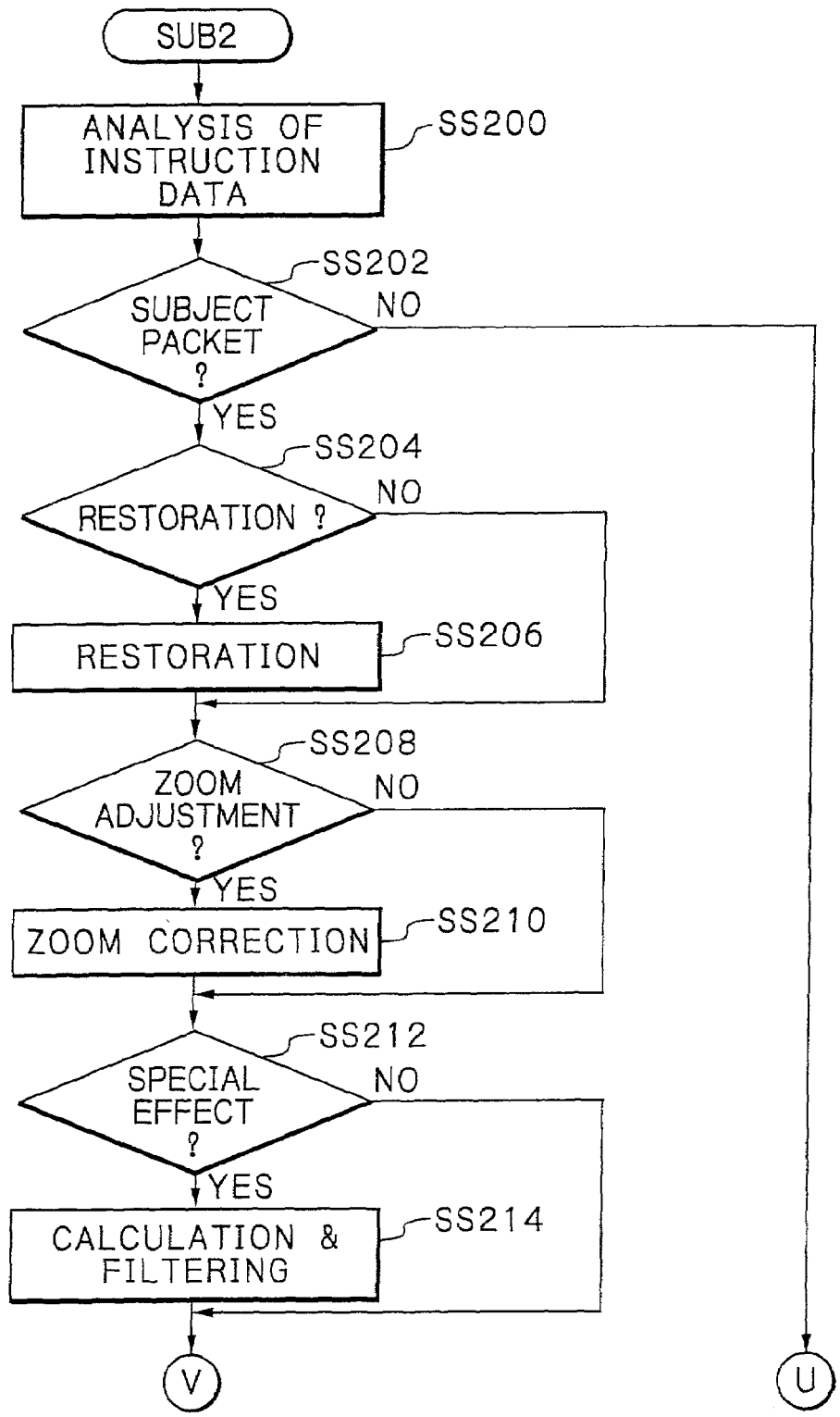
FIG. 25 is a flowchart demonstrating a subroutine SUB2 included in the main routine in detail.
Figure 26:
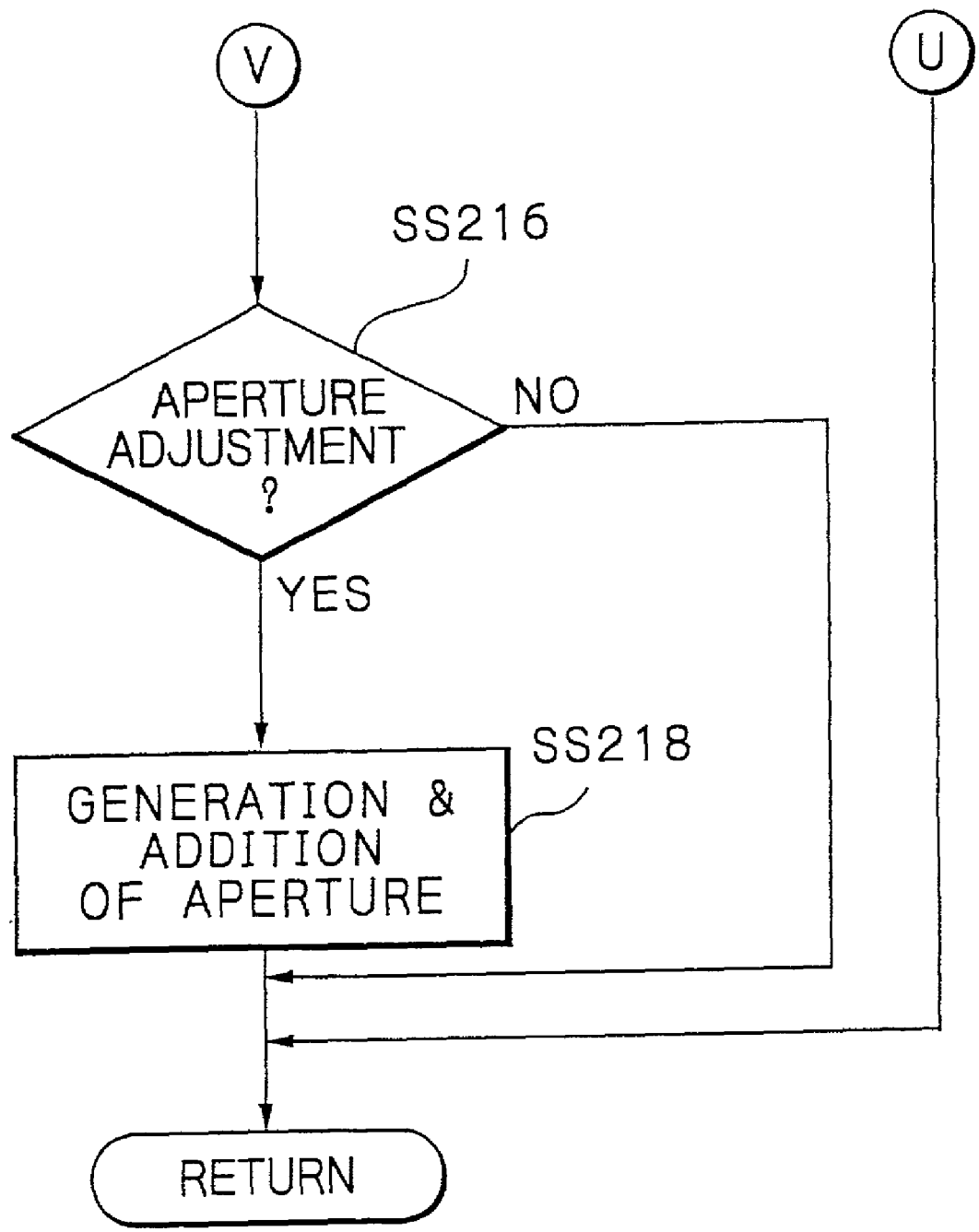
FIG. 26 is a flowchart showing the rest of the subroutine SUB2.

FIGS. 25 and 26 show the subroutine SUB2 executed by the data corrector 30 in detail. The data corrector 30 can restore the packet data by executing processing opposite to the processing for varying the packet size. As shown, the data corrector 30 analyzes the instruction data 32a output from the decoder 300 and the data representative of the number of valid pixels (substep SS200). In the specific procedure shown in FIG. 25, the data corrector 30 is assumed to execute various kinds of signal processing in accordance with the instruction data 32a.

The data corrector 30 determines, based on the result of the above analysis, whether or not the received packets are the subject pixels to be restored and processed (substep SS202) If the answer of the substep SS202 is NO, the operation returns via a connector U. If the answer of the substep SS202 is YES, the data corrector 30 determines whether or not the instruction data 32a is indicative of data restoration (substep SS204). If the answer of the substep SS204 is YES, the data corrector 30 restores the input data (substep SS206). More specifically, the data selector 306 repeatedly copies the received packet data or the data output from the register 304 in accordance with the number of times of copying or the leading address of the source of the data, thereby restoring one line of data.

If the answer of the substep SS204 is NO or after the data restoration, the data corrector 30 determines whether or not electronic zooming should be adjusted (substep SS208) If the answer of the substep SS208 is YES, the electronic zoom corrector 308 varies the size or magnification of the electronic zooming packet by packet (substep SS210). More specifically, the zoom corrector 308 finely adjusts the zoom magnification while maintaining the sampled condition stated previously. This is a simple implementation for correcting the aberration of the lenses ascribable to distortion, frequency characteristic and MTF (Modulation Transfer Function). In practice, not only the horizontal sampling but also the vertical sampling should preferably be adjusted line by line. The correction should only be applied to a minimum amount of data because of the limited number of division of packets for a single picture, allowing small background data to be enlarged on the display.

If the answer of the substep SS208 is NO, the data corrector 30 determines whether or not the instruction data 32a is indicative of a special effect (substep SS212). If the answer of the substep SS212 is YES, the calculator/filter 310 executes digital signal processing packet by packet. The digital signal processing includes low-pass filtering that varies a frequency characteristic in order to reduce noise contained in the packet data. The digital signal processing further includes coring for cutting frequencies below a preselected level, gain control relating to the lightness of the individual packet, contrast control, special effect processing, and so forth. For gain control, the calculator/filter 310 compensates for dimming apt to occur in the peripheral portion of a picture taken by, e.g., a wide-angle lens. The special effect processing includes tessellation, blurring, partial multiplication, and a fisheye processing.

If the answer of the substep SS212 is NO, the operation is transferred to a substep SS216 shown in FIG. 26 via a connector V. In the substep SS216, the data corrector 30 determines whether or not the instruction data 32a is indicative of aperture control. If the answer of the substep SS216 is YES, the aperture generator 312 generates a signal component for improving the aperture so as to implement sharpness particular to the individual packet. At this instant, the packet data and the above signal component are input to the terminals 314a and 314b of the adder 314, respectively.

The adder 314 adds the two input signals to thereby improve the aperture. After the aperture control or if the answer of the substep SS216 is NO, the data corrector 30 ends the subroutine SUB2.

The variation of the packet size and the restoration of the packet data effected in the subroutines SUB3 and SUB2, respectively, reduce the number of times of write access to the video memory 14 and therefore power consumption. Moreover, such processing reduces the period of time over which the data transfer occupies the bus 32, and therefore allows empty packets to store CPU data and DMA data to thereby enhance response to accesses for control. This again enhances, e.g., rapid rewriting of a picture in the frame memory.

FIG. 27 shows a specific picture 122 appearing as if it were put in a frame 124. In this case, the addresses of the frame 124 are designated in the S size while the number of times of copying is transferred to the data corrector 30. In response, the data selector 306 restores the packet data by repeated copying. Alternatively, to form the frame 124, the data corrector 30 may store data fed from the CPU 22 in the register 304 as the instruction data 32a and then feed data read out at the designated addresses to the data selector 306.

Assume that small image data representative of conditions around a sailboat are fed to the image control processing section 10h one time. Then, the processing section 10h may copy the input image data while taking account of the display position and display size of the subject. This allows another sail boat to be displayed in an enlarged scale in front of the above sailboat, as in the picture of FIG. 27. More specifically a thumbnail picture may be enlarged and displayed as a large image.

While the illustrative embodiment has concentrated on packeted video data, music data or similar audio data may also be packeted so as to be output together with a picture.

Assume that the illustrative embodiment is used to control the monitor of a digital camera. Then, the illustrative embodiment implements not only rapid display but also accurate signal processing relating to display, thereby saving power. Of course, the illustrative embodiment allows the operator of a digital camera not only to record pictures, but also to process them, so that the performance of the camera is further enhanced.

FIG. 28 shows an alternative embodiment of the present invention. This embodiment is configured to save power more positively than the previous embodiment. Part of the illustrative embodiment not directly relevant to the image pickup system of FIG. 1A is not shown in FIG. 28. As shown, the digital camera 10 additionally includes a source voltage detector 10k including an ADC, which is connected to a power source 100a. The source voltage detector or ADC 10k measures the voltage of the power source 100a at a preselected timing while feeding the level of the measured voltage to a register 10m. The system controller 10j stated earlier controls the register 10m in order to read out a voltage level detected immediately before. The system controller 10j then produces a difference between the above voltage level and the current voltage level as well as a voltage drop ratio (slope). Subsequently, the system controller 10j determines whether or not the voltage drop ratio is coincident with a preselected ratio. If the answer of this decision is positive, the system controller 10j starts controlling the image control processing section 10h as to display. In addition, the system controller 10j outputs a control signal 101k for lowering the operation clock of the timing control section 12, so that the output speed of the image data to be displayed is lowered.

The register 10m may be implemented by a register included in the system controller 10j, if desired. Further, the source voltage detector 10k may include an analog comparator responsive to analog voltages in place of the ADC. The analog comparator receives a reference analog voltage level and actual source voltage level via its two input terminals. When the two voltage levels coincide, the analog comparator feeds, e.g., a high-level signal to the system controller 10j. This signal causes the system controller 10j to start controlling the image control processing section 10h as to display. This is also successful to extend a display time available with the digital camera 10 even when much power is not left for reproduction, thereby promoting the effective use of the power of a battery.

In summary, in accordance with the present invention, image data can be transferred more rapidly than conventional and can be subjected to various kinds of signal processing that heighten the value of image data. The image data are output in accordance with preselected standards. This reduces the number of times of write access to a memory and therefore power consumption while displaying a value added picture. Further, a processing time necessary for image data to be output under the preselected standards and therefor the number of times of access to the memory is reduced, also saving power.

The entire disclosure of Japanese patent application Nos. 2000-275602 and Sep. 11, 2000 and 2001-230228 filed on Jul. 30, 2001, respectively, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image control device for controlling input image data, executing signal processing with controlled image data, and outputting processed image data in accordance with a preselected standard, said device comprising:

a memory for storing the input image data;

a standard adjusting circuit for storing the image data read out of said memory therein and outputting stored image data at a timing matching with the preselected standard;

a memory control circuit for controlling at least said memory and said standard adjusting circuit, said memory control circuit controlling input and output of the image data from said memory, setting a unit amount of continuous image data to be handled together at the time of output, setting a unit number of image data for a single line and consisting of unit amounts of continuous image data, and outputting a request for an access to said memory to thereby control read-out;

a communicating circuit for selectively sending or receiving the image data;

an image correcting circuit for analyzing, when the image data read out of said memory are smaller in amount than the unit number of image data, particular information particular to said image data and relating to display, and executing, based on a result of analysis, at least one of restoration and processing with each unit image data of divided image data;

an instruction information feeding circuit for encoding the particular information and feeding encoded particular information to said image correcting circuit;

a display adjusting circuit for adjusting, based on a condition input in accordance with a combination of luminance data and color data constituting the image data read out of said memory, a sampling order and controlling feed of the unit number of image data; and an arbitrating circuit for giving the highest degree of priority to an access for refreshing said memory, and arbitrating an access request for control data, which differs from the image data, with respect to a remaining accessible time when said image data are output, wherein said display adjusting circuit comprising a size controlling circuit for controlling, when supplied with valid pixel number information representative of a number of pixels to be actually used for display and independent of a data size whose unit is the unit amount of image data, output of image data short of the unit number of image data on the basis of said number of pixels or controlling, based on said data size, delivery of said unit number of image data on a single line, and delivering controlled image data to said memory, wherein said communicating circuit comprises an interface for interchanging the image data with a unit located outside of said device, and wherein said image correcting circuit and said instruction information feeding circuit precede said standard adjusting circuit.

2. The device in accordance with claim 1, wherein said communicating circuit communicates via an extended bus width or an additional exclusive line assigned to the particular information as well as to data and operation control.

3. The device in accordance with claim 2, wherein said size controlling circuit comprises:

a header analyzing circuit for analyzing header information included in the image data; and a size resetting circuit for resetting, in accordance with a result of analysis output from said header analyzing circuit, a data size of the unit amount of image data by which the image data are divided, and dividing said image data by a reset data size.

4. The device in accordance with claim 3, wherein said size resetting circuit comprises a small-division function block for making, a size of a division of the image data smaller than a usual size when the result of analysis of the header information shows that a preselected image pattern should be repeated to form a display area;

a large-size function block for making the size of the division larger than the usual size when the result of analysis shows that a thumbnail image should be displayed; and an optimal division function block for calculating, when the result of analysis shows a size different in the division of image data from repetition of the preselected pattern, the thumbnail image and the usual size, a size that optimally divides the image data, and again dividing said image data by a calculated size.

5. The device in accordance with claim 4, wherein said small-size function block executes at least one of feed of the preselected image pattern and indication of said feed, calculates a number of times of repetition, and delivers image data representative of said preselected image pattern.

6. The device in accordance with claim 5, further comprising:

a source voltage detecting circuit for detecting a voltage of a power source that drives said device; and a system control circuit for controlling at least said memory controller and said image correcting circuit when the voltage output from said source voltage detecting circuit is lower than a preselected reference voltage.

7. The device in accordance with claim 6, wherein said system control circuit controls a frequency of a clock signal output from said standard adjusting circuit.

8. The device in accordance with claim 2, wherein said image correcting circuit comprises a storage for storing beforehand the particular information or data for replacement for each divided image data to be handled together.

9. The device in accordance with clam 2, wherein said image correcting circuit comprises:

an instruction analyzing circuit for separating and analyzing a content of the particular information and outputting a plurality of kinds of analyzed instruction information as a control signal;

a restoration adjusting circuit for restoring the image data to a preselected data size in accordance with, among the instruction information included in the control signal, first information representative of a data size of said image data;

a data copying circuit for repeatedly copying, based on second information independent of the data size and representative of the valid number of pixels as one of the instruction information, the image data a number of times derived from a leading one of the addresses included in the control signal;

a data selecting circuit for selecting, based on at least one of the second information and third information independent of the data size and indicative of a leading address for writing image data, one of the preselected region of the image data, said image data and data of the instruction information and outputs said preselected region, said image data or said data to said standard adjusting circuit;

an aperture generating circuit for generating an aperture component in accordance with fourth information independent of the data size and representative of sharpness particular to each of divided image data to be handled together;

an adding circuit for adding the aperture component to the image data;

a signal correcting circuit for executing, based on fifth information independent of the data size and representative of at least one of lightness, contract, a noise level and special effect processing particular to each divided image data to be handled together; and a zoom correcting circuit for executing electronic zoom processing each divided image data in accordance with sixth information independent of the data size and representative of an electronic zoom magnification particular to each divided image data to be handled together.

10. An image control device for controlling input image data, executing signal processing with controlled image data, and outputting processed image data in accordance with a preselected standard, said device comprising:

a memory for storing the input image data;

a standard adjusting circuit for storing the image data read out of said memory therein and outputting stored image data at a timing matching with the preselected standard;

a memory control circuit for controlling at least said memory and said standard adjusting circuit, said memory control circuit controlling input and output of the image data from said memory, setting a unit amount of continuous image data to be handled together at the time of output, setting a unit number of image data for a single line and consisting of unit amounts of continuous image data, and outputting a request for an access to said memory to thereby control read-out;

a communicating circuit for selectively sending or receiving the image data;

an image correcting circuit for analyzing, when the image data read out of said memory are smaller in amount than the unit number of image data, particular information particular to said image data and relating to display, and executing, based on a result of analysis, at least one of restoration and processing with each unit image data of divided image data; and an instruction information feeding circuit for encoding the particular information and feeding encoded particular information to said image correcting circuit, wherein said image correcting circuit and said instruction information feeding circuit precede said standard adjusting circuit, wherein said image correcting circuit comprises:

an instruction analyzing circuit for separating and analyzing a content of the particular information as the instruction information and outputting a control signal representative of a result of analysis of said instruction information; and a restoration adjusting circuit for restoring the image data to a preselected data size in accordance with, among the instruction information included in the control signal, first information representative of a data size of said image data.

11. The device in accordance with claim 10, wherein said instruction analyzing circuit separates, among the particular information, second information independent of the data size and representative of the valid number of pixels as one of the instruction information, divides said data size by said second information, determines the image data corresponding to a resulting quotient, determines a leading address of a destination on the basis of said instruction information, selecting a reciprocal multiple of said quotient as a number of times of copying, and outputs said image data corresponding to said quotient, said leading address, and said number of times of copying as the control signal, and said image correcting circuit further comprises a data copying circuit for copying the image data, a leading address being first, the number of times of copying while matching addresses included in the control signal to said image data.

12. The device in accordance with claim 11, wherein said data copying circuit repeatedly outputs, based on the second information, the image data read out of a preselected area of said memory or data read out of a register, which stores the instruction information, the number of times of copying.

13. The device in accordance with claim 10, wherein said instruction analyzing circuit separates and analyzes, among the particular information, third information independent of the data size and indicative of a leading address for writing image data in any position of said standard adjusting circuit, and delivers analyzed instruction information to said standard adjusting circuit as the control signal, and said image correcting circuit further comprises a data selecting circuit for selecting, based on at least one of the second information, independent of the data size and representative of the valid number of pixels as one of the instruction information, and the third information, one of the preselected region of the image data, said image data and data of the instruction information and outputs said preselected area, said image data or said data to said standard adjusting circuit.

14. The device in accordance with claim 13, wherein said data selecting circuit outputs, based on the third information, the image data of the preselected area or pattern data representative of a preselected pattern and indicated by the instruction information in a position different from the image data in accordance with the leading address.

15. The device in accordance with claim 10, wherein said instruction analyzing circuit separates and analyzes, among the particular information, fourth information independent of the data size and representative of sharpness particular to each of divided image data to be handled together, and outputs analyzed instruction information as the control signal, and said image correcting circuit further comprises:

an aperture generating circuit for generating an aperture component; and an adding circuit for adding the aperture component to the divided image data.

16. The device in accordance with claim 15, wherein said aperture generating circuit comprises an aperture adjusting block for varying the sharpness of each divided image data in accordance with the forth information.

17. The device in accordance with claim 10, wherein said instruction analyzing circuit separates and analyzes, among the particular information, fifth information independent of the data size and representative of at least one of lightness, contract, a noise level and special effect processing particular to each divided image data to be handled together, and outputs analyzed instruction information as the control signal, and said image correcting circuit further comprises a signal correcting circuit for executing, based on the fifth information, at least one of lightness or contrast improvement, noise reduction and special effect processing with each divided image data.

18. The device in accordance with claim 17, wherein said signal correcting circuit comprises:

a calculating circuit for varying, based on the fifth information, at least one of the lightness, contrast and noise level of each divided image data; and a filtering circuit for executing, based on the fifth information, the special effect processing with each divided image data and varying a frequency characteristic of said divided image data.

19. The device in accordance with claim 10, wherein said instruction analyzing circuit separates and analyzes, among the particular information, sixth information independent of the data size and representative of an electronic zoom magnification particular to each divided image data to be handled together and outputs analyzed instruction information as the control signal, and said image correcting circuit further comprises a zoom correcting circuit for executing electronic zoom processing particular to each divided image data in accordance with the sixth information.

20. The device in accordance with claim 19, wherein said zoom correcting circuit executes, based on the sixth information, distortion correction with each divided image data for compensating for distortion of optics.

21. The device in accordance with claim 10, further comprising:

a source voltage detecting circuit for detecting a voltage of a power source that drives said device; and a system control circuit for controlling at least said memory controller and said image correcting circuit when the voltage output from said source voltage detecting circuit is lower than a preselected reference voltage.

22. The device in accordance with claim 21, wherein said system control circuit controls a frequency of a clock signal output from said standard adjusting circuit.

23. A digital camera for focusing incident light representative of a scene on optics, picking up said incident light by photoelectric transduction, converting resulting signal charges to a digital signal to thereby output raw image data, executing matrix processing with said raw image data to thereby produce dot-sequential image data consisting of luminance data and color data, compressing or expanding said image data, writing compressed image data in a recording medium or reading said compressed data out of said recording medium, said digital camera comprising:
 a memory for storing the input image data;
 a standard adjusting circuit for storing the image data read out of said memory therein and outputting stored image data at a timing matching with the preselected standard;
 a memory control circuit for controlling at least said memory and said standard adjusting circuit, said memory control circuit controlling input and output of the image data from said memory, setting a unit amount of continuous image data to be handled together at the time of output, setting a unit number of image data for a single line and consisting of unit amounts of continuous image data, and outputting a request for an access to said memory to thereby control read-out;
 a communicating circuit for selectively sending or receiving the image data;
 an image correcting circuit for analyzing, when the image data read out of said memory are smaller in amount than the unit number of image data, particular information particular to said image data and relating to display, and executing, based on a result of analysis, at least one of restoration and processing with each unit image data of divided image data;
 an instruction information feeding circuit for encoding the particular information and feeding encoded particular information to said image correcting circuit;
 a display adjusting circuit for adjusting, based on a condition input in accordance with a combination of luminance data and color data constituting the image data read out of said memory, a sampling order and controlling feed of the unit number of image data; and
 an arbitrating circuit for giving the highest degree of priority to an access for refreshing said memory, and arbitrating an access request for control data, which differs from the image data, with respect to a remaining accessible time when said image data are output,
 wherein said display adjusting circuit comprising a size controlling circuit for controlling, when supplied with valid pixel number information representative of a number of pixels to be actually used for display and independent of a data size whose unit is the unit amount of image data, output of image data short of the unit number of image data on the basis of said number of pixels or controlling, based on said data size, delivery of said unit number of image data on a single line, and delivering controlled image data to said memory,
 wherein said image correcting circuit and said instruction information feeding circuit precede said standard adjusting circuit, and
 wherein said communicating circuit comprises an interface for interchanging the image data with a unit located outside of said device.

24. The camera in accordance with claim 23,
 wherein said communicating circuit communicates via an extended bus width or an additional exclusive line assigned to the particular information as well as to data and operation control.

25. The camera in accordance with claim 24, wherein said size controlling circuit comprises:
 a header analyzing circuit for analyzing header information included in the image data; and
 a size resetting circuit for resetting, in accordance with a result of analysis output from said header analyzing circuit, a data size of the unit amount of image data by which the image data are divided, and dividing said image data by a reset data size.

26. The camera in accordance with claim 25, wherein said size resetting circuit comprises a small-division function block for making, a size of a division of the image data smaller than a usual size when the result of analysis of the header information shows that a preselected image pattern should be repeated to form a display area;
 a large-size function block for making the size of the division larger than the usual size when the result of analysis shows that a thumbnail image should be displayed; and
 an optimal division function block for calculating, when the result of analysis shows a size different in the division of image data from repetition of the preselected pattern, the thumbnail image and the usual size, a size that optimally divides the image data, and again dividing said image data by a calculated size.

27. The camera in accordance with claim 26, wherein said small-size function block executes at least one of feed of the preselected image pattern and indication of said feed, calculates a number of times of repetition, and delivers image data representative of said preselected image pattern.

28. The camera in accordance with claim 27, further comprising:
 a source voltage detecting circuit for detecting a voltage of a power source that drives said device; and
 a system control circuit for controlling at least said memory controller and said image correcting circuit when the voltage output from said source voltage detecting circuit is lower than a preselected reference voltage.

29. The camera in accordance with claim 24, wherein said image correcting circuit comprises a storage for storing beforehand the particular information or data for replacement for each divided image data to be handled together.

30. The camera in accordance with clam 24, wherein said image correcting circuit comprises:
 an instruction analyzing circuit for separating and analyzing a content of the particular information and outputting a plurality of kinds of analyzed instruction information as a control signal;
 a restoration adjusting circuit for restoring the image data to a preselected data size in accordance with, among the instruction information included in the control signal, first information representative of a data size of said image data;
 a data copying circuit for repeatedly copying, based on second information independent of the data size and representative of the valid number of pixels as one of the instruction information, the image data a number of times derived from a leading one of the addresses included in the control signal;
 a data selecting circuit for selecting, based on at least one of the second information and third information independent of the data size and indicative of a leading address for writing image data, one of the preselected region of the image data, said image data and data of the instruction information and outputs said preselected region, said image data or said data to said standard adjusting circuit;

an aperture generating circuit for generating an aperture component in accordance with fourth information independent of the data size and representative of sharpness particular to each of divided image data to be handled together;

an adding circuit for adding the aperture component to the image data;

a signal correcting circuit for executing, based on fifth information independent of the data size and representative of at least one of lightness, contract, a noise level and special effect processing particular to each divided image data to be handled together; and a zoom correcting circuit for executing electronic zoom processing each divided image data in accordance with sixth information independent of the data size and representative of an electronic zoom magnification particular to each divided image data to be handled together.

31. A digital camera for focusing incident light representative of a scene on optics, picking up said incident light by photoelectric transduction, converting resulting signal charges to a digital signal to thereby output raw image data, executing matrix processing with said raw image data to thereby produce dot-sequential image data consisting of luminance data and color data, compressing or expanding said image data, writing compressed image data in a recording medium or reading said compressed data out of said recording medium, said digital camera comprising:

a memory for storing the input image data;

a standard adjusting circuit for storing the image data read out of said memory therein and outputting stored image data at a timing matching with the preselected standard;

a memory control circuit for controlling at least said memory and said standard adjusting circuit, said memory control circuit controlling input and output of the image data from said memory, setting a unit amount of continuous image data to be handled together at the time of output, setting a unit number of image data for a single line and consisting of unit amounts of continuous image data, and outputting a request for an access to said memory to thereby control read-out;

a communicating circuit for selectively sending or receiving the image data;

an image correcting circuit for analyzing, when the image data read out of said memory are smaller in amount than the unit number of image data, particular information particular to said image data and relating to display, and executing, based on a result of analysis, at least one of restoration and processing with each unit image data of divided image data; and an instruction information feeding circuit for encoding the particular information and feeding encoded particular information to said image correcting circuit, wherein said image correcting circuit and said instruction information feeding circuit precede said standard adjusting circuit, wherein said image correcting circuit comprises:

an instruction analyzing circuit for separating and analyzing a content of the particular information as the instruction information and outputting a control signal representative of a result of analysis of said instruction information; and a restoration adjusting circuit for restoring the image data to a preselected data size in accordance with, among the instruction information included in the control signal, first information representative of a data size of said image data.

32. The camera in accordance with claim 31, wherein said instruction analyzing circuit separates, among the particular information, second information independent of the data size and representative of the valid number of pixels as one of the instruction information, divides said data size by said second information, determines the image data corresponding to a resulting quotient, determines a leading address of a destination on the basis of said instruction information, selecting a reciprocal multiple of said quotient as a number of times of copying, and outputs said image data corresponding to said quotient, said leading address, and said number of times of copying as the control signal, and said image correcting circuit further comprises a data copying circuit for copying the image data, a leading address being first, the number of times of copying while matching addresses included in the control signal to said image data.

33. The camera in accordance with claim 32, wherein said data copying circuit repeatedly outputs, based on the second information, the image data read out of a preselected area of said memory or data read out of a register, which stores the instruction information, the number of times of copying.

34. The camera in accordance with claim 31, wherein said instruction analyzing circuit separates and analyzes, among the particular information, third information independent of the data size and indicative of a leading address for writing image data in any position of said standard adjusting circuit, and delivers analyzed instruction information to said standard adjusting circuit as the control signal, and said image correcting circuit further comprises a data selecting circuit for selecting, based on at least one of the second information, independent of the data size and representative of the valid number of pixels as one of the instruction information, and the third information, one of the preselected region of the image data, said image data and data of the instruction information and outputs said preselected area, said image data or said data to said standard adjusting circuit.

35. The camera in accordance with claim 34, wherein said data selecting circuit outputs, based on the third information, the image data of the preselected area or pattern data representative of a preselected pattern and indicated by the instruction information in a position different from the image data in accordance with the leading address.

36. The camera in accordance with claim 31, wherein said instruction analyzing circuit separates and analyzes, among the particular information, fourth information independent of the data size and representative of sharpness particular to each of divided image data to be handled together, and outputs analyzed instruction information as the control signal, and said image correcting circuit further comprises:

an aperture generating circuit for generating an aperture component; and an adding circuit for adding the aperture component to the divided image data.

37. The camera in accordance with claim 36, wherein said aperture generating circuit comprises an aperture adjusting block for varying the sharpness of each divided image data in accordance with the forth information.

38. The camera in accordance with claim 31, wherein said instruction analyzing circuit separates and analyzes, among the particular information, fifth information independent of the data size and representative of at least one of lightness, contract, a noise level and special effect processing particular to each divided image data to be handled together, and outputs analyzed instruction information as the control signal, and said image correcting circuit further comprises a signal correcting circuit for executing, based on the fifth information, at least one of lightness or contrast improvement, noise reduction and special effect processing with each divided image data.

39. The camera in accordance with claim 38, wherein said signal correcting circuit comprises:

a calculating circuit for varying, based on the fifth information, at least one of the lightness, contrast and noise level of each divided image data; and a filtering circuit for executing, based on the fifth information, the special effect processing with each divided image data and varying a frequency characteristic of said divided image data.

40. The camera in accordance with claim 31, wherein said instruction analyzing circuit separates and analyzes, among the particular information, sixth information independent of the data size and representative of an electronic zoom magnification particular to each divided image data to be handled together and outputs analyzed instruction information as the control signal, and said image correcting circuit further comprises a zoom correcting circuit for executing electronic zoom processing particular to each divided image data in accordance with the sixth information.

41. The camera in accordance with claim 40, wherein said zoom correcting circuit executes, based on the sixth information, distortion correction with each divided image data for compensating for distortion of optics.

42. The camera in accordance with claim 31, further comprising:

a source voltage detecting circuit for detecting a voltage of a power source that drives said device; and a system control circuit for controlling at least said memory controller and said image correcting circuit when the voltage output from said source voltage detecting circuit is lower than a preselected reference voltage.

43. The camera in accordance with claim 42, wherein said system control circuit controls a frequency of a clock signal output from said standard adjusting circuit.

44. An image control device for controlling input image data, executing signal processing with controlled image data, and outputting processed image data in accordance with a preselected standard, said device comprising:

a memory for storing the input image data;

a standard adjusting circuit for storing the image data read out of said memory therein and outputting stored image data at a timing matching with the preselected standard;

a memory control circuit for controlling at least said memory and said standard adjusting circuit, said memory control circuit controlling input and output of the image data from said memory, setting a unit amount of continuous image data to be handled together at the time of output, setting a unit number of image data for a single line and consisting of unit amounts of continuous image data, and outputting a request for an access to said memory to thereby control read-out;

a communicating circuit for selectively sending Or receiving the image data;

an image correcting circuit for analyzing, when the image data read out of said memory are smaller in amount than the unit number of image data, particular information particular to said image data and relating to display, and executing, based on a result of analysis, at least one of restoration and processing with each unit image data of divided image data; and an instruction information feeding circuit for encoding the particular information and feeding encoded particular information to said image correcting circuit, wherein said image correcting circuit and said instruction information feeding circuit precede said standard adjusting circuit, and wherein said image correcting circuit comprises an arbitrating circuit for giving the highest degree of priority to an access for refreshing said memory, and arbitrating an access request for control data, which differs from the image data, with respect to a remaining accessible time when said image data are output.

* * * * *